US006993184B2

(12) United States Patent
Matsugu

(10) Patent No.: US 6,993,184 B2
(45) Date of Patent: Jan. 31, 2006

(54) OBJECT EXTRACTION METHOD, AND IMAGE SENSING APPARATUS USING THE METHOD

(75) Inventor: Masakazu Matsugu, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 58 days.

(21) Appl. No.: 10/678,255

(22) Filed: Oct. 6, 2003

(65) Prior Publication Data

US 2004/0066970 A1    Apr. 8, 2004

Related U.S. Application Data

(62) Division of application No. 08/742,206, filed on Oct. 31, 1996, now Pat. No. 6,636,635.

(30) Foreign Application Priority Data

| Nov. 1, 1995 | (JP) | ................... | 7-285362 |
| Dec. 28, 1995 | (JP) | ................... | 7-343885 |
| Dec. 28, 1995 | (JP) | ................... | 7-343886 |
| Dec. 28, 1995 | (JP) | ................... | 7-343896 |
| Jul. 4, 1996 | (JP) | ................... | 8-192728 |
| Jul. 17, 1996 | (JP) | ................... | 8-187476 |

(51) Int. Cl.
   *G06K 9/34*     (2006.01)
(52) U.S. Cl. ...................... 382/173; 382/175; 382/176; 382/177; 382/178; 382/179
(58) Field of Classification Search ........ 382/164–165, 382/170–171, 205, 209, 217–220, 274, 282–83, 382/284, 312, 215–216, 199; 348/231.3, 348/231.6, 129, 161, 225, 345, 352, 364, 348/365, 366, 370; 358/464, 453; 345/433, 345/434, 523
See application file for complete search history.

(56) References Cited

U.S. PATENT DOCUMENTS 4,541,113 A    9/1985 Seufert et al. .............. 382/124

(Continued)

FOREIGN PATENT DOCUMENTS

JP          A55124112          9/1980

(Continued)

OTHER PUBLICATIONS

Weil, H.A., et al.: "Bildverarbeitung: Die. 3 Dimension Erschliessen Gekrümmte Fläche Order Ringförmige Schriften Ohne Probleme" *Electronik*, vol. 40, No. 18, Sep. 3, 1991.

*Primary Examiner*—Samir Ahmed
*Assistant Examiner*—Brian Le
(74) *Attorney, Agent, or Firm*—Morgan & Finnegan, LLP

(57) ABSTRACT

This invention provides an object extraction method for performing processing for extracting and cutting out a specific object from a sensed image at high speed, and an image sensing apparatus using the method. In this invention, in a method of extracting an object by comparing a sensed image and a standard image, a focusing signal, focal length data, visual axis direction data, and illumination conditions are detected, and the initial size, initial position, or initial color of the standard image is changed on the basis of the detection results, and extraction is started under optimal conditions. In a method of extracting a specific object from the background image, the background image is converted into an image having the same conditions as those of the object image. From a plurality of images obtained under different image sensing conditions, the contour of the object is accurately obtained at high speed. In an object extraction method using a template, the size of the template is determined on the basis of the object distance, object size, or the like.

24 Claims, 49 Drawing Sheets

U.S. PATENT DOCUMENTS

| | | | |
|---|---|---|---|
| 4,747,148 A | 5/1988 | Watanabe et al. | 382/141 |
| 5,175,775 A | 12/1992 | Iwaki et al. | 382/211 |
| 5,222,155 A | 6/1993 | Delanoy et al. | 382/215 |
| 5,293,469 A * | 3/1994 | Outa et al. | 345/660 |
| 5,369,430 A | 11/1994 | Kitamura | 348/345 |
| 5,495,535 A | 2/1996 | Smilansky et al. | 382/145 |
| 5,500,906 A | 3/1996 | Picard et al. | 382/220 |
| 5,631,983 A * | 5/1997 | Ohnishi et al. | 382/284 |
| 5,633,951 A | 5/1997 | Moshfeghi | 382/294 |
| 5,710,829 A | 1/1998 | Chen et al. | 382/282 |
| 5,740,266 A * | 4/1998 | Weiss et al. | 382/128 |
| 5,781,659 A | 7/1998 | Melen et al. | 382/218 |
| 5,822,082 A * | 10/1998 | Sato et al. | 358/401 |
| 5,953,076 A | 9/1999 | Astle et al. | 348/584 |

FOREIGN PATENT DOCUMENTS

| | | |
|---|---|---|
| JP | A63036213 | 2/1988 |
| JP | A02141877 | 5/1990 |
| JP | A06282652 | 10/1994 |

* cited by examiner

FIG. 8
L CROSS: 
T CROSS: 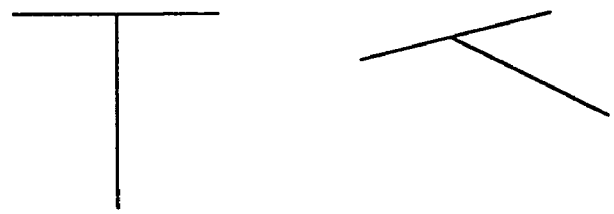
X CROSS: 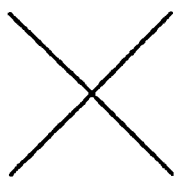

FIG. 32

| ACTION CATEGORY (COMMAND) | ENCODED TEMPLATE SEQUENCE (CODEBOOK) |
|---|---|
| GO FORWARD | [ 1a – 1b – 1c ....] – [ 1a – 1b – 1c ....] – ... |
| GO BACKWARD | [ 2a – 2b – 2c ....] – [ 2a – 2b – 2c ....] – ... |
| HOLD | [ 3a – 3b – 3c ....] – [ 3a – 3b – 3c ....] – ... |
| BECKON | [ 4a – 4b – 4c ....] – [ 4a – 4b – 4c ....] – ... |
| GO AWAY | [ 5a – 5b – 5c ....] – [ 5a – 5b – 5c ....] – ... |
| RESET | [ 6a – 6b – 6c ....] – [ 6a – 6b – 6c ....] – ... |

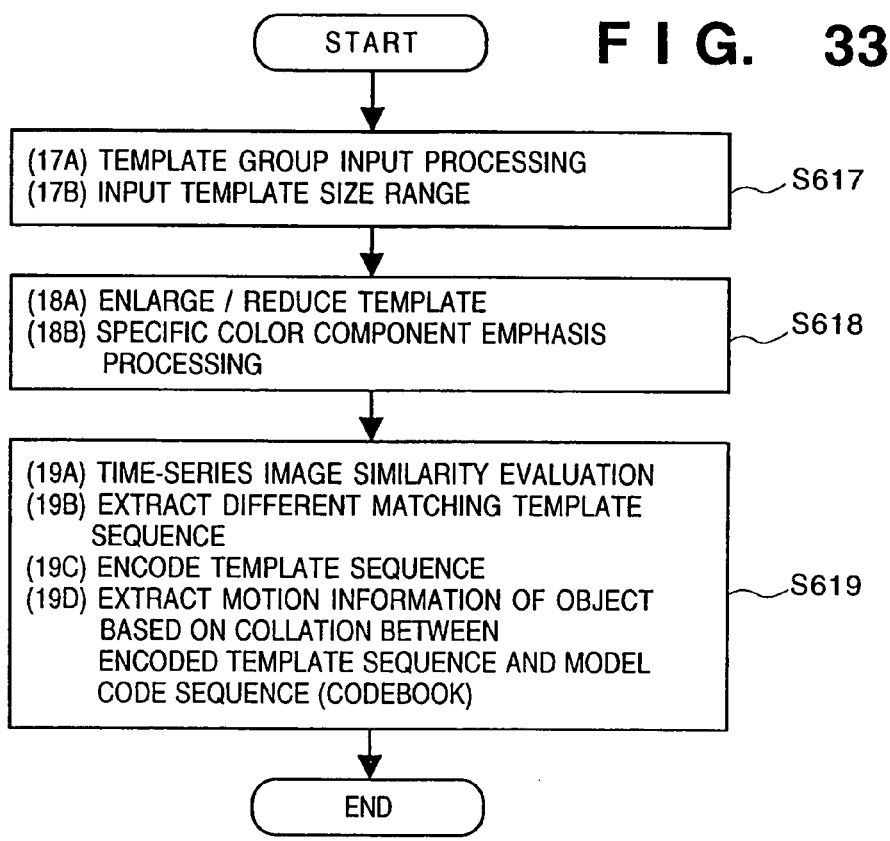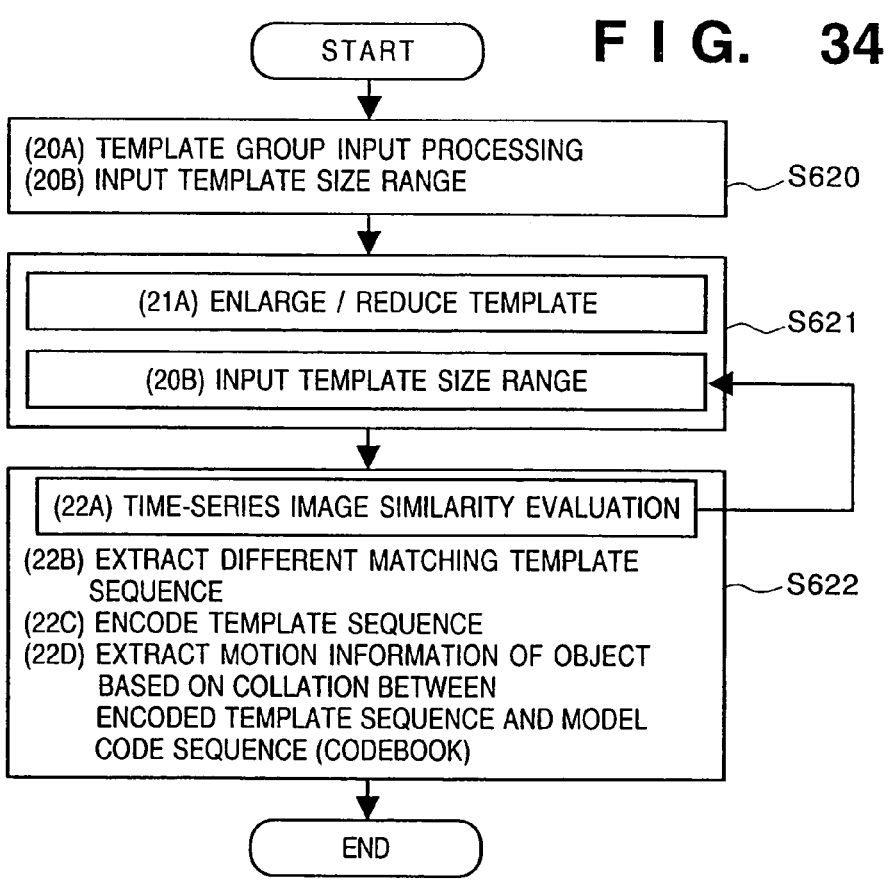

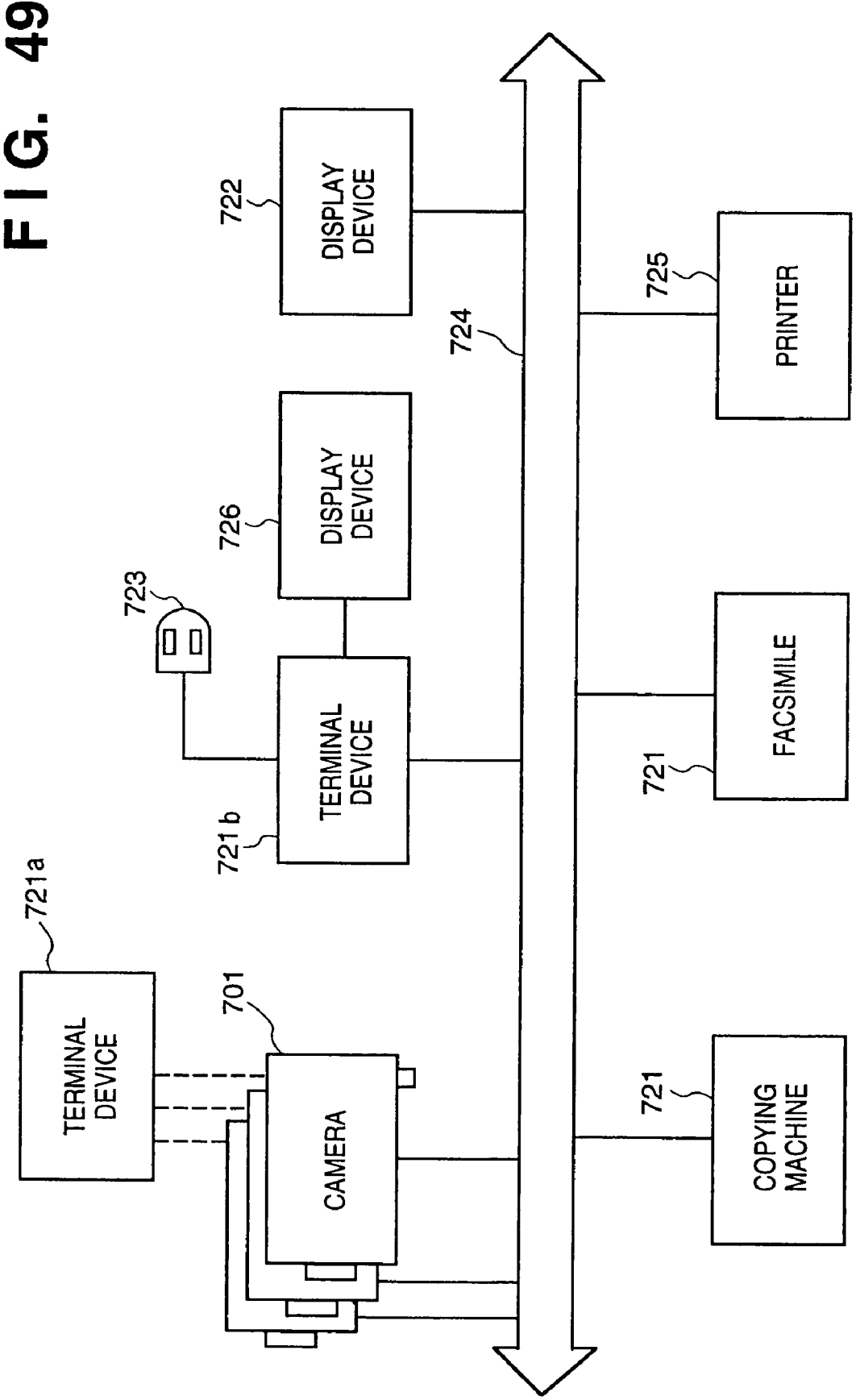

OBJECT EXTRACTION METHOD, AND IMAGE SENSING APPARATUS USING THE METHOD

This is a divisional application of U.S. patent application Ser. No. 08/742,206, filed on Oct. 31, 1996, now U.S. Pat. No. 6,636,635, entitled "Object Extraction Method And Image Sensing Apparatus Using The Method." now allowed, which is incorporated herein in its entirety.

BACKGROUND OF THE INVENTION

The present invention relates to a method of extracting a target object from an image sensed by an image sensing apparatus, a method of cutting out the. object, a database structure used in extraction and a method of creating the database, and an image sensing apparatus or an image sensing system that can obtain object information using these methods. The present invention also relates to a storage medium which provides a program and data to the image sensing apparatus or image sensing system or stores the database.

As a technique for discriminating the presence/absence of a specific object in an image, or searching a database for an image including a specific object and extracting the image, a pattern recognition technique is used. Methods of applying a pattern recognition technique upon executing the pattern recognition include the following methods.

More specifically, in the first method, an image is segmented into a plurality of regions in advance and cutting processing is performed so that only a specific region to be recognized remains. Thereafter, similarity with a standard pattern is calculated using various methods.

In the second method, a template prepared in advance is scanned to calculate the degree of matching (correlation coefficient) at the respective positions to search for a position where the calculated value becomes equal to or larger than a predetermined threshold value (Japanese Patent Laid-Open No. 6-168331).

Furthermore, in the third method, upon creating an image database, regions of constituting elements and constituting element names in an image are input, so as to attain high-speed search for an image having a predetermined feature (Japanese Patent Laid-Open No. 5-242160).

However, in the first and second methods, since the position or size of a specific object in an image or the hue or the like that reflects the illumination condition is not known in advance, the following problems are posed.

First, since similarity must be calculated using a plurality of standard patterns (images representing identical objects having different sizes, positions, hues, and the like), a considerably large calculation amount and long calculation time are required.

Second, it is generally difficult to find and cut out a specific region having a feature close to that of a standard pattern for the same reason as in the first problem.

Third, the template size can be set in advance under only very limited image generation conditions. When the image generation conditions are not known, the same problem as the first problem is posed. Therefore, a very long calculation time is required for discriminating the presence/absence of a specific object, searching for an image including a specific object, and the like.

In the third method, in order to input regions of constituting elements and their names in an image, input interfaces such as a keyboard, mouse, and the like are required, and when a database of images actually sensed by an image sensing means is to be created, such search data must be created after the image sensing operation.

Furthermore, an application for searching a database of images sensed using an image sensing means for an image including an object intended to be generally the main object in the scene cannot be realized by conventional image processing methods that do not use any information upon image sensing.

As a general technique for extracting (cutting) an image, a chromakey technique using a specific color background, a videomat technique for generating a key signal by image processing (histogram processing, difference, differential processing, edge emphasis, edge tracking, and the like) (*Television Society technical report*, vol. 12, pp. 29–34, 1988), and the like are known.

As another apparatus for extracting a specific region from an image, in a technique disclosed in Japanese Patent Publication No. 6-9062, a differential value obtained by a spatial filter is binarized to detect a boundary line, connected regions broken up by the boundary line are labeled, and regions with an identical label are extracted.

A technique for performing image extraction based on the difference from the background image is a classical technique, and recently, Japanese Patent Laid-Open No. 4-216181 discloses a technique for extracting or detecting target objects in a plurality of specific regions in an image by setting a plurality of masks (=specific processing regions) in the difference data between background image and the image to be processed.

In a method associated with Japanese Patent Publication No. 7-16250, the distribution of probability of occurrence for the object to be extracted is obtained on the basis of the color-converted data of the current image including the background image, and the difference data between the lightness levels of the background image and the current image using a color model of the object to be extracted.

As one of techniques for extracting a specific object image by extracting the outer contour line of the object from an image, a so-called active contour method (M. Kass et al., "Snakes: Active Contour Models," *International Journal of Computer Vision*, Vol. 1, pp. 321–331, 1987) is known.

In the above-mentioned technique, an initial contour which is appropriately set to surround an object moves and deforms (changes its shape), and finally converges to the outer shape of the object. In the active contour method, the following processing is typically performed. More specifically, a contour line shape u(s) that minimizes an evaluation function given by equation (1) below is calculated with respect to a contour line u(s)=(x(s), y(s)) expressed using a parameter s that describes the coordinates of each point:

$$E = \int_0^a E_1(V(s)) + w_0 E_0(V(s)) ds \qquad (1)$$

For $$E_1(V(s)) = \alpha(s)\left|\frac{du}{ds}\right|^2 + \beta(s)\left|\frac{d^2u}{ds^2}\right|^2 \qquad (2)$$

$$E_0(V(s)) = -|\Delta I(u(s))|^2 \qquad (3)$$

where I(u(s)) represents the luminance level on u(s), and $\alpha(s)$, $\beta(s)$, and $w_0$ are appropriately set by the user. In the technique (active contour method) for obtaining the contour line of a specific object by minimizing the above-mentioned evaluation function defined for a contour line, setting methods described in Japanese Patent laid-Open Nos. 6-138137, 6-251148, 6-282652, and the like are known as the setting method of an initial contour.

The chromakey technique cannot be used outdoors due to strict limitations on the background, and also suffers a problem of color omission. In the videomat technique, the user must accurately perform contour designation in units of pixels, thus requiring much labor and skill.

The technique using the difference from the background image cannot be normally applied when an image of only the background except for a specific object cannot be sensed (e.g., the object is huge), and the load on the user is heavy.

Since no image sensing conditions (camera parameters and external conditions such as illumination) are taken into consideration, discrimination errors of the region to be extracted from the difference data become very large unless the background image and the image including the object to be extracted are obtained under the same image sensing conditions and at the same fixed position. Also, the technique described in Japanese Patent Publication No. 7-16250 is not suitable for extracting an image of an unknown object since it requires a color model of the object to be extracted.

Of the initial contour setting methods of the above-mentioned active contour method, in Japanese Patent Laid-Open No. 6-138137, an object region in motion is detected on the basis of the inter-frame difference, and a contour line is detected on the basis of contour extraction (searching for the maximum gradient edge of a changed region) in the vicinity of the detected region. Therefore, this method cannot be applied to a still object in an arbitrary background.

In Japanese Patent Laid-Open No. 6-282652, feature points with a strong edge are extracted from an image, and points with higher evaluation values are selected from a set of feature points on the basis of the evaluation function, thereby setting the initial contour. In this case, the background image must be plain or image data that changes gradually.

Furthermore, as an example of the technique for optimizing the camera operation and the operation mode, in a method described in Japanese Patent Laid-Open No. 6-253197, the stop is set to obtain an appropriate average luminance upon sensing the background image. Thereafter, the current image is sensed using the same setting value, and the object image is extracted on the basis of difference image data therebetween.

On the other hand, as the degree of freedom in processing and modification of video information becomes higher along with the advance of digital signal processing, the internal processing of the image sensing means has seen a great change from relatively simple processing such as luminance level or color tone conversion, white-balance processing, quantization size conversion, and the like to one having an edge extraction function, and one having an image extraction function using a color component sequential growth method (*Television Society technical report*, Vol. 18, pp. 13–18, 1994).

However, since the methods that use difference data from an image of only the background do not consider any image taking conditions (camera parameters and external conditions such as illumination) except for the technique described in Japanese Patent Laid-Open No. 6-253197, discrimination errors of the region to be extracted from difference data become very large unless the background image and the image including the object to be extracted are obtained under the same image taking conditions and at the same fixed position.

On the other hand, the method described in Japanese Patent Publication No. 7-16250 is not suitable for extraction of an image of an unknown object since it requires a color model of the object to be extracted.

The method associated with Japanese Patent Laid-Open No. 6-253197 merely discloses a technique in which the setting value of the stop upon sensing the background image is used upon sensing an image including a specific object on the premises that the image sensing means is set at the same fixed position, and the same image sensing conditions as those upon sensing the image including only the background are used. In this method that gives priority to the image sensing conditions of the background image, the image quality of the object to be extracted, i.e., an image including a specific object is not normally guaranteed.

Furthermore, the chromakey method cannot be used outdoors due to serious limitations on the background and also suffers a problem of color omission.

Also, in the videomat method, the contour designation operation must be manually and accurately performed in units of pixels, thus requiring much labor and skill.

The method of detecting regions segmented by a boundary line by detecting the boundary line by differential calculations can hardly be applied to an object having a complex texture pattern, and offers no stable and versatile boundary line detection processing scheme.

As a method of extracting information associated with an object by performing template matching, i.e., as a technique that can be used for searching for, tracking, or recognizing a specific object from an image sensed by a camera, a model base technique performed based on feature vector extraction (constituting line segment, shape parameter extraction) processing and subsequent comparison with a feature vector model of a feature vector is known (Japanese Patent Publication No. 6-14361, Japanese Patent Laid-Open No. 6-4673, and the like).

As a technique for detecting the motion of an object, a method disclosed in Japanese Patent Laid-Open No. 5-232908 cuts the portion to be subjected to motion extraction on the basis of the luminance level of a projection component to track motions at the respective points in the regions of interest in time-series images.

However, in the former example, since templates or models having different sizes must be prepared for a target image in correspondence with changes in size of a specific object in an image to perform matching in units of regions of the image, a very large memory capacity and a very long calculation time for feature vector extraction and matching with models are required.

Alternatively, the zooming parameter or the like of the image sensing system must be manually adjusted, so that the size of the target image becomes nearly equal to that of the model.

In the latter example, it is generally difficult to stably cut out an action extraction portion on the basis of the luminance level of a projection component of an image. Also, after motions at the respective points are tracked, it is difficult to interpret the motions at the respective points as one action category by combining such motion information, except for a simple action.

Furthermore, in constructing an image sensing apparatus or system, since the image sensing means does not have any command communication means for externally controlling the image sensing mode upon extraction of an object or any image sensing parameter control function required upon sensing an image for object extraction, image sensing conditions optimal to image extraction cannot be set.

Therefore, the image sensing conditions cannot be optimally set in correspondence with image taking situations such as a change in illumination condition, the presence/absence of object motions, the presence/absence of motions of the image sensing means itself, and the like for the purpose of image extraction.

Japanese Patent Laid-Open No. 6-253197 above discloses a technique in which a stop control unit is set to obtain an appropriate average luminance upon sensing the background image, the current image is sensed using the same setting value as that for the background image, and a specific object image is extracted based on difference data between the two images.

However, again, an image sensing system cannot set optimal image sensing conditions to image extraction since an image sensing unit has neither a command communication control unit for appropriately controlling the image sensing mode from an external device upon extracting a specific object image nor a control function of the image sensing parameters required for sensing an image used for extracting a specific object image. Therefore, the image sensing conditions cannot be optimally set in correspondence with image taking situations such as changes in illumination conditions, the presence/absence of object motion, the presence/absence of motions of the image sensing unit itself, and the like.

When a specific object image is to be extracted by remote-controlling a camera, a communication control means, a communication system, control commands, and the like has not been established yet. In particular, optimal image sensing conditions such as the field angle, focusing, illumination conditions (the presence/absence of flash emission), and the like for a designated object cannot be automatically or interactively set.

For example, setting an optimal field angle is important for removing the unwanted background region as much as possible and for efficiently performing image extraction processing. However, such function cannot be realized since communication control and image sensing control systems for performing such setting operation between the camera and the terminal device have not been established yet.

SUMMARY OF THE INVENTION

According to one mode of the present invention, it is an object of the present invention to provide an apparatus and method that can perform high-speed search processing of a specific object using information associated with the image sensing mode upon sensing an object.

It is another object of the present invention to attain high-speed discrimination of the presence/absence of a known object in an image using limited image sensing mode parameters.

It is still another object of the present invention to reduce the calculation time required for discriminating the presence/absence of a specific object.

It is still another object of the present invention to further reduce the calculation time.

It is still another object of the present invention to attain high-speed presence/absence discrimination processing of a specific object on the basis of contour line data and to attain object cutting processing simultaneously with the presence/absence discrimination processing.

It is still another object of the present invention to reduce the time required for discriminating the presence/absence of a specific object on the basis of only contour line data, and to reduce the cutting calculation time.

It is still another object of the present invention to allow stable detection of a specific object even when a standard image and an actual image of an object have different sizes and shapes in the case of processing based on contour line data.

It is still another object of the present invention to attain high-speed object extraction with high reliability by utilizing image sensing information.

It is still another object of the present invention to attain high-speed separation processing of a specific object from the background by cutting an image inside a contour line utilizing image sensing mode parameters.

According to the present invention, since a specific object is detected by comparing it with a standard image which is initialized based on image sensing mode information used upon sensing an image of an object by an image sensing means, the specific object can be detected at high speed. Therefore, a desired image can be found at high speed, and an automatic image taking operation having a specific object at the center can be realized.

For example, since the initial size of the standard image is set on the basis of the object distance upon image sensing or the focal length parameter of the image sensing means, the size of an object region that may be present in the image can be appropriately set, and the calculation time required for discriminating the presence/absence of a specific object can be reduced. Hence, the presence/absence discrimination processing of a specific object can be performed for only a region near the object position upon image sensing, and the calculation time can be further reduced.

On the other hand, since the central position of the standard image is initialized on the basis of the visual axis direction upon image sensing, the presence/absence discrimination processing of a specific object can be performed while limiting the search processing range in the image database to a range near the object position upon image sensing, and the calculation time required for discriminating the presence/absence of a specific object can be greatly reduced.

According to another mode of the present invention, it is an object of the present invention to efficiently and stably extract a specific object image from a plurality of images having different image sensing conditions.

It is another object of the present invention to cope with an object that is changing its shape or moving and to realize high-speed image extraction and, more particularly, to attain image extraction using a plurality of images having different image sensing conditions under the condition of a constant magnification.

It is still another object of the present invention to realize stable convergence and high precision of active contour processing.

It is still another object of the present invention to allow stable extraction of initial contour data by a small calculation amount.

It is still another object of the present invention to allow stable image extraction by a small data amount while suppressing the influence of noise.

It is still another object of the present invention to allow image extraction with stably high extraction precision.

It is still another object of the present invention to allow high-speed, stable contour extraction and image extraction of a specific object by a small calculation amount while suppressing the influence of the image of the background object.

It is still another object of the present invention to automatically set an initial contour line with high precision by indicating one point inside the object to be extracted or near the boundary line (contour line) of the background using an indication means such as a mouse.

According to the present invention, an initial contour is set on the basis of the comparison result of a plurality of images having different image sensing conditions, and the background image region is removed on the basis of the initial contour. Hence, an image of a specific object can be stably extracted at high speed. Prior to extraction of a specific object by image processing, an approximate contour line (a boundary line from a background) of a specific object can be stably obtained at high speed from a plurality of images having different image sensing conditions, and the calculation time required for removing the residual background image region can be greatly shortened.

Since an initial contour approximate to the contour line of the object to be extracted in active contour processing is set on the basis of a plurality of images having different image sensing conditions, automatic extraction of a specific object and moving image extraction of a moving object can be performed at high speed. Hence, an object in motion can be extracted from a moving image by processing for deforming and moving an approximate contour line, and high-speed image extraction can be realized.

Since initial contour data extracted from a plurality of images having different image sensing conditions can be appropriately set by interactive modification, a specific object can be extracted with high precision, and stability of background removal processing and image extraction precision can be improved using a modification means of an approximate contour line.

For example, an approximate contour line can be stably obtained from two images having different focusing states, thus greatly improving the image extraction precision and processing speed.

According to still another mode of the present invention, it is an object of the present invention to provide an image extraction apparatus having a large margin for differences in image sensing condition in each respective images upon extracting a specific object by comparing a plurality of images.

It is another object of the present invention to identify the region to be extracted according to the above object using a simple image processing means.

It is still another object of the present invention to obtain a high-quality image of the object to be extracted.

It is still another object of the present invention to attain efficient processing such as image edit, modification, transmission operations, and the like.

It is still another object of the present invention to allow image extraction with an increased margin for camera shake upon image sensing, variations in position of an image sensing means, and for variations in posture.

It is still another object of the present invention to increase the margin for variations in magnification condition, focusing state, contrast, illumination condition, and the like.

It is still another object of the present invention to allow image extraction with a large margin for variations in image sensing condition.

According to the present invention, since image sensing conditions are recorded, and image data is converted on the basis of the recorded image sensing conditions, when a specific object is extracted by comparing a plurality of images, e.g., a registered image and the current image, different frame images in a moving image, and the like, the margin for different image sensing conditions of the respective images can be increased. Hence, when a specific object image is extracted from the background image, the object can be satisfactorily extracted irrespective of very small variations in position of the image sensing means owing to camera shake, differences in exposure condition, variations in gain of the sensor, and the like. The margin for variations in, e.g., illumination condition can be increased without using any model associated with the object to be extracted such as a color model.

Since image data of the background image is converted using an image including a specific object sensed under the same image sensing conditions as those used upon sensing the background image, the margin for variations in image sensing conditions and camera parameters can be increased on the basis of both the background image and the image including a specific object, and a high-quality object image can be extracted independently of the image sensing conditions used upon sensing the background image. Therefore, a high-quality in-focus image of the object to be cut can be output.

For example, since the image sensing conditions include an exposure amount, focusing state, and the presence/absence of flash emission, an image of a specific object can be extracted from a plurality of images sensed under different image sensing conditions, and hence, image extraction with a large margin for variations in magnification condition, focusing state, contrast, illumination condition, and the like can be performed.

According to still another mode of the present invention, it is an object of the present invention to provide a sensed image processing apparatus which stably extracts information of a specific object at high speed while saving the memory capacity irrespective of the distance between the object and the image sensing means and the size on the screen.

It is another object of the present invention to provide a sensed image processing apparatus which is hardly influenced by differences in observation angle of the object.

It is still another object of the present invention to provide a sensed image processing apparatus which allows easy extraction of the distance between the object and the image sensing means and the object region in the screen, can automatically set a proper size of the model to be subjected to matching, and can easily and accurately recognize and extract a specific object.

It is still another object of the present invention to provide a sensed image processing apparatus which can perform accurate object extraction calculations without being sensitively influenced by variations in object size, and the like.

It is still another object of the present invention to provide a sensed image processing apparatus which can extract motion information of an image sensing means from time-series images, and can stably extract an object image irrespective of motions or actions of an object.

It is still another object of the present invention to provide a sensed image processing apparatus which can absorb misalignment between the center of the template model and that of the object region, and can perform high-speed processing.

It is still another object of the present invention to provide a stable, high-precision sensed image processing apparatus which is not influenced by variations in background pattern.

It is still another object of the present invention to provide a stable, high-precision sensed image processing apparatus which can detect the object distance even in the dark.

According to the present invention, since a template size determination means which determines the size range of a template that can be reduced/enlarged on the basis of the output from an object distance detection means is arranged, high-speed information extraction of a specific object can be stably performed while saving the memory capacity irrespective of the distance between the object and the image sensing means or the size on the screen.

On the other hand, since a plurality of templates, which are generated on the basis of images, viewed from different view point positions or directions, of an identical object, are stored, information extraction of a specific object is hardly influenced by differences in view angle of the object.

For example, since the template size determination means determines the temperature size in a predetermined range on the basis of the object distance, size information of a specific object, and optical parameters of the image sensing means, a proper size of the model to be subjected to matching can be automatically set.

Also, information extraction of a specific object can be performed without being sensitively influenced by variations in object size.

According to still another mode of the present invention, it is an object of the present invention to attain high-speed object extraction and to allow control of the image sensing conditions required for obtaining a high-quality image to be extracted.

It is another object of the present invention to allow external control of the characteristics of the image sensing operation for object extraction, and to transfer the extracted image to a remote place.

It is still another object of the present invention to allow external control of the image sensing parameters for object extraction, and to transfer the extracted object image to a remote place.

It is still another object of the present invention to automatically set the image sensing conditions for object extraction and to perform automatic parameter control.

It is still another object of the present invention to improve the operability of an image input device upon object extraction.

It is still another object of the present invention to allow an image input device to perform internal pre-processing of an image required for precise object extraction, and to shorten the time required from the image sensing operation until the output operation of the extracted image.

It is still another object of the present invention to stably cut an image of a specific object from an arbitrary background irrespective of the illumination conditions.

It is still another object of the present invention to allow high-precision object extraction without being influenced by the illumination conditions, and to attain exposure amount control and image cutting control based thereon so as to realize high-image quality upon extracting a specific object.

It is still another object of the present invention to selectively use appropriate image sensing parameters so as to attain high image quality of a cut image and high-speed processing in correspondence with the illumination conditions and object distance upon image sensing.

It is still another object of the present invention to stably cut images at high speed in image sensing operations with a plurality of image sensing conditions.

It is still another object of the present invention to automatically select an appropriate image compression mode in correspondence with whether the image to be cut is a still image or a moving image.

It is still another object of the present invention to stably cut an image independently of whether or not the object in question is a moving object or whether or not the object is moving relative to the image sensing means.

It is still another object of the present invention to appropriately attain an image sensing operation for object extraction without any control from an external terminal via a communication means or any complicated manual operation.

According to the present invention, when an image sensing means performs an image sensing operation for extracting a specific object image, it can set or control optimal image sensing parameters. Since image quality of the extracted image can be optimized by controlling the image sensing conditions, a specific object image can be extracted at high speed and with high image quality.

Since the feature amount or the like of an image can be externally controlled, the image sensing operation for object extraction and image processing to be performed inside an image input device can be remote-controlled, and the extracted image can be on-line transferred to a remote place.

For example, since the image sensing parameters can be controlled by externally supplying control commands via a control command communication means, the image sensing parameters for object extraction can be externally controlled, and high image quality of the extracted image and high-speed extraction processing can be realized.

Since an image sensing mode setting means has an image setting mode setting button, the image sensing mode setting operation is started upon operation of the image sensing mode setting button, and the control amounts of image sensing parameters are set on the basis of the image sensing parameter measurement values, the image sensing parameters in the object extraction mode can be automatically set, and the control amounts of image sensing parameters need not be manually set.

Other features and advantages of the present invention will be apparent from the following description taken in conjunction with the accompanying drawings, in which like reference characters designate the same or similar parts throughout the figures thereof.

According to still another mode of the present invention, it is an object of the present invention to provide an image sensing apparatus and method, which can selectively control image sensing operations for extraction, recognition, tracking, and the like of a specific object by either a remote-control operation by means of communication control from an external terminal device or an operation on the camera.

It is another object of the present invention to provide an image sensing apparatus and method, which can set appropriate image sensing conditions having an object as the center on the basis of image data when an image sensing operation for object extraction is performed by a remote-control operation.

It is still another object of the present invention to provide an image sensing apparatus and method, which can optimize and automate the image sensing system for object extraction on the basis of image data.

It is still another object of the present invention to provide an image sensing apparatus and method that can perform an image sensing (image fetching) operation for object extraction at an arbitrary time and timing from the external terminal device side.

It is still another object of the present invention to provide an image sensing apparatus and method which can attain high-speed processing from an image sensing operation to object extraction, and high-speed display processing on a display of a terminal device.

It is still another object of the present invention to provide an image sensing apparatus and method which allow the terminal device side to control a series of processing operations from the setting operation of image sensing conditions to the display operation of the extracted image.

It is still another object of the present invention to provide an image sensing apparatus and method which can remote-control the image sensing parameters for object extraction in a cordless manner.

It is still another object of the present invention to provide an image sensing apparatus and method which can externally supply an image sensing operation control program recorded on a recording medium, and can automatically recover an identical image sensing operation for object extraction (the processing sequence in the camera).

It is still another object of the present invention to provide an image sensing apparatus and method which can externally supply image sensing operation control data recorded on a recording medium, and can automatically recover identical image sensing conditions for object extraction.

It is still another object of the present invention to provide an image sensing apparatus and method which can automatically recover an identical image sensing operation later when an image sensing operation for object extraction is manually performed.

According to the present invention, in image sensing means, image sensing parameter control means controls image sensing parameters, and image sensing mode setting means sets an image sensing mode. In calculation means, first image processing means calculates comparison data between a plurality of images with the controlled image sensing parameters, and second image processing means classifies image regions by discriminating the calculated comparison data. In terminal means, data communication means performs data communications with the image sensing means, and the image sensing parameter control means controls the image sensing parameters on the basis of a signal from the terminal means or a signal from the image sensing mode setting means. Therefore, image sensing operations for extraction, recognition, tracking, and the like of an object can be selectively attained by a remote-control operation by means of communication control from an external terminal device or an operation on the image sensing means (camera).

Alternatively, in image sensing means, image sensing parameter control means controls image sensing parameters, and image processing means calculates comparison data between a plurality of images with the controlled image sensing parameters. In calculation means, indication/selection means indicates an object position in the image. When terminal means performs data communications with the image sensing means, the calculation means generates an image sensing parameter control signal on the basis of the object position signal from the indication/selection means and image data in a predetermined size region having the indicated position as the center, the image sensing parameter control means controls image sensing conditions on the basis of the image sensing parameter control signal, and the terminal means extracts a specific object image by processing an image obtained under the controlled image sensing conditions. Hence, appropriate image sensing conditions having an object as the center can be set on the basis of image data.

Alternatively, an apparatus comprises image sensing means having finder display means, image display means for displaying an image sensed by the image sensing means, indication/selection means for indicating the image displayed on the image display means, and calculation means having region discrimination processing means for discriminating an indicated region of the image. The region discrimination processing means processes image data sensed by the image sensing means and performs cutting processing having a position or region in an image frame output from the indication/selection means as the center, and the image display means or the finder display means displays the extracted image signal from the calculation means. As a consequence, high-speed processing from an image sensing operation to object extraction and high-speed display processing on a camera or a display of a terminal device can be realized.

Alternatively, an apparatus comprises image sensing means having image sensing parameter control means for controlling image sensing parameters and memory means for storing sensed image data, image display means for displaying an image sensed by the image sensing means, indication/selection means for indicating the displayed image, calculation means having region discrimination means for discriminating a region of the indicated image, and terminal means having data communication means for performing data communications with the image sensing means. The image sensing parameter control means receives control data from the terminal means via the data communication means or the memory means. The region discrimination processing means calculates comparison data between a plurality of images sensed under at least two image sensing conditions including a standard image sensing condition and a non-standard image sensing condition set by the image sensing parameter control means, and performs cutting processing having a position or region in an image frame output from the indication/selection means as the center. The image display means displays an image signal output from the calculation means. Therefore, a series of processing operations from the setting operation of the image sensing conditions to the display operation of the extracted image can be controlled by the terminal device side.

Alternatively, a method comprises the image sensing step including the image sensing parameter control step of controlling image sensing parameters of an image sensing apparatus and the image sensing mode setting step of setting an image sensing mode, the calculation step including the first image processing step of calculating comparison data between a plurality of images with the controlled image sensing parameters and the second image processing step of classifying image regions by discriminating the calculated comparison data, and the data communication step of performing data communications between the image sensing apparatus and a terminal device. Since the image sensing parameter control step controls the image sensing parameters on the basis of a signal from the terminal device or a signal set in the image sensing mode setting step, image sensing operations for extraction, recognition, tracking, and the like of an object can be selectively attained by a remote-control operation by means of communication control from an external terminal device or an operation on image sensing means (camera).

Alternatively, a sensed image processing method comprises the image sensing step including the image sensing parameter control step of controlling image sensing parameters of an image sensing apparatus and the image processing step of calculating comparison data between a plurality of images with the controlled image sensing parameters, the calculation step of indicating an object position in the image using an indication/selection device, and the data communication step of performing data communications between the image sensing apparatus and a terminal device. The calculation step generates an image sensing parameter control signal on the basis of an object position signal from the indication/selection device and image data in a predetermined size region having the indicated position as the center, the image sensing parameter control step controls image sensing conditions on the basis of the image sensing parameter control signal, and the terminal device extracts a specific object image by processing an image obtained under the image sensing conditions. Accordingly, appropriate image sensing conditions having an object as the center can be set on the basis of image data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS.

FIG. 8 is a view showing examples of feature elements (crossing patterns) to be extracted in FIG. 7;

FIG. 32 is a view showing examples of coding template sequences (codebooks) that represent action categories;

FIG. 33 is a flow chart showing the processing upon evaluating similarity by emphasizing a specific color component in a template;

FIG. 34 is a flow chart showing the processing for performing repetitive evaluations while changing the resolution from a low resolution to a high resolution upon evaluating similarity;

FIG. 49 is a block diagram showing the arrangement of an image sensing system according to another embodiment of the present invention;

DESCRIPTION OF THE PREFERRED EMBODIMENTS

<Example of Controlling Initialization of Standard Image>

An embodiment of an object extraction method and an image sensing device according to the present invention will be described below with reference to the accompanying drawings.

Figure 1:
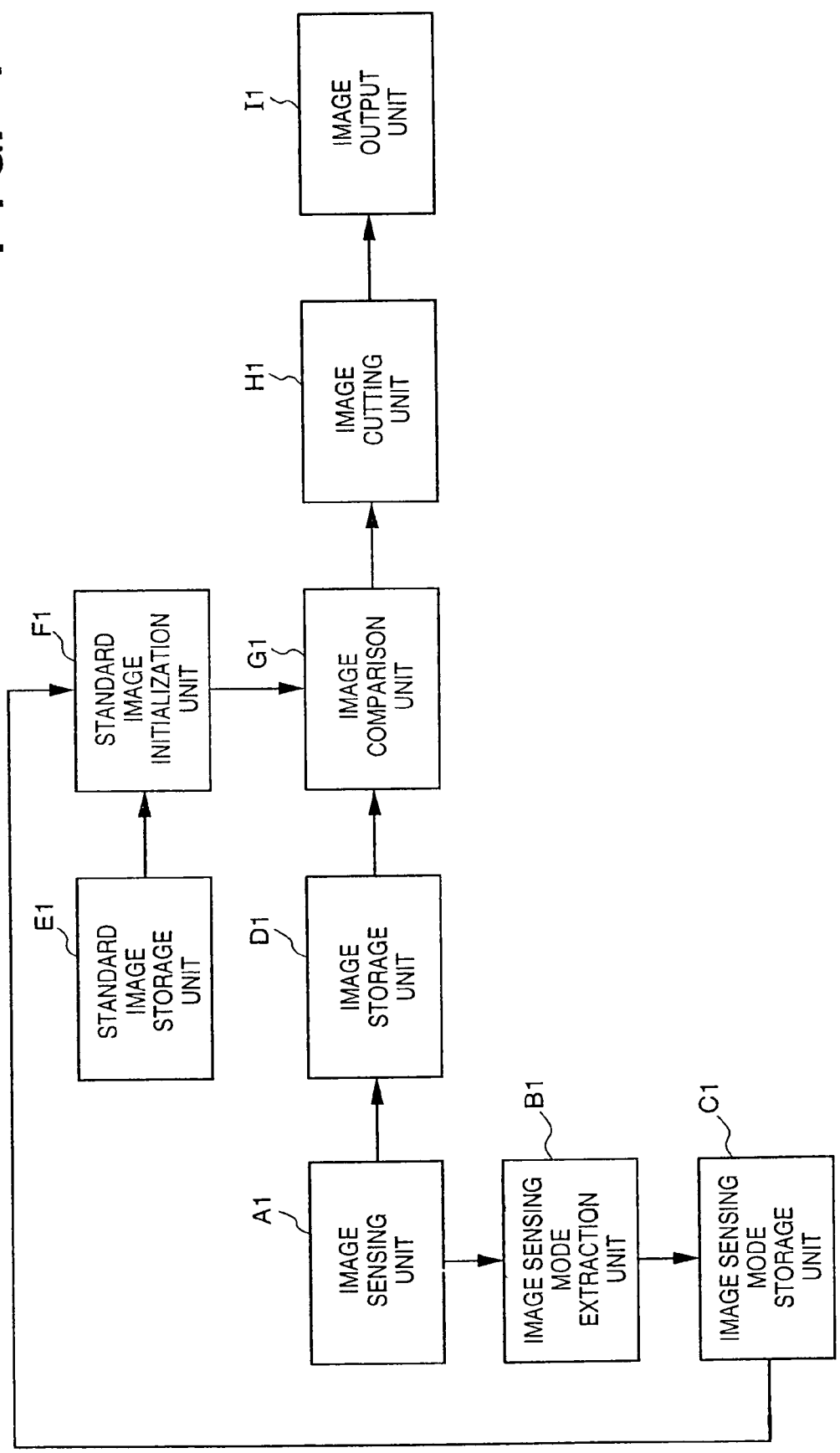
FIG. 1 is a functional block diagram showing the arrangement of principal part of an apparatus according to the present invention.

FIG. 1 is a functional block diagram showing the arrangement of principal part of an image sensing apparatus according to the present invention. Referring to FIG. 1, reference numeral A1 denotes an image sensing unit; B1, an image sensing mode extraction unit for detecting the image sensing state; C1, an image sensing mode storage unit; D1, an image storage unit; E1, a standard image storage unit; F1, a standard image initialization unit; G1, an image comparison unit; H1, an image cutting unit; and I1, an image output unit.

The image sensing unit A1 senses an object image to generate an actually taken image. The image sensing mode extraction unit B1 extracts the image sensing mode used when the image sensing unit A1 senses an object image. In this embodiment, the image sensing mode extraction unit B1 extracts at least one of a focusing signal upon image sensing, focal length data of the image sensing unit A1, and visual axis direction data and illumination light condition upon image sensing. The image sensing mode extraction unit B1 has a visual axis direction data extraction unit.

The image mode storage unit C1 stores the image sensing mode extracted by the image sensing mode extraction unit B1.

The image storage unit D1 stores the actually taken image output from the image sensing unit A1.

The standard image storage unit E1 stores a standard image to be compared with the actually taken image output from the image sensing unit A1, i.e., stores contour line data of a plurality of specific objects.

The standard image initialization unit F1 initializes the standard image on the basis of the image sensing mode extracted by the image sensing mode extraction unit B1. For example, the standard image initialization unit F1 sets the initial size of the standard image on the basis of the object distance upon image sensing or the focal length parameter of the image sensing unit A1.

The standard image initialization unit F1 also sets contour line data of the standard image as an initial contour, and sets the central position (e.g., the barycentric position) of the initial contour in the visual axis direction. In this case, the central position of the standard image is initialized in correspondence with the central position on the actually taken image generated by the image sensing unit A1 on the basis of the visual axis direction upon image sensing.

The image comparison unit G1 compares the initialized standard image initialized by the standard image initialization unit F1 with the actually taken image output from the image sensing unit A1. For example, the image comparison unit G1 uses an active contour as a contour model of the standard image, and controls the positions of the respective points on the contour image to vary on the basis of a predetermined evaluation function that assumes a minimum value when it converges to a corresponding point on the contour line of the actually taken image generated by the image sensing unit A1. Thereafter, the unit G1 calculates similarity between the contour shape upon convergence and the contour shape of the standard image, or similarity between the standard image and the intra-contour image upon convergence after the image size is normalized, so that the contour size becomes nearly equal to that of the standard image.

The image comparison unit G1 outputs image data when the similarity between the standard image and the actually taken image generated by the image sensing unit A1 is larger than a predetermined threshold value. When the above-mentioned active contour method is used, the image comparison unit G1 outputs original image data within the bounds of a contour line after the active contour converges.

The image cutting unit H1 cuts out an image on the basis of the output from the image comparison unit G1.

According to the image sensing apparatus with the above arrangement, since a specific object is detected upon comparing with the standard image which is initialized on the basis of the image sensing mode information used when the image sensing unit A1 senses an image of the object, high-speed detection of the specific object can be realized. Therefore, a desired image can be found at high speed, and an automatic image taking operation having a specific image at the center can be performed.

Since the image cutting unit H1 cuts out an image on the basis of the output from the image comparison unit G1, a specific object image can be extracted at high speed. Furthermore, since the image sensing mode extraction unit B1 extracts at least one of a focusing signal upon image sensing, focal length data of the image sensing unit A1, and visual axis direction data and illumination light condition upon image sensing, the presence/absence of an object can be discriminated on the basis of the extracted information.

In this manner, whether or not a known object is present in an image can be discriminated at high speed. Therefore, the size of an object region that may exist in an image can be appropriately set, and the calculation time required for discriminating the presence/absence of an object can be greatly shortened.

The standard image initialization unit F1 sets the initial size of the standard image on the basis of the object distance upon image sensing or the focal length parameter of the image sensing unit A1. Therefore, the size of an object region that may exist in an image can be appropriately set, and the calculation time required for discriminating the presence/absence of an object can be greatly shortened. Hence, the presence/absence discrimination processing of an object can be performed for only a region near the object position upon image sensing, and the calculation time can be further reduced.

Since the image sensing mode extraction unit B1 has the visual axis direction data extraction unit, the setting position of the central position of the standard image can be initialized on the basis of the visual axis direction upon image sensing, and the presence/absence discrimination processing of an object can be performed while limiting the search processing range in an image database to a range near the object position upon image sensing. Therefore, the calculation time required for discriminating the presence/absence of an object can be greatly shortened.

Furthermore, since the standard image storage unit E1 stores contour line data of a plurality of specific objects, the presence/absence of an object can be discriminated at high speed on the basis of the contour line data, and the calculation time required for discriminating the presence/absence of an object can be shortened.

Since the standard image initialization unit F1 sets contour line data of the standard image as an initial contour, and sets the central position of the initial contour in the visual axis direction, the calculation time required for discriminating the presence/absence of an object on the basis of contour data can be greatly shortened.

On the other hand, even when the standard image and the actually taken image have different sizes or shapes, a specific object can be detected stably. Furthermore, a specific object image can be automatically separated and extracted from the background at high speed by cutting out an image within the bounds of a contour line, thus assuring highly reliable, high speed object extraction.

An embodiment of the image sensing apparatus and object extraction method of the present invention will be described in more detail below.

Figure 2:
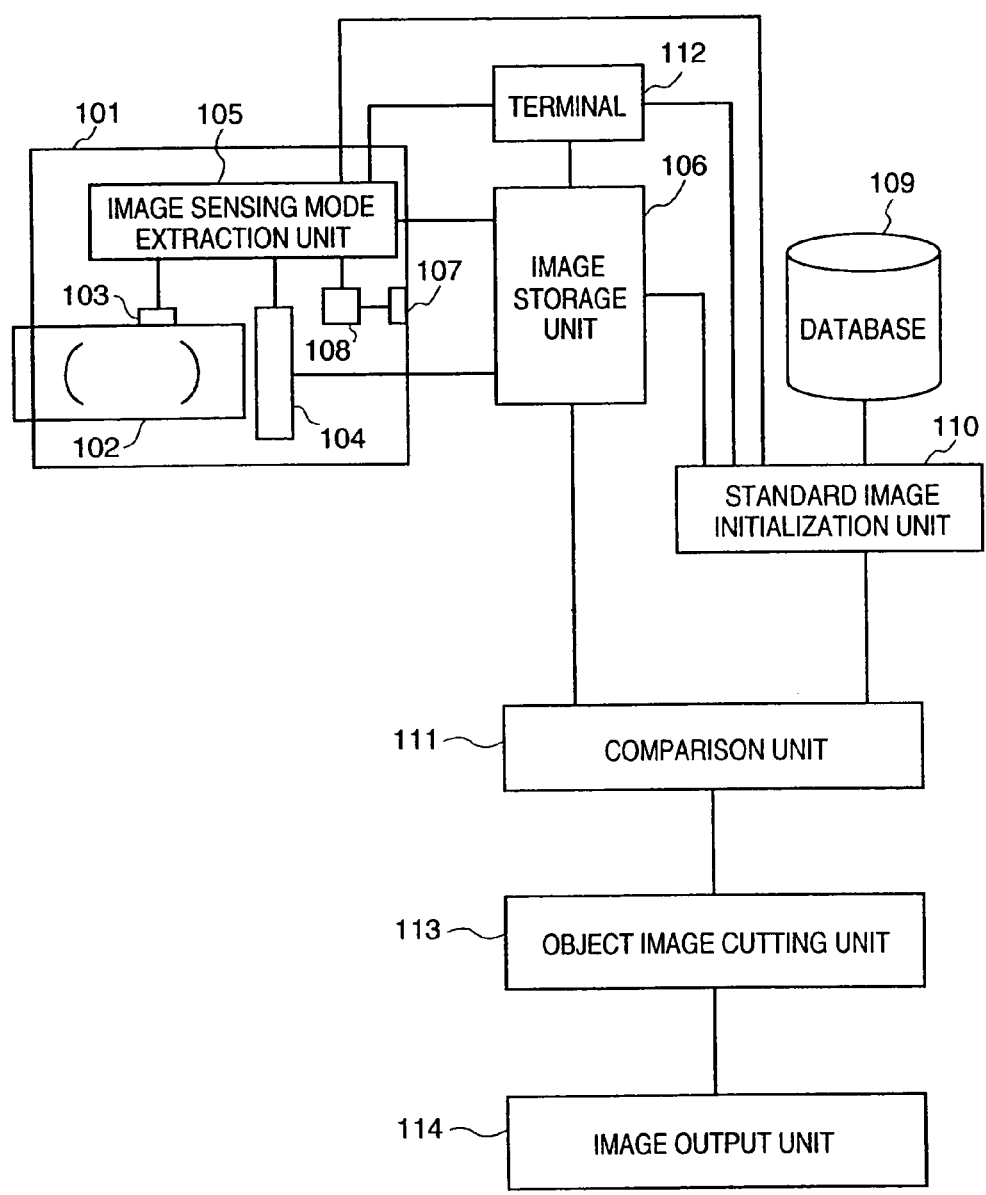
FIG. 2 is a system block diagram showing an embodiment that realizes the functions shown in FIG. 1.

FIG. 2 is a block diagram showing the system arrangement of this embodiment. Referring to FIG. 2, reference numeral 101 denotes an image sensing unit; 102, an imaging optical system including a zoom lens; 103, a lens motor drive controller; 104, a sensor; 105, an image sensing mode extraction unit; 106, an image storage unit; 107, a finder serving as a monitor; 108, a visual axis detection unit for detecting the visual axis of an operator in the finder screen; 109, a standard image database; 110, a standard image initialization unit; 111, an image comparison unit; 112, a terminal; 113, an image cutting unit; and 114, an image output unit.

Note that the image sensing unit 101 is constituted by a video camera. The image storage unit 106, the comparison unit 111, the image cutting unit 113, the image output unit 114, and the standard image initialization unit 110 are constituted by, e.g., a microcomputer, and the database 109 is a memory connected to the microcomputer. The type of memory is not limited to a specific one, and may comprise a semiconductor memory, a hard disk, or the like.

The image sensing mode extraction unit 105 receives inputs from the motor drive controller 103, the sensor 104, and the visual axis direction detection unit 108, and extracts a focusing discrimination signal based on image data, focal length information, and the visual axis direction parameter upon image sensing from these inputs.

A case will be exemplified in detail below wherein the object extraction method of this embodiment is applied to the presence/absence discrimination processing of a portrait image.

The image sensing unit 101 receives a lens driving amount (one of zooming parameters) of, e.g., a zoom lens from the lens motor driving unit 103 upon sensing an image, and looks up a conversion table between the lens driving amount and the focal length, which table is stored in the internal storage means (e.g., a ROM) of the image sensing mode extraction unit 105, thereby acquiring the estimated value of the focal length upon image taking.

Also, the image sensing unit 101 calculates the corresponding position on the image frame on the basis of the average value of data output from the visual axis direction detection unit 108 for several ten to several hundred msec before pressing the shutter button. The image sensing unit 101 stores the calculated position as the central position in the visual axis direction in a memory (not shown).

On the other hand, an image signal photoelectrically converted and output from the sensor 104 is recorded in the image storage unit 106. When the image signal is recorded in the image storage unit 106, the image signal is quantized in a predetermined format, and the above-mentioned image sensing mode parameter is recorded in the header portion. Note that the header portion may be appended to the head of each frame, or the image sensing mode parameters of all the frames may be stored in a header region together with frame numbers (or addresses).

Figure 3:
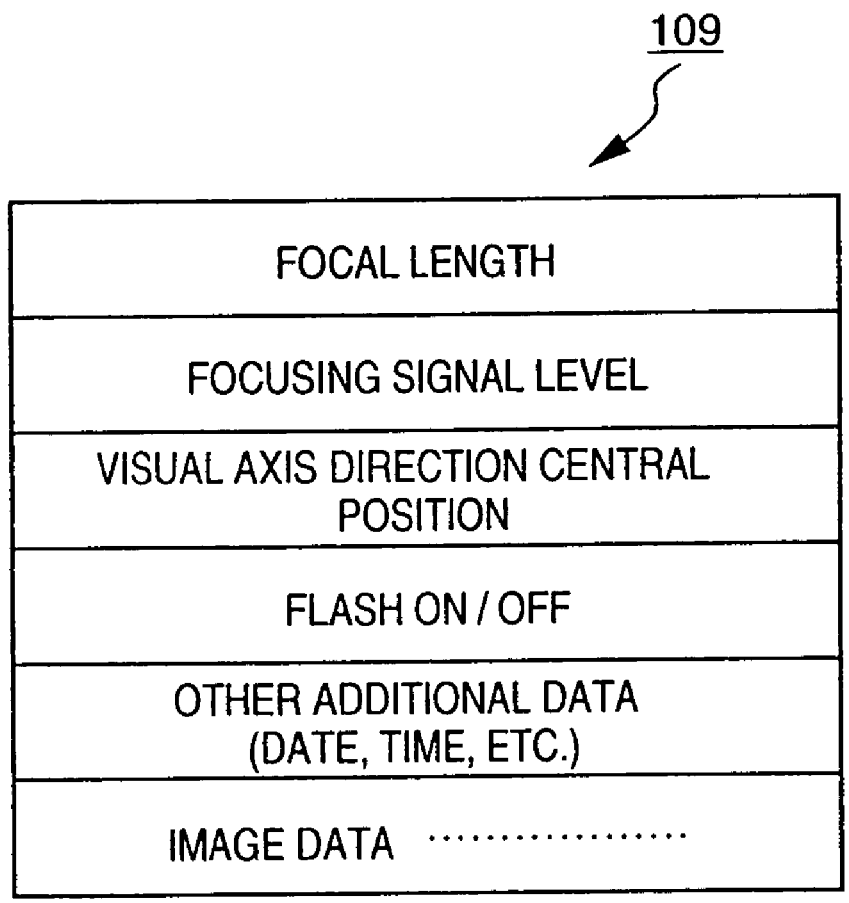
FIG. 3 is a view showing an example of the format of an image data header portion.

FIG. 3 shows an example of the header format upon recording an image signal. As can be seen from FIG. 3, the header portion records, as the image sensing mode parameters, the focal length, the level of a focal point signal that represents the degree of focusing of a focusing detection circuit (not shown), i.e., the focusing signal level, the central position of visual axis direction, flash ON/OFF information, and the like using a fixed bit length (the number of bits in FIG. 3 is merely an example).

Note that information associated with the recording format of the image sensing mode parameters, can be sent from the terminal 112 to the image sensing mode extraction unit 105 via an interface (not shown), so that the types and recording order of image sensing mode parameters can be set by the user in advance.

Note that the image data may be compressed as needed to reduce the storage information amount.

The image storage unit 106 may be built in the image sensing unit 101. Alternatively, an interface means (not shown) which is detachable from the image sensing unit 101 may be arranged, so that the image storage unit 106 is portable.

Figure 4:
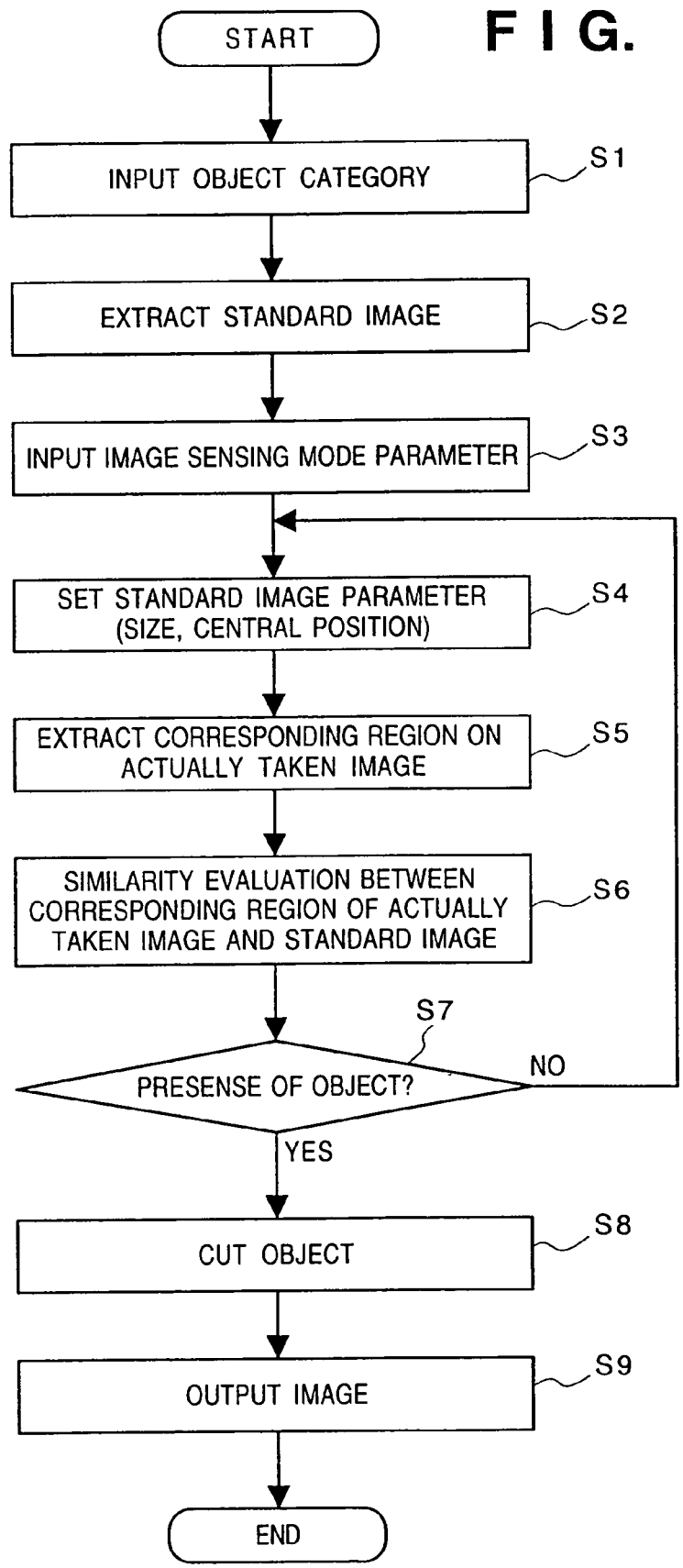
FIG. 4 is a flow chart for explaining the processing sequence or procedure of an embodiment of initialization.

FIG. 4 shows the processing flow of the principal operation of the image sensing apparatus of this embodiment. This processing flow may be stored in a ROM or the like, or may be loaded from an external storage medium to a RAM.

As shown in FIG. 4, in step S1, a search request of an image including a specific object category (assumed to be an image sensed to have a portrait image who faces the front side at the center) is input from the terminal 112.

The flow then advances to step S2, and a standard image (a front portrait image with a plain background or without any background image) corresponding to the image search request is extracted from the standard image database that stores image data, the header portion of which records image initialization data.

The flow advances to step S3, and the standard image initialization unit 110 inputs image sensing mode parameters. In this embodiment, the standard image initialization unit 110 inputs image sensing mode parameters by directly inputting image sensing mode information from the image sensing mode extraction unit 105 or reading out image sensing mode information recorded in the image header portion in the image storage unit 106.

The flow advances to step S4, and standard image parameters are set. The standard image parameters are set on the basis of the image sensing mode parameters and the object category designated by, e.g., the terminal 12, and the ranges of the size and central position of the specific object model image selected from the standard image database that may be present on an image stored in the image storage unit 106 are set.

More specifically, the in-focus object distance range is estimated from the focal length information, and the object region size that may be present on the image is set on the basis of knowledge data associated with the object distance and the object size, which data is prepared in advance. On the other hand, the central position of the object that may be present on the actually taken image is estimated from the visual axis direction data.

Note that the above-mentioned knowledge data (conversion table or conversion formula) is recorded in the header portion of the standard image. This embodiment utilizes the fact that the head sizes do not considerably differ among persons, and sets the above-mentioned size and position on the basis of the estimated value of the object distance (focusing signal level) and magnification data (focal length) using the conversion formula (coefficients) recorded in the header portion of the standard image. Note that directly inputting the image sensing mode from the image sensing unit 101 is preferable in presence/absence detection, tracing, and the like of a specific object, which are performed parallel to the image sensing operation.

For example, when f represents the focal length, dp represents the offset of the focusing signal level from the maximum value, A represents the standard size of the object, and v represents the distance from the second principal point position of the image sensing optical system to the image sensor surface, the object size, s, on the screen is given by equation (4) below (if the object distance and the focusing signal level vary linearly):

$$S=\{A(v-f)/f\}\{1+(v-f)dp/f\} \quad (4)$$

Therefore, when dp is obtained by a measurement and f is calculated by measuring the lens position or the like, an appropriate template size can be easily calculated using this conversion formula. The template size may be calculated using a special-purpose IC, or a conversion table as a function of f and dp may be stored in advance in a storage unit such as a ROM, and the corresponding value may be read out therefrom.

The processing in steps S5 and S6 executed by the image comparison unit 111 will be described in detail below. The image comparison unit 111 estimates the similarity between the initialized standard image with specified central position and size, and the corresponding region on the actually taken image.

Note that the calculation for estimating similarity can use, e.g., a correlation value, the absolute value of the difference between corresponding regions (or the square sum of differences in units of pixels), or other evaluation functions.

The flow then advances to step S7, and the similarity obtained as a result of the processing in step S6 is compared with a predetermined threshold value to discriminate the presence/absence of the object. In the presence/absence discrimination processing of the object, if a predetermined condition is satisfied (equal to or larger than the threshold value in the case of the correlation method; equal to or smaller than the threshold value in the case of the difference method), it is determined that the designated object is present in the actually taken image.

In particular, in the case of the image sensing apparatus of this embodiment, since the central position (barycentric position) of the head portion region is set to be the representative central value position of the object image region, detection errors can be suppressed, and the calculation time can be shortened. In this case, the similarity between the initialized background-less standard image and the corresponding actually taken image region is calculated as follows.

More specifically, processing for extracting and cutting out pixels that belong to a region corresponding to the standard image from the actually taken image is performed in step S5 above. This processing can be easily attained by extracting a region inside an outer contour line set at the central position of the standard image.

In step S6, the square sum of difference values between the image in the cut out region and the standard image is calculated. In general, since both the central position and contour shape of the object include errors, the central position must be set within a given range, and the position with the highest similarity must be searched for.

Similarly, the difference between the contour shapes of the standard image and the actually taken image is coped with by searching for an optimal size of the standard image within a given range. More specifically, the difference (similarity) of the shape itself is ignored, and an optimal value of the size parameter is calculated so that the size of the head portion is closest to that of the actual image.

In this case, the standard image initialization unit 110 sets the initial values used for searching for optimal values of the size and central position parameters on the basis of the image sensing mode parameters. Finally, if the value of the similarity corresponding to the standard image size and central position that give a maximum similarity is smaller (in the case of the similarity based on the difference method) or larger (in the case of the correlation method) than a predetermined threshold value, it is determined that an object of the designated category is present in the actually taken image.

On the other hand, the cutting operation of a desired object by the cutting unit 113 is realized by extracting a region in the actually taken image within an outer contour line approximated by the contour of standard image having the optimal central position and size obtained as a result of the above-mentioned processing. Note that image data used upon calculating similarity is not limited to luminance level data, but hue data may be used together to improve the reliability.

Another processing example in the image comparison unit 111 in the image sensing apparatus of the present invention will be described below. In this embodiment, only outer contour line data that represents an object category is used as standard image data, and the active contour method (M. Kass, A. Witkin, and D. Terzopoulos, "Snakes: Active Contour Models," *International Journal of Computer Vision*, pp. 321–331, 1987) is applied to the processing in the image comparison unit 111. The active contour method is a technique for calculating a contour line u(s) that minimizes the following evaluation function with respect to a contour line given by u(s)=(x(s), y(s)) using a distance s along the contour line:

$$E=\int_0^u E_1(V(s))+w_0 E_0(V(s))ds \quad (5)$$

Examples of $E_1$ and $E_0$ are:

$$E_1(V(s)) = \alpha(s)\left|\frac{du}{ds}\right|^2 + \beta(s)\left|\frac{d^2 u}{ds^2}\right|^2$$

$$E_0(V(s))=-|\Delta I(u(s))|^2$$

$\alpha(s)$, $\beta(s)$, and $w_0$ are appropriately determined by the user. In this embodiment, a technique for obtaining the contour line of a given object by minimizing a given evaluation function defined in association with contour lines will be called the active contour method.

The optimal values of the size and central position of the standard image are set based on the image sensing mode information upon image sensing as in the above embodiment. In this embodiment, especially, it is desirable to set the size of the initial contour not to be smaller than the actual contour size.

For this purpose, the average value of the object sizes may be multiplied with its variance β (β>1; arbitrarily set by the user) to obtain the initial value of the image size. The presence/absence of a specific object is discriminated on the basis of the similarity between the shape of the finally converged contour line and the standard contour line model.

As an example of similarity, in the case of a portrait image, a region inside the standard contour line that gives an optimal central position and size is defined to be a first silhouette. Similarly, the second silhouette in the corresponding region in the actually taken image is set, and the two obtained silhouette images are ANDed, i.e., subjected to overlapped area calculation processing, so that the similarity may be discriminated based on the calculated area (the number of pixels of the first pixel value).

As another example of similarity, similitude may be calculated. In this case, after the central position is set to be an optimal value, a polar coordinate system (γ, θ; γ: distance from the origin, θ: angle) is set at the central position, and coordinates (γ, θ) of the respective points on the contour line are calculated.

Figure 5:
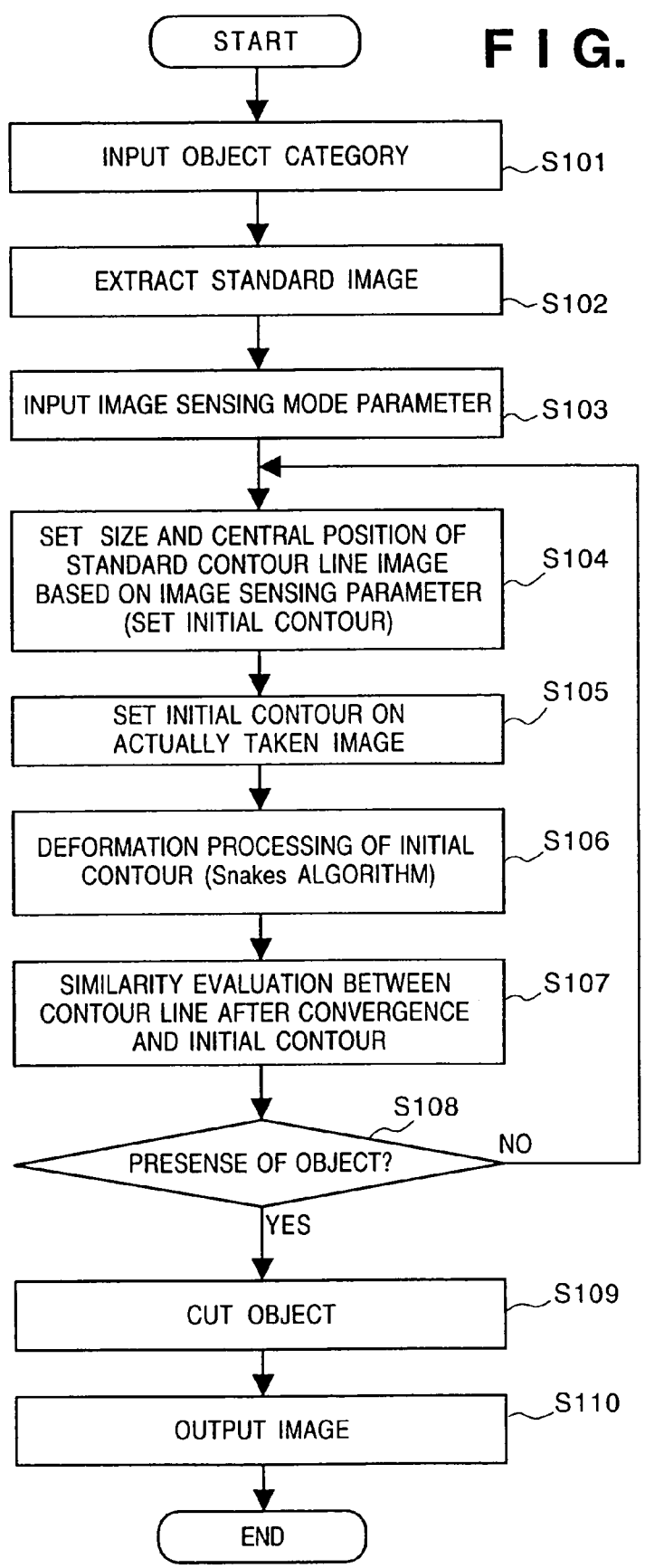
FIG. 5 is a flow chart for explaining another processing sequence of the embodiment of initialization.

Then, the γ values of the respective points are normalized by a maximum distance from the origin. The similarity (e.g., the correlation value) between two waveform data (γ, θ) after normalization generally serves as a measure for the similitude between the contour shapes. FIG. 5 shows the processing flow of the above-mentioned operation.

As shown in FIG. 5, in step S101, an object category is designated or selected and input using the terminal or a predetermined input device. The flow advances to step S102, and a standard contour line image of the input category is extracted from the standard image database.

The flow advances to step S103, image sensing mode parameters (focal length, focusing signal level, visual axis direction, and the like) are input by the standard image initialization unit 110.

In step S104, the size and central position of the standard contour line image of the corresponding category are set on the basis of the image sensing mode parameters.

The flow advances to step S105, and an initial standard contour line is set on the actually taken image on the basis of the setting result in step S104.

The flow advances to step S106, and deformation movement processing (Snakes algorithm) of the initial contour is executed on the basis of the active contour algorithm.

In step S107, the similarity between the contour line image after convergence and the initialized standard contour line image is evaluated.

The flow then advances to step S108, the similarity evaluated in step S107 is compared with a predetermined threshold value, thus discriminating the presence/absence of a specific object. As a result of discrimination in step S108, if an object is not detected, the flow returns to step S104.

If the object is detected, the flow advances to step S109, and object cutting processing is performed. The flow then advances to step S110, and image output processing is performed.

Another example of initialization in the object extraction method of the present invention will be explained below.

In this embodiment, object color prediction associated with the representative color of a specific object is performed in accordance with or without the use of a flash device upon image sensing, and a region in an image having color information within possible color parameter range is extracted based on the prediction result.

Furthermore, initialization data (size, color component) of a standard image is set on the basis of object distance information upon image sensing. Note that the initial setting of the color component means converting a color component of a representative color region in an object standard image to have a representative color component predicted from an illumination light condition.

Note that the R, G, and B color components of an object are respectively given by equations below using the average spectral reflectance $Q(\lambda)$, the spectral distribution $S(\lambda)$ of a light source such as a flash device, and color matching functions $r(\lambda)$, $g(\lambda)$, and $b(\lambda)$ as functions of the wavelength $\lambda$:

$$R = \int_\lambda Q(\lambda)S(\lambda)r(\lambda)d\lambda$$

$$G = \int_\lambda Q(\lambda)S(\lambda)g(\lambda)d\lambda$$

$$B = \int_\lambda Q(\lambda)S(\lambda)b(\lambda)d\lambda \qquad (6)$$

The spectral reflectance of an object generally differs depending on materials that constitute the object, but the ranges of object color components in the RGB space can be statistically estimated. For the sake of simplicity, the ranges of the respective components are defined to be $(R-\alpha\sigma_R, R+\alpha\sigma_R)$, $(G-\alpha\sigma_G, G+\alpha\sigma_G)$, and $(B-\alpha\sigma_B, B+\alpha\sigma_B)$ to have $(R, G, B)$ as their centers using the average spectral reflectance $Q(\lambda)$ and variances $\sigma_R$, $\sigma_G$, and $\sigma_B$ which are known in advance.

Note that α above is an arbitrary constant. The way of defining the color component ranges to be predicted is not the primary object of the present invention, but may use other methods (e.g., setting in a hue space).

Figure 6:
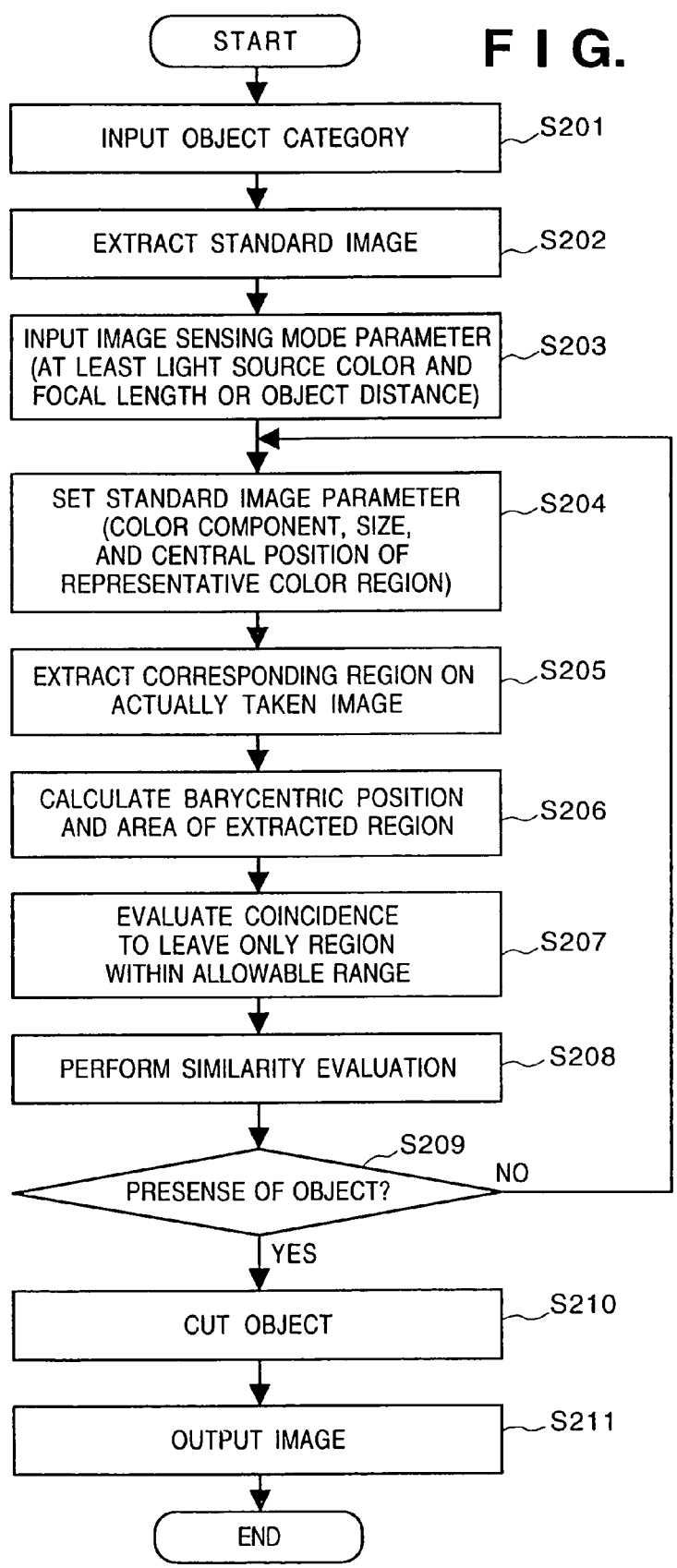
FIG. 6 is a flow chart for explaining still another processing sequence of the embodiment of initialization.

FIG. 6 shows the characteristic processing flow upon searching for (or extracting) a specific object in this embodiment.

In step S201, an object category is designated or selected and input via the terminal or a predetermined input device. In step S202, a standard image is extracted.

The flow advances to step S203, and image sensing mode parameters are input. In this case, at least the light source color and the focal length or object distance are input.

The flow advances to step S204, and the standard image initialization unit 110 performs color component estimation of a representative color region in the standard image of the corresponding category and image size setting on the basis of the input image sensing mode parameters. Note that the representative color region is determined in advance for respective object categories.

The flow advances to step S205, connected regions having a given color component present in the representative color estimated range or image regions in the outer contour lines of the connected regions are extracted from the actually taken image.

The flow then advances to step S206, the barycentric positions and areas (or circumscribed rectangular region sizes) of the extracted regions are calculated.

The flow advances to step S207, processing for leaving only a region within an allowable range is performed by evaluating matching between the area or size condition and the estimated size of the object (this processing may be excluded to attain high-speed processing or to cope with a case wherein object images are sensed overlapping each other).

The flow advances to step S208, similarity with the initialized standard image is evaluated to have the barycentric position of each region as the centers.

Thereafter, the flow advances to step S209 to discriminate the presence/absence of the object. The presence/absence of the object is discriminated by comparing the evaluation value of the similarity and a predetermined threshold value. As a result of the presence/absence discrimination of the object, if the object is not present, the flow returns to step S204; otherwise, the flow advances to step S210 to cut the object image.

Thereafter, the flow advances to step S211 to output the image. For example, when it is determined if a person is present in a given color image, processing based on color prediction using skin color corresponding to the illumination light condition as a representative color can be performed. In this embodiment, the object central position may also be estimated on the basis of the visual axis direction data. However, even when the object central position is not detected in advance, sufficiently high-speed processing can be attained unless there are many regions falling within the predicted color vector (hue vector) range.

If there are many regions falling within an identical color component range, the size in the image is estimated using the magnification and object distance information upon image sensing, and regions in which the difference between the connected region size having an identical color component range and its estimated value becomes larger than a predetermined threshold value may be excluded. In this manner, by limiting the existence range of the object, the presence absence of the object can be discriminated at high speed, or the object can be extracted.

In this embodiment, the actually taken image or standard image may be segmented into blocks, and the representative luminance levels and representative color components may be calculated in units of blocks to obtain a mosaic image. Thereafter, a series of processing operations may be performed. In this case, the processing time can be further shortened.

Another example of extraction in the object extraction method of the present invention will be explained below.

Figure 7:
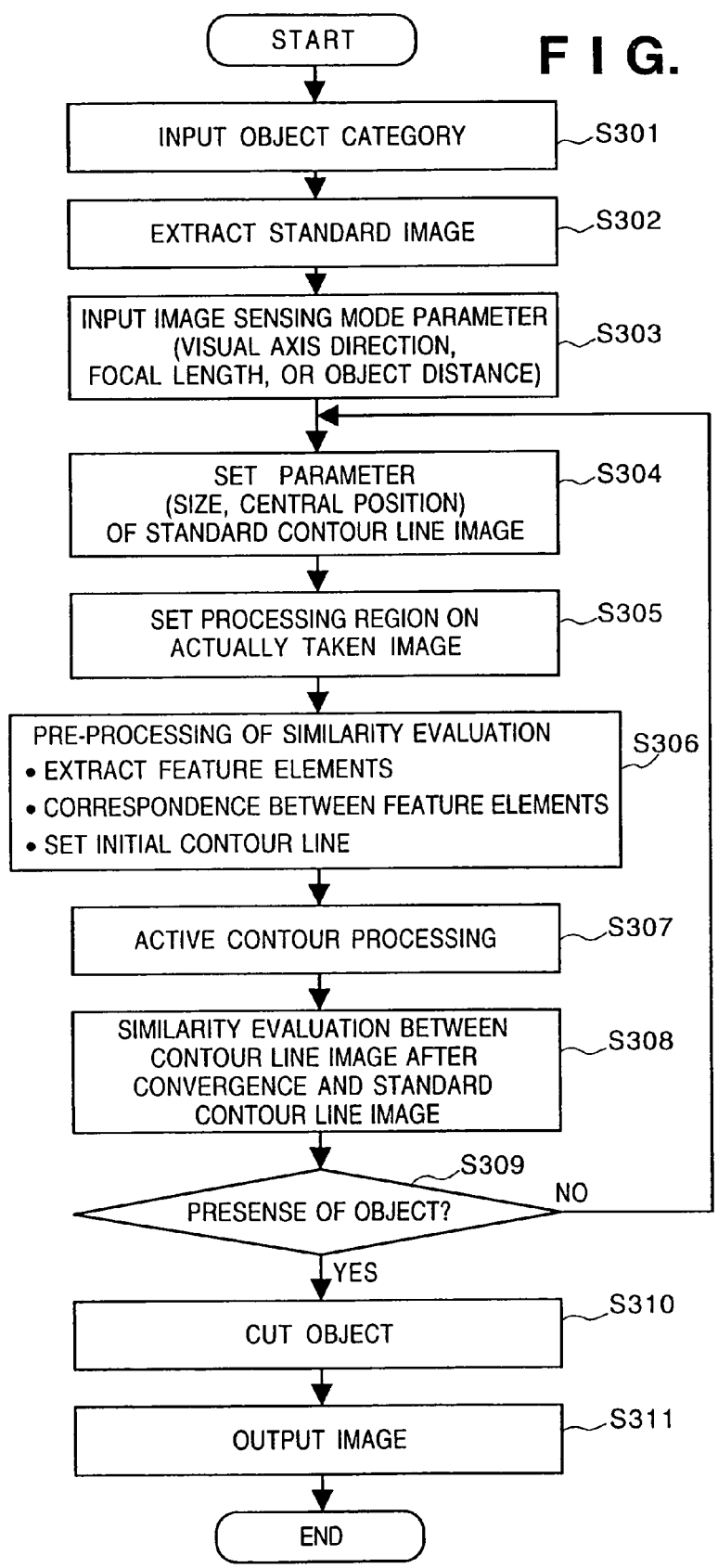
FIG. 7 is a flow chart for explaining still another processing sequence of the embodiment of initialization.

FIG. 7 shows the main processing flow of this embodiment. In step S301, an object category is input.

In step S302, a standard contour line is extracted.

In step S303, image sensing mode parameters such as the visual axis direction, the focal length, the object distance, or the like are input.

In step S304, standard contour line image parameters (size, central position) are set.

In step S305, a processing region on an actually taken image is set.

In step S306, pre-processing for evaluating similarity is performed. The pre-processing includes processing for setting feature elements (crossing pattern, line segments, curve elements), correspondences among feature elements, an initial contour line, and the like.

In step S307, active contour processing is performed. In step S308, the similarity between the contour line image after convergence and the standard contour line image is evaluated.

The flow then advances to step S309 to discriminate the presence/absence of the object. As a result of discrimination, if the object is not present, the flow returns to step S304 to repeat the above-mentioned operation.

If it is determined as a result of discrimination in step S309 that the object is present, the flow advances to step S310 to cut out the object. Thereafter, the flow advances to step S311 to perform image output processing, thus ending a series of processing operations.

As described above, in this embodiment, the processing region is limited on the basis of the image sensing mode parameter (the region may be limited by the method of any of the above embodiments). As feature elements in the limited region, crossing patterns such as L, T, X patterns, and the like, or line segments and curve elements are detected.

Of these feature elements, the crossing patterns such as L, T, X patterns and the like are those shown in the pattern explanatory view of FIG. 8, and the extraction method of the crossing patterns is described in detail in, e.g., Deriche, R. and Giraudon, G. (*International Journal of Computer Vision*, Vol. 10, pp. 101=124, 1993), Rohr, K. and Schnoerr, C. (*Image and Vision Computing*, Vol. 11, pp. 273–277, 1993), Iso and Shizawa (*The Institute of Electronics, Information and Communication Engineers technical report*, Vol. IE92–125, pp. 33–40, 1993), and the like.

The extraction method of curve elements is described in detail in, e.g., Koenderink, J. and Richards, W. (*Journal of Optical Society of America*, Vol. A-5, pp. 1136–1141, 1988), Li, S. Z. (*International Journal of Computer Vision*, Vol. 5, pp. 161–194, 1990), and the like.

Then, these feature elements are defined to be control points (fixed point region) of the already processed active contour. In this case, although the size of an initial contour can be similarly set on the basis of the image sensing mode parameter, the position of the initial contour is aligned so that feature elements on the standard image match those of an image supplied from the image storage unit within a predetermined allowable range (e.g., the types of corresponding feature elements match each other, and the distance between elements is equal or smaller than a predetermined value). This embodiment is particularly effective for accurate, high-speed cutting processing when the object shape has an acute angle.

According to this embodiment that initializes a standard image, since a specific object is detected by comparing with a standard image initialized on the basis of image sensing mode information upon sensing an image of an object by the image sensing unit, the specific object can be detected at high speed. Therefore, a desired image can be searched for at high speed, and an automatic image taking operation having a specific object as the center can be realized.

Also, since the image cutting means cuts an image on the basis of the output from the image comparison unit, a specific object can be cut at high speed.

Since at least one of a focusing signal upon image sensing, focal length data of the image-sensing unit, and visual axis direction data and illumination light condition upon image sensing is extracted, the presence/absence of a specific object can be discriminated on the basis of the extracted information, and whether or not a known object is present in an image can be discriminated at high speed. Therefore, the size of an object region that may be present in the image can be appropriately set, and the calculation time required for discriminating the presence/absence of the object can be greatly shortened.

Since the initial size of the standard image is set on the basis of the object distance upon image sensing or the focal length parameter of the image sensing unit, the size of an object region that may be present in the image can be appropriately set, and the calculation time required for discriminating the presence/absence of a specific object can be shortened. Hence, the presence/absence discrimination processing of the object can be performed for only a region near the object position upon image sensing, and the calculation time can be further shortened.

Since the central position of the standard image is initialized on the basis of the visual axis direction upon image sensing, the presence/absence discrimination processing of a specific object can be performed while limiting the search processing range in the image database to a region near the object position upon image sensing, and the calculation time required for discriminating the presence/absence of the object can be greatly shortened.

Since contour line data of a plurality of specific objects are stored in the standard image storage unit, the presence/absence of a specific object can be discriminated at high speed using the contour line data, and the calculation time required for discriminating the presence/absence of the object can be shortened.

Since the contour line data of the standard image is set as an initial contour, and the central position of the initial contour is set in the visual axis direction, the calculation time required for discriminating the presence/absence of a specific object using the contour line data can be greatly shortened.

Since an active contour is used as a contour model of the standard image and is controlled to be varied on the basis of a predetermined evaluation function, and the similitude between the contour shape after convergence and the contour shape of the standard image or the similarity between the image inside the convergent contour and the standard image by normalizing the image size so that the contour size nearly equals that of the standard image is calculated, a specific object can be stably detected even when the standard image and actually taken image have slightly different sizes and shapes.

Since image data is output when the similarity value between the standard image and the actually taken image generated by the image sensing unit is larger than a predetermined threshold value, a desired object image can be automatically separated and extracted at high speed by cutting out the image in the contour line, and highly reliable object extraction can be attained at high speed.

Since original image data in the contour line after the active contour converges is output, highly reliable object extraction utilizing image sensing information can be performed at high speed.

<Example Using Images with Different Image Sensing Conditions>

Another embodiment of an image sensing apparatus according to the present invention will be described below with reference to the accompanying drawings.

Figure 9:
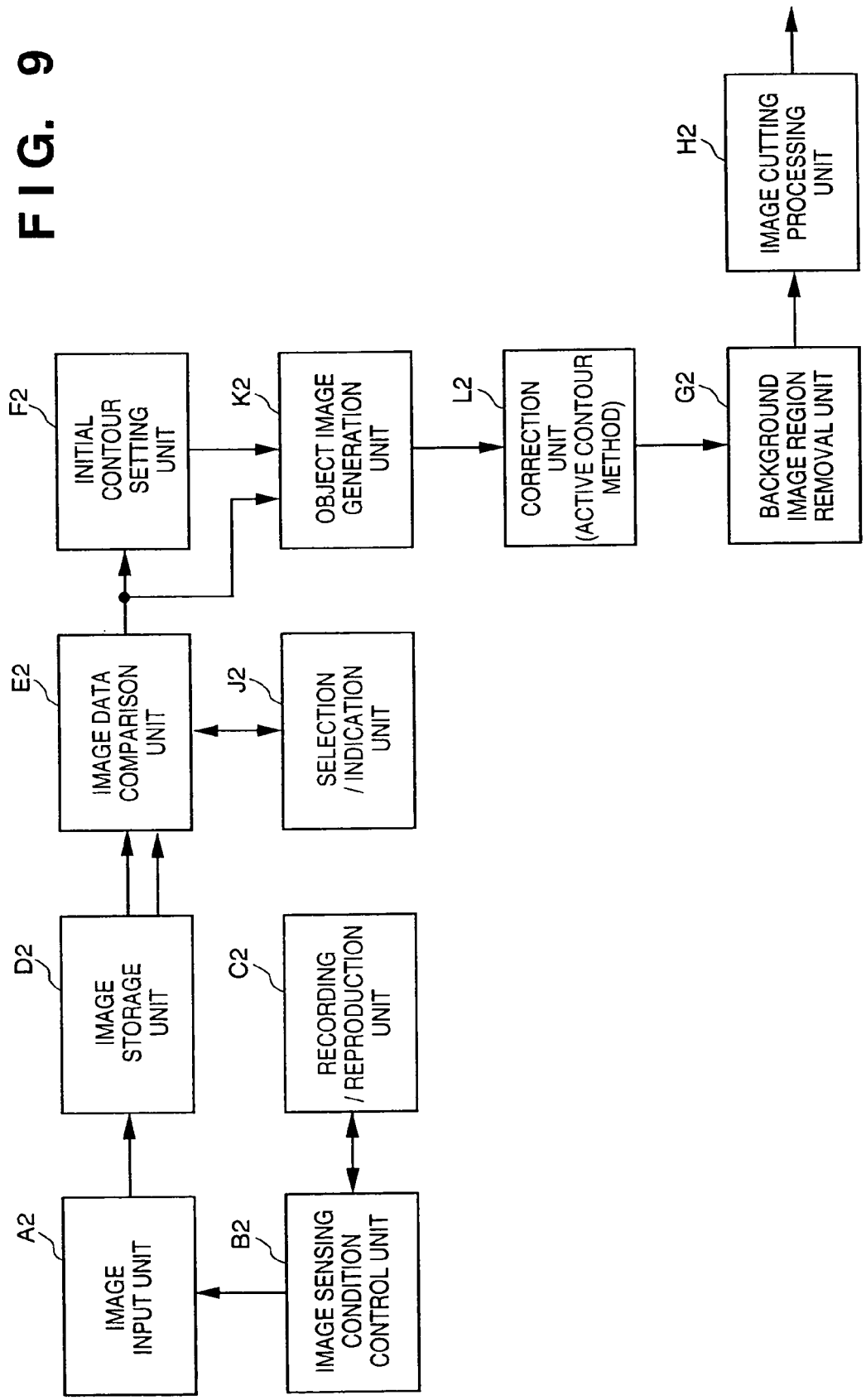
FIG. 9 is a functional block diagram showing another arrangement of principal part of an apparatus according to the present invention.

FIG. 9 is a functional block diagram showing another arrangement of principal part of an image sensing apparatus according to the present invention. Referring to FIG. 9, reference numeral A2 denotes an image input unit; B2, an image sensing condition control unit; C2, a recording/reproduction unit; D2, an image storage unit; E2, an image data comparison unit; F2, an initial contour setting unit; G2, a background image region removal unit; H2, an image cutting processing unit; J2, a selection/indication unit; K2, an image generation unit; and L2, a correction unit.

The image input unit A2 senses and inputs a plurality of images under different image sensing conditions.

The image sensing condition control unit B2 controls the image sensing condition of the image input unit A2. Note that the image sensing condition of the image input unit A2 is, e.g., the focusing state or in-focus level of an image.

The image sensing condition control unit B2 controls the layout of an imaging optical system arranged in the image input unit A2. The image sensing condition control unit B2 sets the control width on the basis of the statistical amount of a plurality of images.

The recording/reproduction unit C2 records and reproduces the image sensing conditions of the image input unit A2.

The image storage unit D2 stores an image sensed by the image input unit A2.

The image data comparison unit E2 compares at least a pair of image data of a plurality of images stored in the image storage unit D2, and outputs difference data of the plurality of images as a comparison result.

The initial contour setting unit F2 sets an initial contour on the basis of the comparison result of the image data comparison unit E2, and comprises a representative point sequence extraction processing unit (not shown) for performing processing for extracting a representative point sequence of difference data output from the image data comparison unit E2, and processing for extracting a representative point sequence of difference data in a local region.

The initial contour setting unit F2 comprises a recursive setting means (not shown) for recursively setting a local region having, as the center, a predetermined point in the difference data.

Furthermore, the initial contour setting unit F2 comprises a contour point position search unit (not shown) for searching for a contour point position in a local region having, as its center, a predetermined point which is located near the boundary between the background image region and the object to be cut out, and is present in the region of the object to be cut out, and also searching for a contour point position in a local region having, as its center, a predetermined point which is located near the boundary between the background image region and the object to be cut out, and is present in the background image region, and a contour tracing unit (not shown) for performing contour tracing with the contour point as the start point. Furthermore, the initial contour setting unit F2 comprises another contour tracing unit for performing contour tracing with the contour point position obtained by the contour point position search unit as the start point.

The background image region removal unit G2 removes a background image region within the initial contour set by the initial contour setting unit F2 or a background image region in the initial contour corrected by the correction unit L2. The background image region removal unit G2 comprises a deformation/movement unit (not shown) for deforming and moving the contour on the basis of a predetermined evaluation function value, and a convergence discrimination unit (not shown) for performing convergence discrimination on the basis of the evaluation function value.

The image cutting processing unit H2 performs image cutting processing on the basis of the output from the background image region removal unit G2.

The selection/indication unit J2 selects and indicates image data to be compared by the image data comparison unit E2.

The image generation unit K2 generates an image including the object of interest on the basis of the initial contour data set by the initial contour setting unit F2.

The correction unit L2 corrects the initial contour and image data in the initial contour.

As described above, according to the image sensing apparatus with the above arrangement, since the initial contour is set on the basis of the comparison result of a plurality of images having different image sensing conditions, and the background image region is removed on the basis of the initial contour, a specific object image can be stably extracted at high speed. Prior to extraction of a specific object by performing image processing, an approximate contour line (a boundary line with a background) of the object can be stably obtained at high speed on the basis of a plurality of images having different image sensing conditions, and the calculation time required for removing the remaining background image region can be greatly shortened.

According to another feature of this embodiment, since the initial contour approximate to the contour line of the object to be extracted from the active contour processing is set on the basis of a plurality of images having different image sensing conditions, automatic extraction of a specific object and moving image extraction of a moving object can be performed at high speed. Hence, by processing for deforming and moving the approximate contour line, dynamic object extraction from a moving image can be performed, and high-speed image extraction can be attained.

According to still another feature of this embodiment, since the initial contour data extracted from a plurality of images having different image sensing conditions can be appropriately set by interactively correcting it, a specific object can be extracted with high precision. Using the correction unit for the approximate contour line, the background removal processing can be stabilized, and the image extraction precision can be improved.

According to still another feature of this embodiment, an approximate contour line can be stably obtained from two images having different focusing states without being influenced by, e.g., the illumination condition, and the image extraction precision and the processing speed can be remarkably improved.

According to still another feature of this embodiment, when an approximate contour line (the boundary line with the background) of a specific object is extracted from a plurality of images having different image sensing conditions, the influence of noise owing to binarization, smoothing, and the like can be reduced, and the extraction precision can be improved.

According to still another feature of this embodiment, since the control amount of the image sensing condition is set on the basis of the statistical feature of image data, the extraction precision of the initial contour can be improved, and high-speed, high-precision image extraction can be realized.

According to still another feature of this embodiment, the influence of image data of the background portion or its variations can be eliminated, and stable image extraction can be attained at high speed.

According to still another feature of this embodiment, information indicating the positions of a specific object and the background with respect to the contour line tracing direction can be obtained in advance, and as a result, the image attributes of the object to be extracted and the background which are located adjacent to the contour line can be extracted, thus improving the setting precision of the contour line and the image extraction precision.

The arrangement and operation of the image sensing apparatus of this embodiment will be described in more detail below with reference to the accompanying drawings.

The first embodiment that uses images having different image sensing conditions will be explained. In this embodiment, as the control of the image sensing condition for image extraction, the focusing state is controlled by controlling the layout of the imaging optical system under the condition that the magnification is constant.

Figure 10:
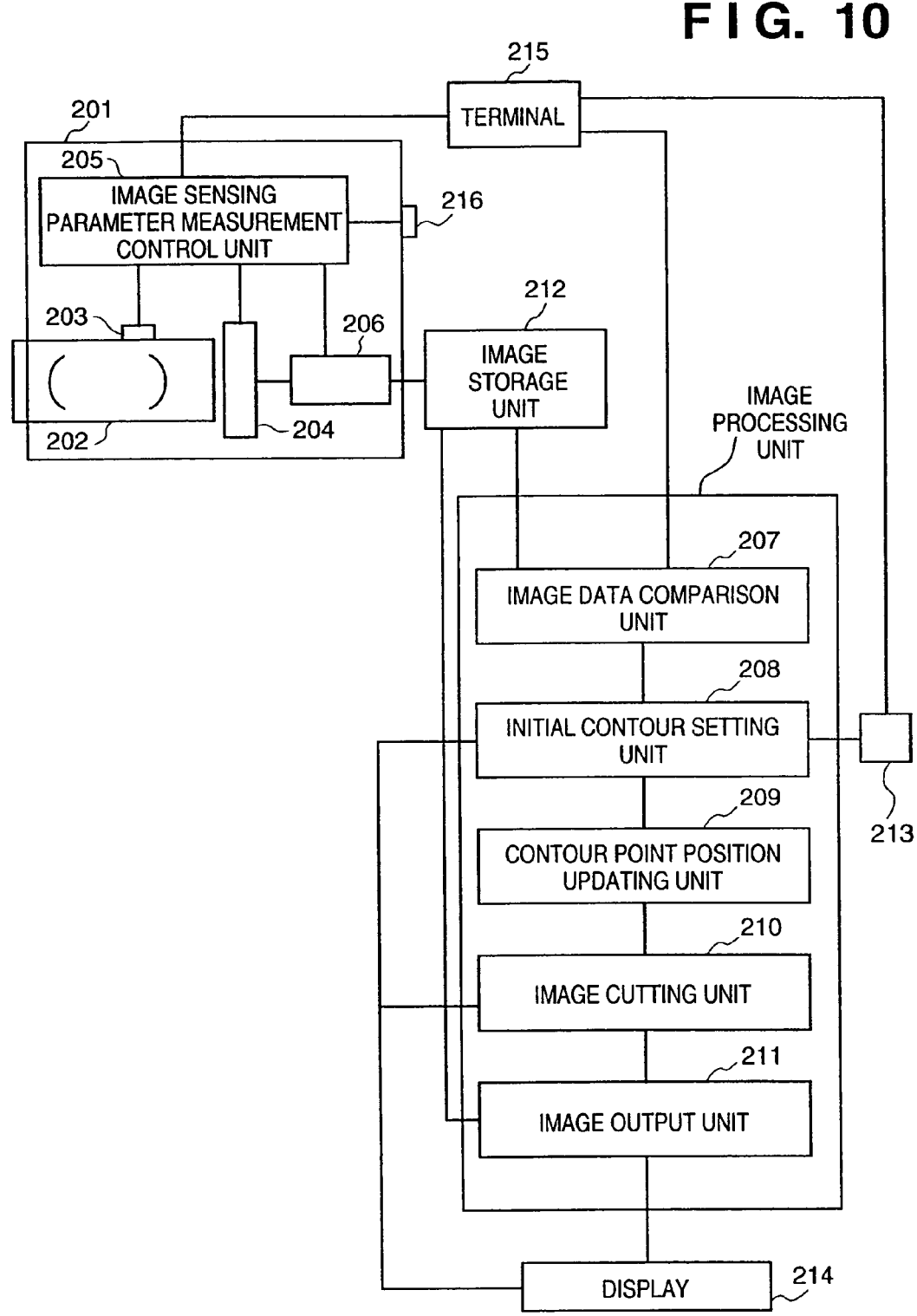
FIG. 10 is a system block diagram showing an embodiment that realizes the functions shown in FIG. 9.

FIG. 10 is a block diagram showing the arrangement of principal part of a system of this embodiment. Reference numeral 201 denotes an image sensing unit arranged as the image input unit; and 202, an imaging optical system. Reference numeral 203 denotes a drive control unit for the imaging optical system. The unit 203 comprises a zoom motor, a focusing motor, a stop system control system, a shutter speed control unit, and the like.

Reference numeral 204 denotes an image sensor (typically, a CCD image sensing element); and 205, an image sensing parameter measurement control unit, which comprises a lens layout measurement unit (not shown; e.g., a counter unit for counting the number of drive pulses of a lens motor or a lens position detection unit) of the imaging optical system 202, a focusing state detection unit (not shown). Note that the focusing state may be detected by image processing.

Reference numeral 206 denotes an image temporary storage unit for temporarily storing images having different image sensing conditions. Reference numeral 207 denotes an image data comparison unit for obtaining difference data between two images having different focusing states.

Reference numeral 208 denotes an initial contour setting unit, which has a processing unit that performs smoothing, binarization with a predetermined threshold value, line thinning, or the like, and generates a closed contour line in a predetermined region corresponding to an object indicated by the system and the user of the image data comparison unit 207. In this case, the contour line need not always accurately separate the object from the background.

Reference numeral 209 denotes a contour point position updating unit for updating the sampling point position on the contour so as to minimize the value of an evaluation function given by, e.g., equation (1) above. Reference numeral 210 denotes an image cutting processing unit for generating an image data file obtained by encoding an image in the region to be extracted in a predetermined format on the basis of the active contour processing result in the image cutting processing unit.

Reference numeral 211 denotes an intra-contour image output unit for outputting the object image separated from the background. Reference numeral 212 denotes the image storage unit for temporarily holding the image output from the image sensing unit 201.

Reference numeral 213 denotes a selection/indication unit for selecting and indicating the initial contour on the screen of a display unit 214. The unit 213 comprises a mouse or the like. Note that the correction sequence will be explained in the following description of the processing flow. Reference numeral 215 denotes a data input terminal used for, e.g., controlling the image sensing condition. The image sensing unit 201 has a shutter, a stop, an image sensing start switch, a power switch, an external synchronization unit, and the like in addition to the above-mentioned components.

In this embodiment, especially, the image sensing unit 201 has an image sensing mode setting switch 216, which can set an object extraction mode or a standard image sensing mode. In the object extraction mode, when the image sensing operation is started using, e.g., a shutter release button, an in-focus image (a high-resolution image to be cut) and a low-resolution image (out-of-focus image) of an object are automatically successively sensed. Note that a plurality of low-resolution images may be sensed under different conditions.

Upon completion of the plurality of image sensing operations, the object extraction mode is automatically canceled, or the standard image sensing mode is set by the image sensing mode setting switch 216. Note that the above-mentioned operations for setting and canceling the image sensing mode may be performed at the terminal 215.

Figure 14:
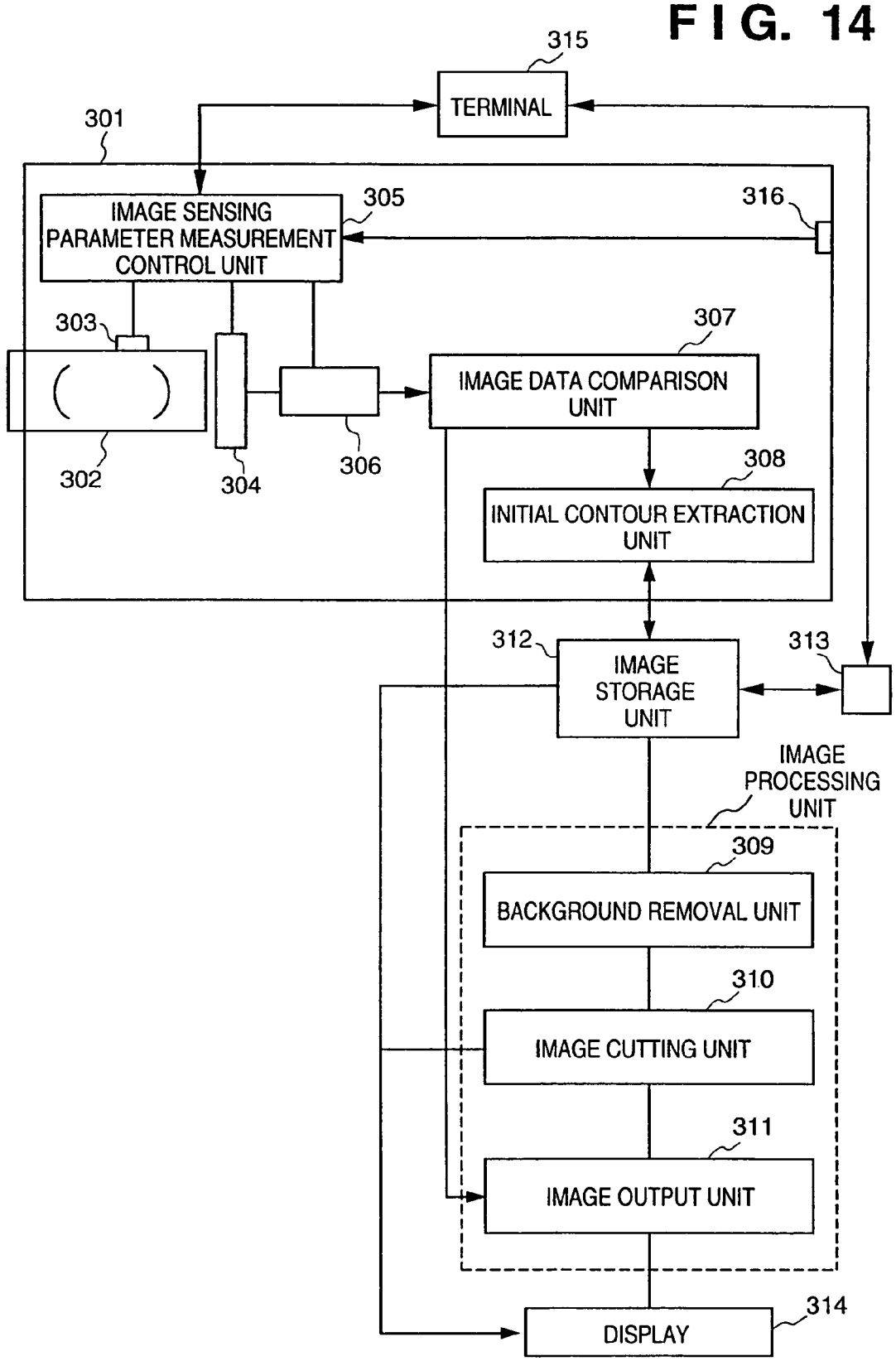
FIG. 14 is a block diagram showing another system arrangement of the present invention.

As shown in FIG. 14, an image-sensing unit 301 may incorporate an image data comparison unit 307 and an initial contour extraction unit 308. In FIG. 14, the initial contour extraction result is transferred to an external image storage unit 312, so that an image processing unit performs the rest of processing operations.

The initial contour can be corrected by data input/output operations between the image storage unit 312 and the initial contour extraction unit in the image sensing unit 301 via a communication unit (not shown) and a selection/indication unit 313 (a mouse or the like).

As another arrangement, the processing result is output from the initial contour extraction unit 308 in FIG. 14 to an image temporary storage unit 306, which is constituted as a detachable recording medium (a tape medium, an optical disk medium, or the like), so that the temporary processing result of the extracted initial contour is recorded in the image temporary storage unit 306. Thereafter, the result is input to the external image storage unit 312, so that processing for image cutting (to be described later) may be performed by a special-purpose or versatile calculation means (an image processing unit, a software program running on a terminal, or the like).

Figure 11:
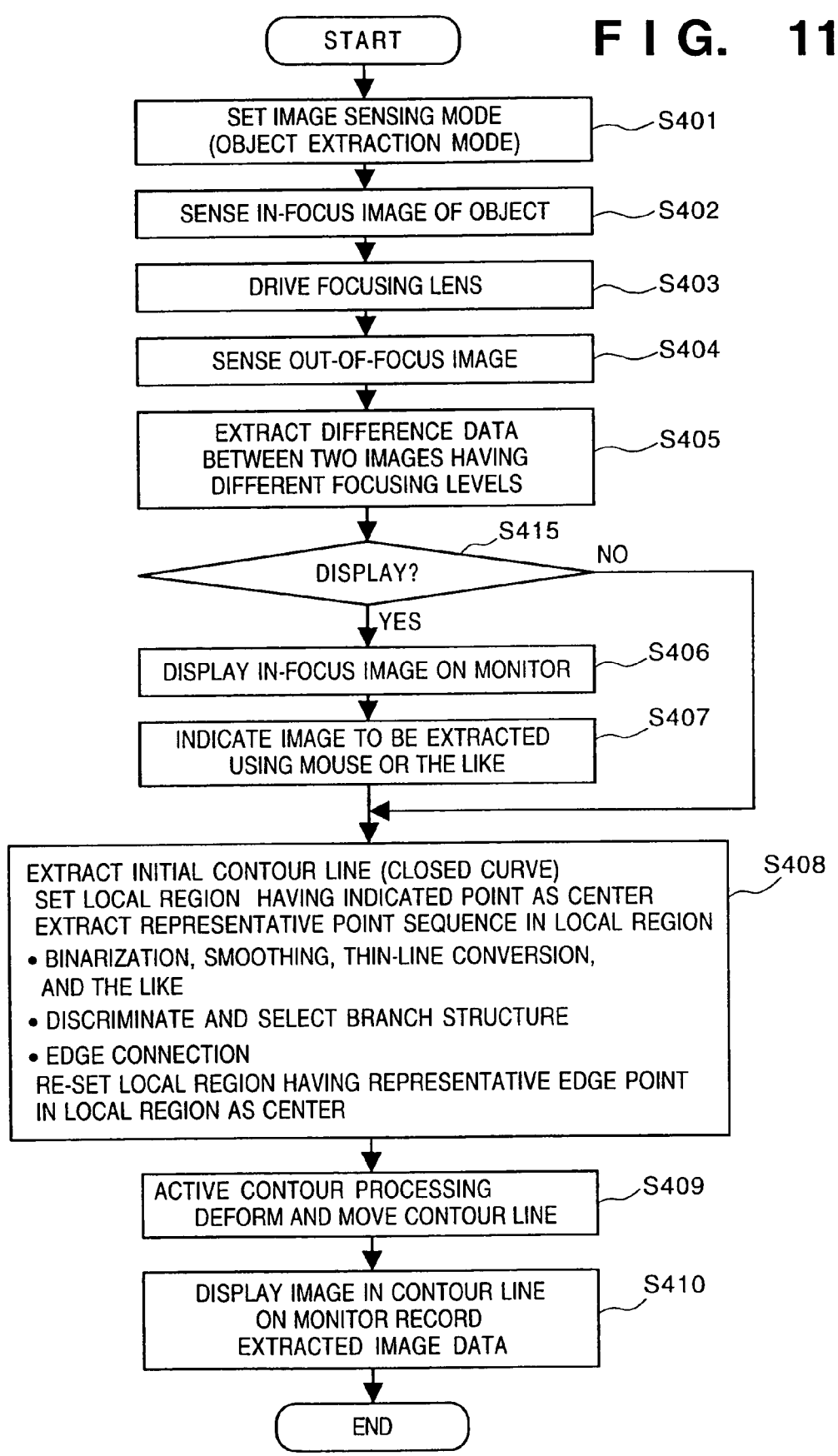
FIG. 11 is a flow chart showing the processing sequence of an embodiment of contour extraction.

FIG. 11 shows the main processing flow of this embodiment. Note that the following explanation will be given on the basis of the arrangement shown in FIG. 10, but the same applies to the arrangement shown in FIG. 14. After the object extraction mode is set by the image sensing mode setting switch 216 (step S401), the best in-focus image of the object to be extracted is sensed (step S402).

In this case, the object image is sensed by driving the focusing lens using a focusing level detection unit (a so-called auto-focus unit) to attain the best focusing state by the focusing state. detection unit. Subsequently, the focusing lens is driven (step S403), and an out-of-focus image is sensed (step S404).

Note that the focusing level control parameter (e.g., the ratio of the low-resolution image sensing focusing level with respect to the best focusing level) is input from the terminal 215 or is recorded on a memory unit (not shown) such as the internal ROM of the image sensing unit 201.

When a low-resolution image is sensed, other image sensing parameters such as the exposure amount (the diameter of the stop, the shutter speed) and the like are the same as those used upon sensing a high-resolution image using an image sensing condition recording/reproduction unit (C2 in FIG. 9) unless they are especially set in advance. Images are temporarily stored in the image temporary storage unit 206 or are sequentially transferred to the image comparison unit 207.

The image comparison unit 207 calculates difference data between high- and low-resolution images or difference data between two different low-resolution images (step S405). In this case, difference data to be calculated is selected in advance upon setting the image sensing mode or upon inputting the image sensing condition parameter.

Since high spatial frequency components are cut from the difference data between two low-resolution images, generation of unnecessary isolated feature points or isolated regions upon binarization can be suppressed. On the other hand, the difference data between high- and low-resolution images is preferably used in setting the initial contour when the size of the object to be extracted is smaller than that of the entire screen. Note that the output value of a pixel that assumes a negative value by calculating the difference may be set to be zero, or the absolute value of the difference between corresponding pixels may be output.

It is checked if the image is to be displayed (step S415). If N (NO) in step S415, the flow jumps to step S408; otherwise, the flow advances to step S406. In step S406, the high-resolution image is displayed on the display unit 214. When the user indicates a position near the contour line of the object to be extracted using the selection/indication unit 213 such as a mouse (step S407; more specifically, the user clicks a desired position in the case of the mouse), the initial contour setting unit 208 extracts an initial contour line from a neighboring region having the indicated point as the center (step S408).

The initial contour line extraction processing will be explained in detail below. In this embodiment, the output data from the image data comparison unit 207 is subjected to smoothing, binarization, and line thinning processing. The smoothing processing performs removal of isolated feature points (small regions having indefinite shapes but an identical luminance or color, line segments, and the like), convolution calculations with a Gaussian filter or normal low-pass filter processing, and the like.

The threshold value of the binarization processing may be set using the Otsu's method (*Journal of Papers of The Institute of Electronics, Information and Communication Engineers*, Vol. J63, pp. 349–356, 1980), or a method wherein an image is broken up into blocks each having an appropriate size, and the threshold value is set on the basis of statistical processing (hypothesis testing based on the average, variance, or histogram, or the like) of local image data (luminance, color, or the like), or the like.

Especially, in the latter method, the setting operation of a binarization threshold value and the binarization processing may be performed on the basis of statistical processing for a local region with a predetermined size, which has the designated point as the center, and line thinning processing and contour line tracing processing for initial contour extraction (to be described later) may be performed in the local region. Upon completion of the processing, a local region having an end point of the contour as the center is further set, and the same processing is repeated. As a result of these processing operations, a coarse initial contour (edge) is obtained.

The line thinning processing is processing for obtaining representative points in a bold initial contour line after binarization, and is not limited to a specific method performed in normal image processing. For example, an edge point may be searched for from arbitrary one point in the coarse initial contour in one of the right, left, up, and down directions, and then, an edge point adjacent to the obtained edge point is searched for, thus determining representative points.

When a plurality of edges or contour lines are present in a neighboring region as a result of the line thinning processing, they may be displayed while being superposed on the input image, and may be selected by the user (using the selection/indication unit 213 for correction).

When only one edge is present in a neighboring region or the user selects an edge, the contour line tracing processing is performed in a pre-set direction, and the positions of the respective points of the line-thinned image, which are connected to the edge, are sequentially recorded as sampling points of the initial contour line.

The correction processing (discrimination of the branch structure, edge connection) of the initial contour line will be described below. As the method of selecting the branch direction when the thinned image has a branch structure, the branch direction in which the image data attribute (color, luminance, its variance, or the like) of the contour line in a direction perpendicular to the tracing direction of a point before the branch is continuous or a direction in which changes in direction before and after the branch are small is preferentially selected.

In this case, the processing is performed by detecting the image attribute of a small region having each point after branch as the center. As another method, the contour tracing may be suspended, and a region having the branch point as the center may be caused to flicker, so that the user may select the branch direction.

When the contour line breaks up upon the binarization and thin-line conversion processing, edge linking processing is performed. In this case, automatic linking may be performed on the basis of a predetermined algorithm (see Papers of the 23rd Image Engineering Conference, pp. 67–70, 1992 and the like), or remaining edge points as a result of the contour tracing may be caused to flicker or may be displayed in a color different from other contour lines, and the user may confirm and indicate edge points to be linked using the selection/indication unit 213.

Upon linking points, a straight line or a spline interpolation curve using representative points on the contour line including the connection points may be generated. In particular, when an edge point after the contour tracing is present on an image frame, it may be linked to one on another frame. The initial contour line extraction processing has been described.

Figure 15:
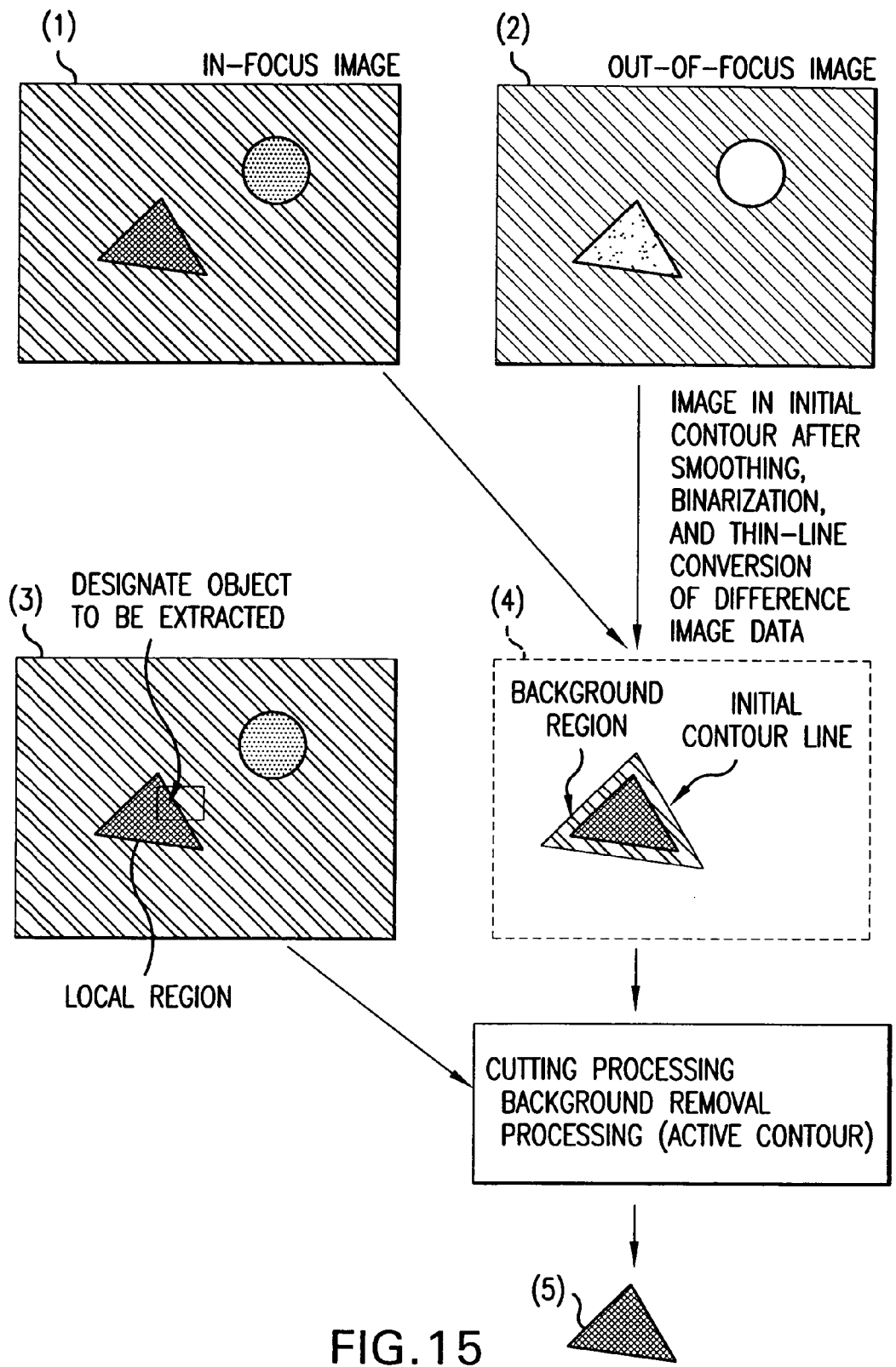
FIG. 15 is a view showing progress of processes for image data to which the present invention is applied.

As a result of the above-mentioned processing, a closed curve that surrounds the image to be extracted is finally obtained as the initial contour line. FIG. 15 shows progress of processes for image data to which the above-mentioned processing steps are applied.

(1) of FIG. 15 shows an in-focus image, (2) of FIG. 15 shows an out-of-focus image, which is emphasized for the sake of illustration, and (3) of FIG. 15 shows a local region set when the user indicates one point in the object to be extracted while confirming the image in (1) of FIG. 15 on the display unit 214.

(4) of FIG. 15 shows an example of an image in an initial contour line obtained as a result of the smoothing, binarization, line thinning, and contour line tracing processing in a local region on the basis of difference image data between (1) and (2) of FIG. 15. Although not shown, upon calculating the difference image data, two out-of-focus images having different focusing levels may be used, as described above.

Upon completion of the processing in step S408, as described above, the control enters the active contour processing (step S409) In this processing, the contour updating unit 209 updates the coordinates of the respective sampling points on the contour line stepwise to minimize, e.g., the evaluation function given by equation (1) above.

As an example of conventional processing, each sampling point on the contour line is shifted to its neighboring pixel (normally, one of eight neighboring pixels). Then, the evaluation function is calculated, the updating position that gives a minimum value is selected, and convergence is evaluated on the basis of, e.g., the average change amount of the positions of points on the contour line before and after updating (convergence discrimination). If the convergence condition is not satisfied, the deformation/movement processing further continues.

In this case, the weighting coefficients of the evaluation function may be appropriately changed. In this embodiment, the same processing is performed, and a cut image shown in (5) of FIG. 15 can be obtained as a result of the processing.

After the active contour processing has converged, the image output unit 211 displays an image in the contour on the display unit 214 in the processing in step S410, thus completing the image extraction processing. In this case, when the user inputs a confirmation instruction from, e.g., the terminal, the image is recorded and encoded in accordance with a predetermined format (e.g., TIFF, PostScript, or the like).

Figure 12:
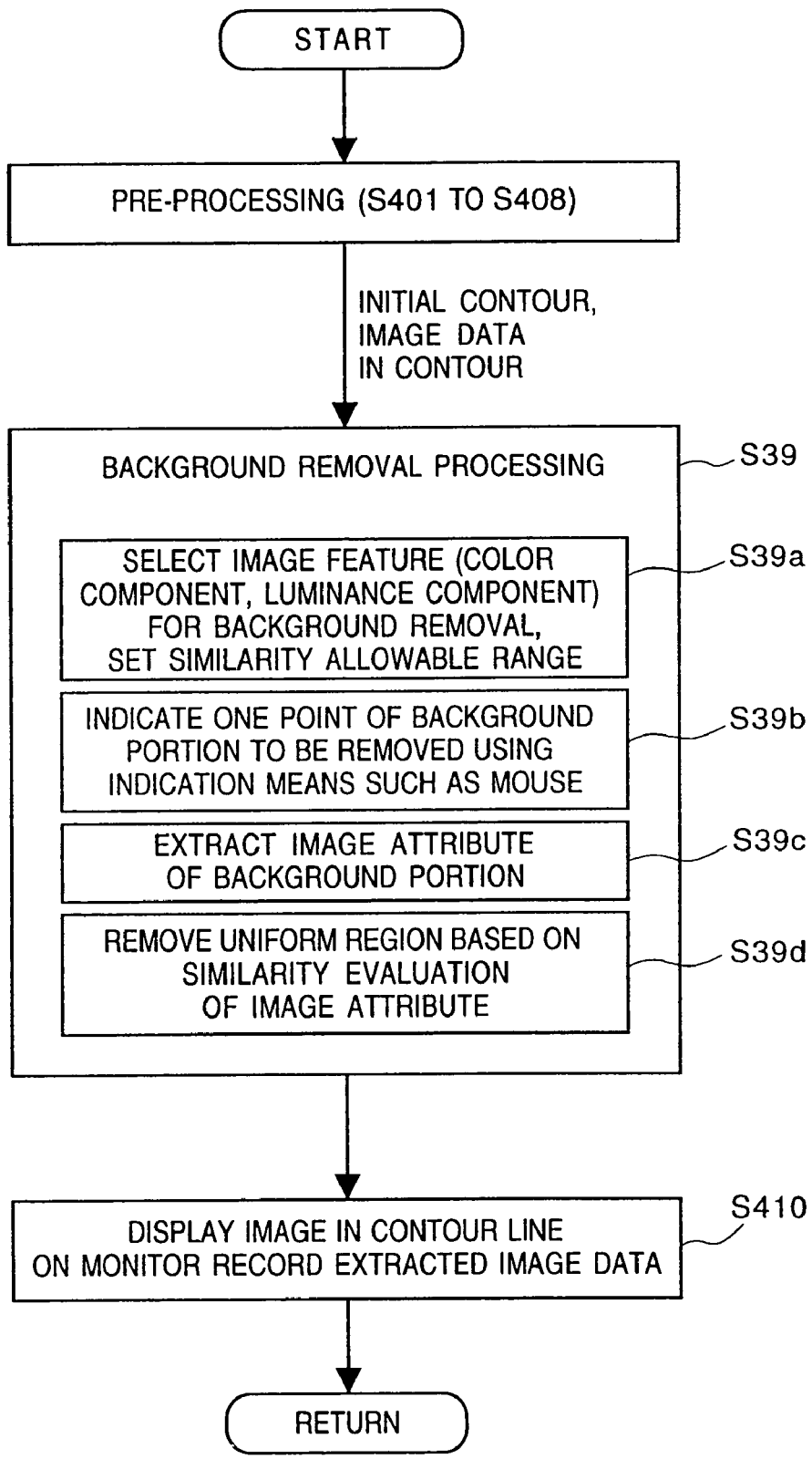
FIG. 12 is a flow chart showing another processing sequence of the embodiment of contour extraction.

The second embodiment of an image sensing apparatus that uses images having different image sensing conditions will be described below with reference to FIG. 12.

In this embodiment, after an initial contour is extracted from two images having different focusing states as in the first embodiment, background image region removal processing (step S39) using the selection/indication unit 213 (e.g., a mouse) is interactively performed for a region in the initial contour. In this case, the processing mode automatically shifts from the initial contour extraction mode to the background image region removal mode.

When the image in the contour is displayed, the image may be normalized and displayed by appropriately scaling the image size to have a predetermined size independently of the extracted image size. In the background removal processing, the type of feature of image data used for discriminating the background image region, and the allowable range of the attribute value are set in advance using, e.g., the terminal (step S39a).

When no specific value is set, a color component (hue, saturation, or the like) is used, and the standard value of the allowable range is used. The user indicates one point of the background portion to be removed using the selection/indication unit 213 (step S39b; by clicking the point in the case of a mouse). The average image attribute value of a local region having the indicated point as the center is extracted (step S39c), and a region which includes the point and in which the difference from the color component (hue or the like) or the luminance level of the point falls within a predetermined range is removed from the region inside the initial contour (step S39d).

Note that the image data allowable range upon background removal may be set in advance using, e.g., the terminal prior to the initial contour extraction.

The third embodiment of an image sensing apparatus that uses images having different image sensing conditions will be explained below.

In this embodiment, by controlling the diameter of the stop or the shutter speed of the image sensing unit (step S443), a plurality of images having different exposure conditions are sensed (step S444) and are normalized by extracting comparison (difference) data therefrom (step S445). Thereafter, the processing including the setting operation of the initial contour to image extraction is performed.

Figure 13:
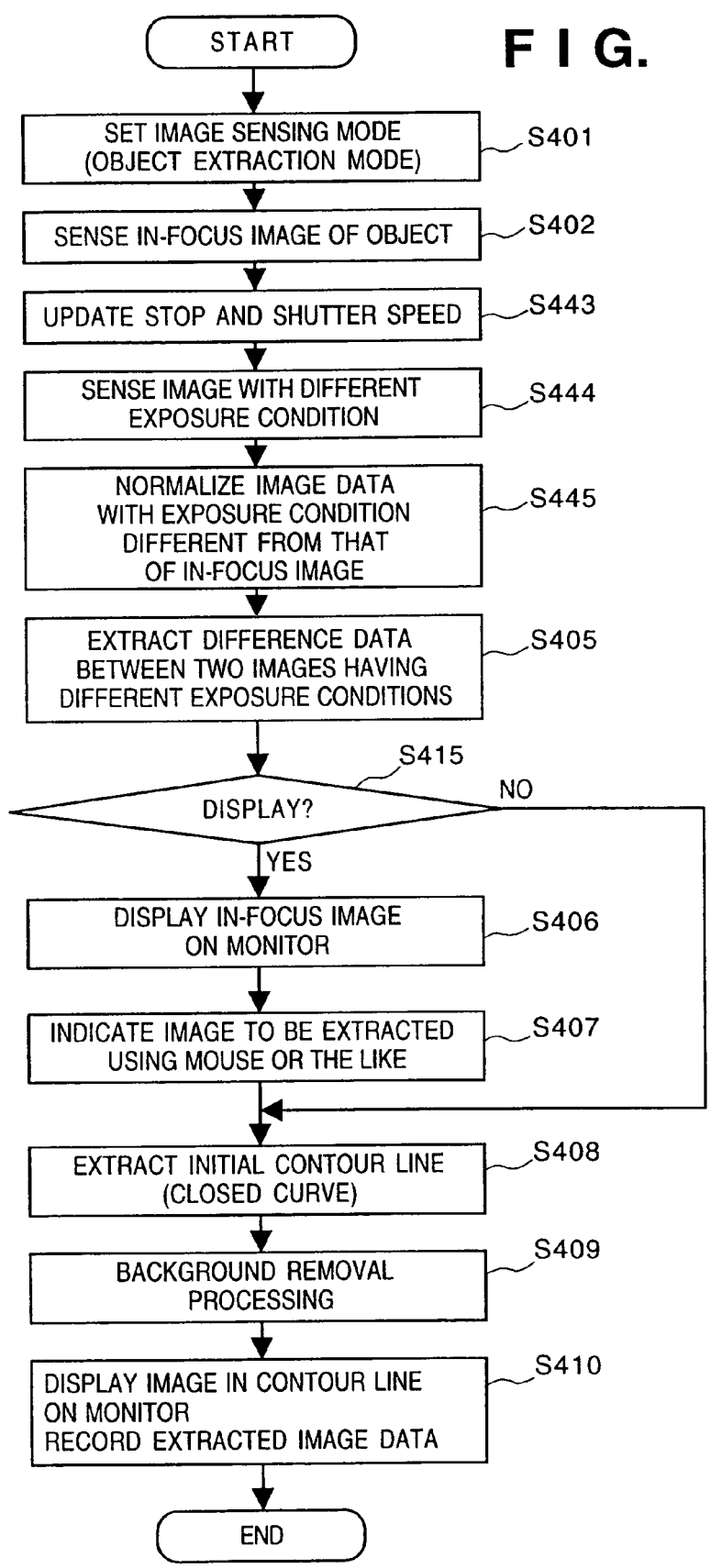
FIG. 13 is a flow chart showing still another processing sequence of the embodiment of contour extraction.

FIG. 13 shows the processing flow of this embodiment. In particular, in this embodiment, the normalization processing of the luminance levels of two image data is performed before comparison data is extracted. More specifically, one of two image data is normalized by a maximum luminance value (to be described below) of reference image data, so that the maximum luminance value of luminance levels having frequencies equal to or larger than a predetermined value in the luminance histogram of the image equals other maximum luminance values that are similarly obtained.

In this case, an image (to be referred to as a first image hereinafter) sensed under an optimal exposure condition to have the object to be extracted as the center, and an image (to be referred to as a second image hereinafter) sensed under an exposure condition different from that for the first-image, or a pair of images (to be referred to as second and third images hereinafter) sensed under a plurality of exposure conditions different from that of the first image are prepared, and difference data between the two images is extracted. In the latter case, the difference data between the second and third images is extracted.

The normalization processing is to bring relatively low-order statistical data such as the average value, variance, or the like of the luminance distribution close to each other between the two images. As an example of the normalization processing, let $$I_1^{max} \text{ and } I_2^{max}$$

be the maximum luminance levels (having a predetermined frequency or more) of the first and second images. Then, each pixel value $I_2(i,j)$ of the second image is updated in accordance with the following equation:

$$I_2^{new}(i, j) = \frac{I_1^{max}}{I_2^{max}} I_2(i, j) \qquad (7)$$

where I(i,j) is the luminance value of pixel (i,j). The same applies to the normalization processing between the second and third images.

This embodiment is based on the premise that the luminance level distributions of the object and the background fall within different ranges (but are allowed to overlap each other). Upon execution of the above-mentioned procedure, the processing region of a simple figure (e.g., a rectangle) that surrounds the existence range of the object is defined, and the normalization coefficients for the above-mentioned equation are preferably obtained outside the region. Furthermore, normalization coefficients may be calculated at the respective points on the basis of variations in luminance level between corresponding pixels of two images at the respective points outside the region, and normalization may be performed within the processing region using predicted coefficients of the calculated normalization coefficients (obtained by, e.g., extrapolation or the like).

With this processing, only variations of the background portion can be effectively corrected by normalization, and only variations of the object portion (a region within the luminance level range different from that of the background portion) are left. Consequently, when the difference between the two images is calculated and subjected to threshold value processing, since most of the background portion is removed, the contour line of a region having the maximum area of the remaining fragmentary partial regions or the envelope of a plurality of object partial regions is set as the initial contour. The processing after the initial contour is set is the same as that in the first embodiment.

In order to maintain high extraction precision, the exposure condition (stop diameter, shutter speed) may be controlled on the basis of the luminance histogram of the first image. In general, when the variance is smaller than a predetermined threshold value and the histogram has a steep distribution pattern, the control amount is decreased.

In particular, when the object and the background can be separated to some extent on the histogram, the variance or the like may be calculated from the distribution range corresponding to the object, and the ratio of variation in image sensing parameter value that gives an optimal exposure condition may be set in accordance with the variance.

This processing may be performed when the user interactively designates the object distribution using the terminal. When the object and the background can hardly be separated in advance, or when normalization processing is automated, the statistical amount may be calculated from the entire distribution pattern to control the condition.

The relationship between the statistical amount and the control amount may be stored in advance in a storage means such as a ROM in the form of a correspondence table, or may be directly input from, e.g., the terminal. In this embodiment, the initial contour setting processing after extraction of the difference data, and subsequent processing for background removal and image extraction are performed in the same manner as in the above-mentioned embodiment.

According to the embodiments that use images having different image sensing conditions, since an initial contour is set on the basis of the comparison result of a plurality of images having different image sensing conditions, and the background image region is removed on the basis of the initial contour, a specific object image can be stably extracted at high speed. As a result, prior to extraction of a specific object by image processing, an approximate contour line (a boundary line with a background) of the object can be stably obtained at high speed from a plurality of images having different image sensing conditions, and the calculation time required for removing the remaining background image region can be greatly reduced.

Since an initial contour approximate to the contour line of the object to be extracted of the active contour processing is set on the basis of a plurality of images having different image sensing conditions, automatic extraction of a specific object and moving image extraction of a moving object can be performed at high speed. Therefore, a dynamic object can be extracted from a moving image by deformation/movement processing of the approximate contour line, and image extraction can be attained at high speed.

Since initial contour data extracted from a plurality of images having different image sensing conditions can be appropriately set by interactively correcting it, a specific object can be extracted with high precision. Using a correction means for an approximate contour line, background removal processing can be stabilized, and image extraction precision can be improved.

An approximate contour line can be stably obtained from two images having different focusing states without being influenced by, e.g., the illumination condition, thus greatly improving the image extraction precision and processing speed.

Upon extracting an approximate contour line (the boundary line with the background) of the object from a plurality of images having different image sensing conditions, the influence of noise owing to binarization, smoothing, and the like can be eliminated, and the extraction precision can be improved.

Since the control amount of the image sensing condition is set on the basis of the statistical feature of image data, the extraction precision of the initial contour can be improved, and high-speed, high-precision image extraction can be realized.

Since the influence of image data of the background portion or its variations can be eliminated by local calculation processing in the first invention, stable image extraction can be performed at high speed.

Information indicating the positions of the object and the background with respect to the contour line tracing direction can be obtained in advance, and as a result, the image attributes of the object to be extracted and the background which are located adjacent to the contour line can be extracted, thus improving the setting precision of the contour line and the image extraction precision.

<Example of Converting Image Data of Background Image>

Figure 16:
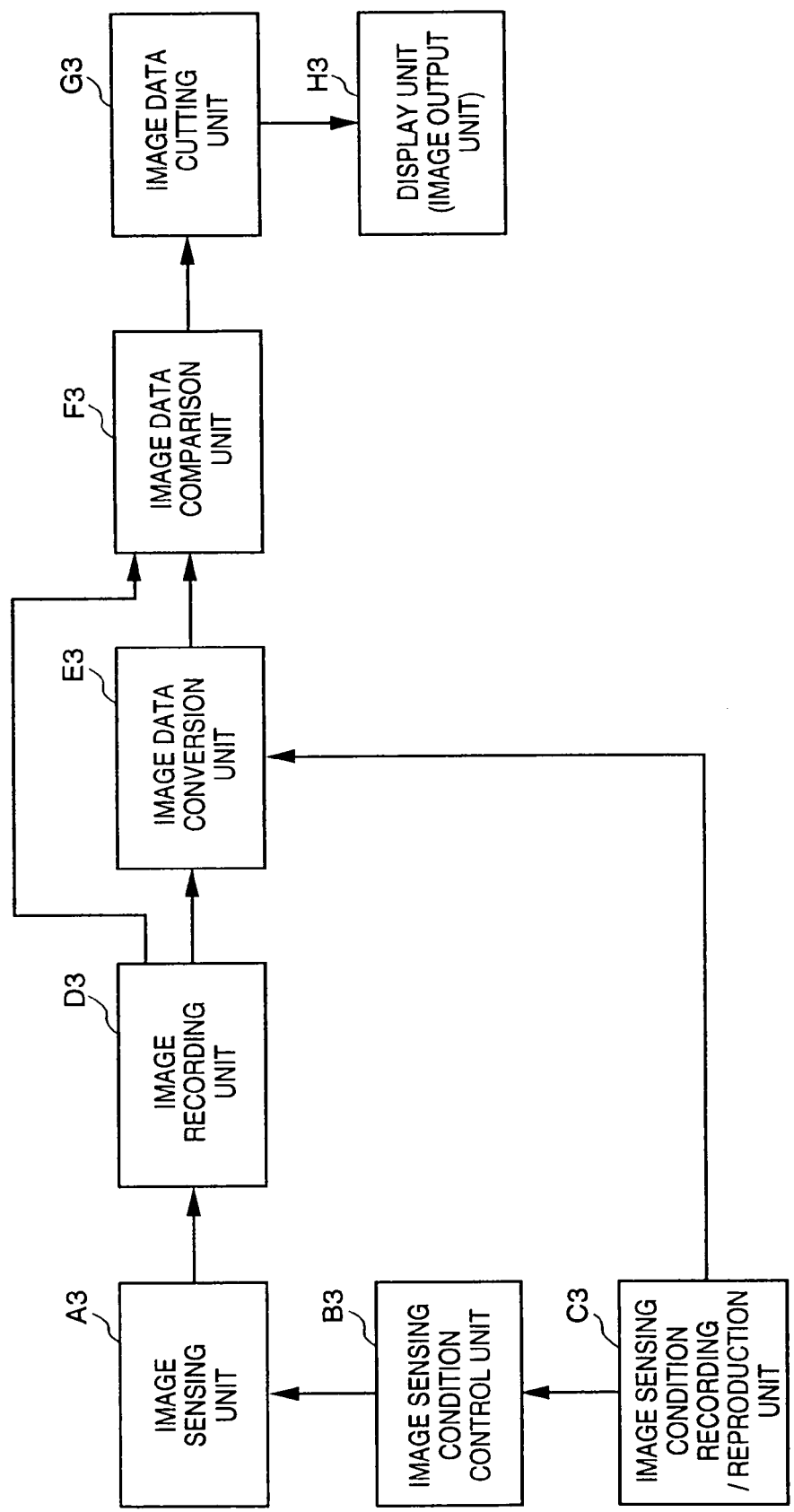
FIG. 16 is a functional block diagram showing still another arrangement of principal part of an apparatus according to the present invention.

FIG. 16 is a functional block diagram showing the arrangement of principal part of an image sensing apparatus of the present invention. Referring to FIG. 16, reference numeral A3 denotes an image sensing unit constituted by an image sensing optical system, an image sensing element, and the like; B3, an image sensing condition control unit for controlling various image sensing parameters such as the zoom control parameter, focal point control parameter, stop control parameter, and the like; C3, an image sensing condition recording/reproduction unit for recording/reproducing control data of the image sensing condition control unit B3; D3, an image recording unit for recording an image sensed by the image sensing unit A3; E3, an image data conversion unit for converting an image on the basis of various control parameters supplied from the image sensing condition recording/reproduction unit C3; F3, an image data comparison unit for comparing a background image and an image including a specific object; and G3, an image cutting unit for setting an image cutting region on the basis of the output from the image comparison unit F3. Reference numeral H3 denotes a display unit such as a monitor display, an electronic viewfinder, or the like, for displaying an image.

The image sensing unit A3 senses a plurality of images. The image sensing condition control unit B3 controls the image sensing conditions upon sensing images by the image sensing unit A3. In this embodiment, the image sensing conditions include the exposure amount, focusing state, and the presence/absence of flash emission.

The image sensing condition recording/reproduction unit C3 records the image sensing conditions upon sensing images by the image sensing unit A3, and reads and outputs the recorded image sensing conditions. In this embodiment, the image sensing condition recording/reproduction unit C3 records the image sensing conditions used when the image to be cut out in a predetermined background is sensed.

The image recording unit D3 records a plurality of images sensed by the image sensing unit A3, and temporarily stores and holds a background image and an image including a specific object in which the image to be cut out is present in the background. The image recording unit D3 encodes and records image data in a specific image region obtained by the image cutting unit G3.

The image data conversion unit E3 converts image data of at least one of the plurality of images on the basis of the image sensing conditions supplied from the image sensing condition recording/reproduction unit C3. The image data conversion unit E3 also converts image data of the background image on the basis of the image sensing conditions reproduced and output from the image sensing condition recording/reproduction unit C3. Furthermore, the image data conversion unit E3 performs a space shift operation on a memory, so as to obtain a maximum similarity between the background image and the image including the specific object, and converts the image size, luminance level, color components, and resolution.

The image data comparison unit F3 compares image data of the plurality of images converted by the image data conversion unit E3, and extracts difference image data of the plurality of images reproduced and output from the image recording unit D3.

The image cutting unit G3 extracts the image in a specific image region on the basis of the comparison result of image data of the plurality of images output from the image data comparison unit F3.

According to the image sensing apparatus of this embodiment with the above arrangement, when a specific image is extracted upon comparing a plurality of images such as a registered image and the current image or different frame images in a moving image, the margin for different image sensing conditions of the respective images can be increased.

Hence, when a specific object image is extracted from the background image, the object can be satisfactorily extracted irrespective of very small variations in position of the image sensing unit A3 owing to camera shake, differences in exposure condition, variations in gain of a sensor, and the like. The margin for variations in, e.g., illumination condition can be increased without using any model associated with the object to be extracted such as a color model.

Since the margin for variations in image sensing condition or camera parameter can be increased, processing for cutting a specific object from the background can be efficiently attained. Furthermore, since image data of the background image is converted using the image including the object sensed under the same image sensing conditions as those used for sensing the background image, the margin for variations in image sensing condition and camera parameter can be increased from the background image and the image including the object. Also, high-image quality object extraction can be attained irrespective of the image sensing conditions upon sensing the background image, and a high-quality in-focus image of the object to be cut out can be output.

According to another feature of this embodiment, since image data in a specific image region obtained by the image cutting unit G3 is encoded and recorded on the image recording unit D3, a required image can be efficiently encoded, and image extraction can be satisfactorily performed.

According to still another feature of this embodiment, since the image data conversion unit E3 performs a space shift operation to maximize the similarity between the background image and the image including the object, image extraction that permits variations in position or posture of the image sensing unit A3 can be realized, and image extraction which has little adverse influence owing to camera shake or the like upon image sensing can be attained.

According to still another feature of this embodiment, since the image sensing conditions include the exposure amount, focusing state, and the presence/absence of flash emission, a specific object image can be extracted from a plurality of images sensed under different image sensing conditions, and image extraction with a large margin for variations in magnification condition, focusing state, contrast, illumination condition, and the like can be realized.

According to still another feature of this embodiment, since the image data conversion unit E3 converts the image size, luminance level, color components, and resolution, image data of a plurality of images sensed under different image sensing conditions are normalized to attain high-precision extraction processing of a specific object on the basis of the comparison results of images. Therefore, high-precision object image extraction can be performed.

The arrangement and operation of the image sensing apparatus of the present invention will be described in more detail below with reference to FIGS. 17 to 22.

The first embodiment that converts the background image will be explained below. In the basic processing of the first embodiment, the background image and the object image in the background are sensed, and comparison data (difference data) considering the image sensing conditions of the two images is subjected to statistical processing to detect the object image region, thereby extracting the object image.

In this embodiment, assuming a case wherein the operator performs an image sensing operation while holding an image sensing means such as a video camera with his or her hand, an image in which the object to be extracted is present in the background is sensed first, and the image sensing conditions at that time are recorded in a recording unit together with the image data. Thereafter, the same image sensing conditions (internal camera parameters including image signal characteristic parameters) are read out from a storage unit, and the background image is sensed using the readout conditions.

On the other hand, when the image sensing conditions for the two image sensing operations cannot be considered as the same ones, for example, when the two image sensing operations are different in image sensing times or in the external illumination conditions, the image sensing parameters to be the same values are limited to the magnification, focusing state, and the like, thus preventing a situation that does not allow to set the same conditions.

Figure 17:
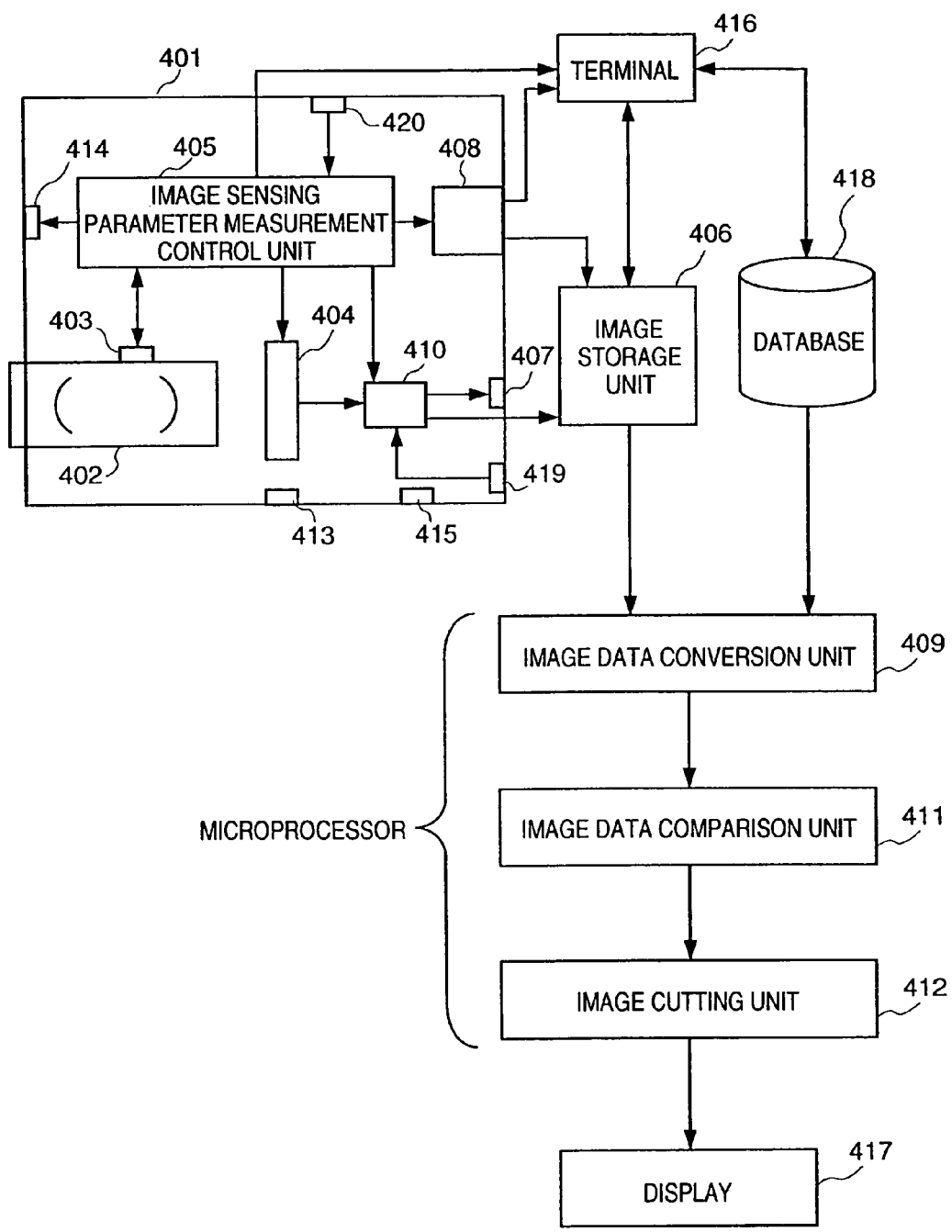
FIG. 17 is a system block diagram showing an embodiment that realizes the functions shown in FIG. 16.

FIG. 17 shows the arrangement of principal part of an image sensing system of this embodiment. Referring to FIG. 17, reference numeral 401 denotes an image sensing unit; and 402, an imaging optical system comprising an image sensing lens. In this embodiment, the imaging optical system 402 constitutes a binocular image sensing system for sensing a stereoscopic image. Reference numeral 403 denotes a lens motor drive control unit for driving the lenses of the imaging optical system 402; and 404, an image sensor which normally comprises a CCD or the like.

Reference numeral 405 denotes an image sensing parameter measurement control unit, which includes a focusing state detection unit for detecting the focusing state of a lens by a known means, a shutter speed detection control unit for controlling the accumulation time of, e.g., the CCD, a stop measurement control unit for controlling the aperture size of the stop, a feature amount detection unit for detecting the feature amounts (e.g., as for gamma, a correction coefficient, and the like) of image signal characteristic parameters (gamma, knee, white-balance correction, CCD accumulation time, and the like). Reference numeral 406 denotes an image recording unit comprising, e.g., a memory; and 407, an electronic viewfinder (EVF or the like) serving as a display unit.

Reference numeral 408 denotes an image sensing mode recording unit for recording information upon image sensing, which includes image sensing parameters, image characteristic parameters, the presence/absence of flash emission, the presence/absence of deliberate or intentional motions such as scanning or camera shake, and the like. Note that camera motions such as camera shake, scanning, panning, and the like may be discriminated based on the output data from an acceleration sensor which is built in the image sensing unit. These additional data are stored in an image database 418 together with image data.

Reference numeral 409 denotes an image data conversion unit for converting image data upon synthesizing on the basis of the image sensing conditions and the like. The conversion unit 409 will be described in detail later. Reference numeral 410 denotes an image signal processing circuit, which includes gamma, knee, white-balance correction, AF (Automatic Focusing), AE (Automatic Exposure), AGC (Automatic Gain Control) processing circuits, and the like. Reference numeral 411 denotes an image data comparison unit for detecting and outputting the difference between the background image and the image including a specific object.

Reference numeral 412 denotes an image cutting unit, which identifies the region to be extracted on the basis of the statistical processing result of the output from the image data comparison unit 411, and outputs a key signal (or mask data) for cutting out the identified region to be extracted from an image including an object. Reference numeral 413 denotes an image transfer unit which transfers image data and the like to an external database or terminal.

Reference numeral 414 denotes a flash emission unit; and 415, an external synchronization unit which supplies synchronization clocks to the respective circuits although signal lines are not shown. Reference numeral 416 denotes a terminal which is used for externally performing the control of the image sensing mode, selection of the image to be cut out, and search for and selection of a registered image. Reference numeral 417 denotes a display which outputs a processed image, and also serves as a finder display.

Reference numeral 418 denotes an image database which preserves previously sensed image data, and as their additional data, namely, the type indicating whether or not each image is a registered image, image sensing parameters, image sensing conditions (outdoors or indoors, the presence/absence of flash emission, and the like), and other information (date, time, location, camera operator, title, and the like).

Reference numeral 419 denotes an image type setting unit which represents means such as a switch for registering an image as a reference image upon extracting a specific object based on the comparison result with another image, a switch for setting the type indicating whether or not the image is one for object extraction to be compared with the reference image, and the like. With these switches, the image type is automatically recorded as additional information.

Reference numeral 420 denotes a camera parameter setting unit. Normally, the background image and the image including the object are sensed in the identical image sensing mode. However, the camera parameter setting unit 420 is used when the operator arbitrarily sets the internal characteristics of the image sensing unit. Note that the internal circuits of the image sensing unit are illustrated in units of functions, but the operations of these functions are controlled by a microprocessor (not shown).

Figure 18:
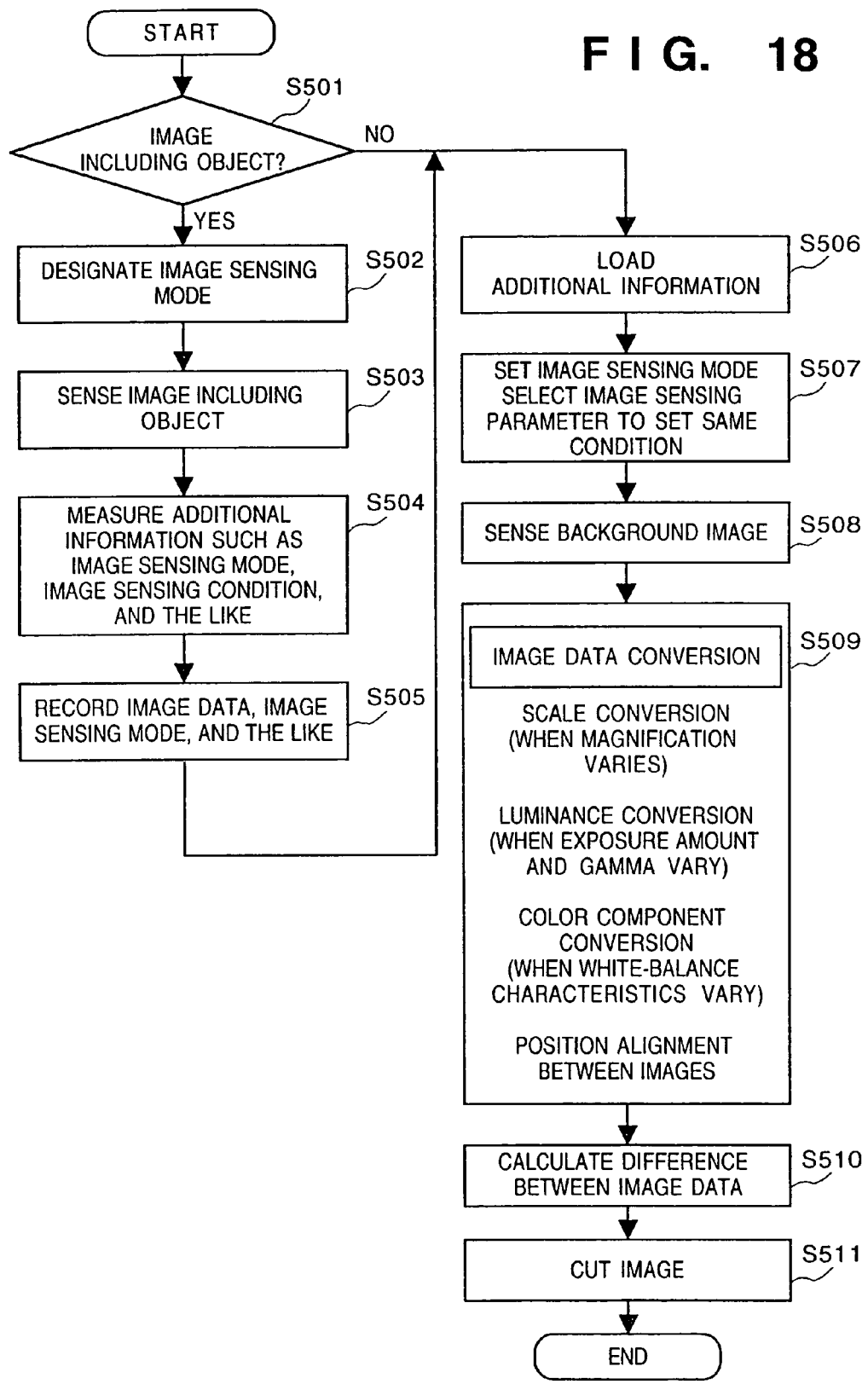
FIG. 18 is a flow chart showing the sequence of basic processing of image conversion.
Figure 22:
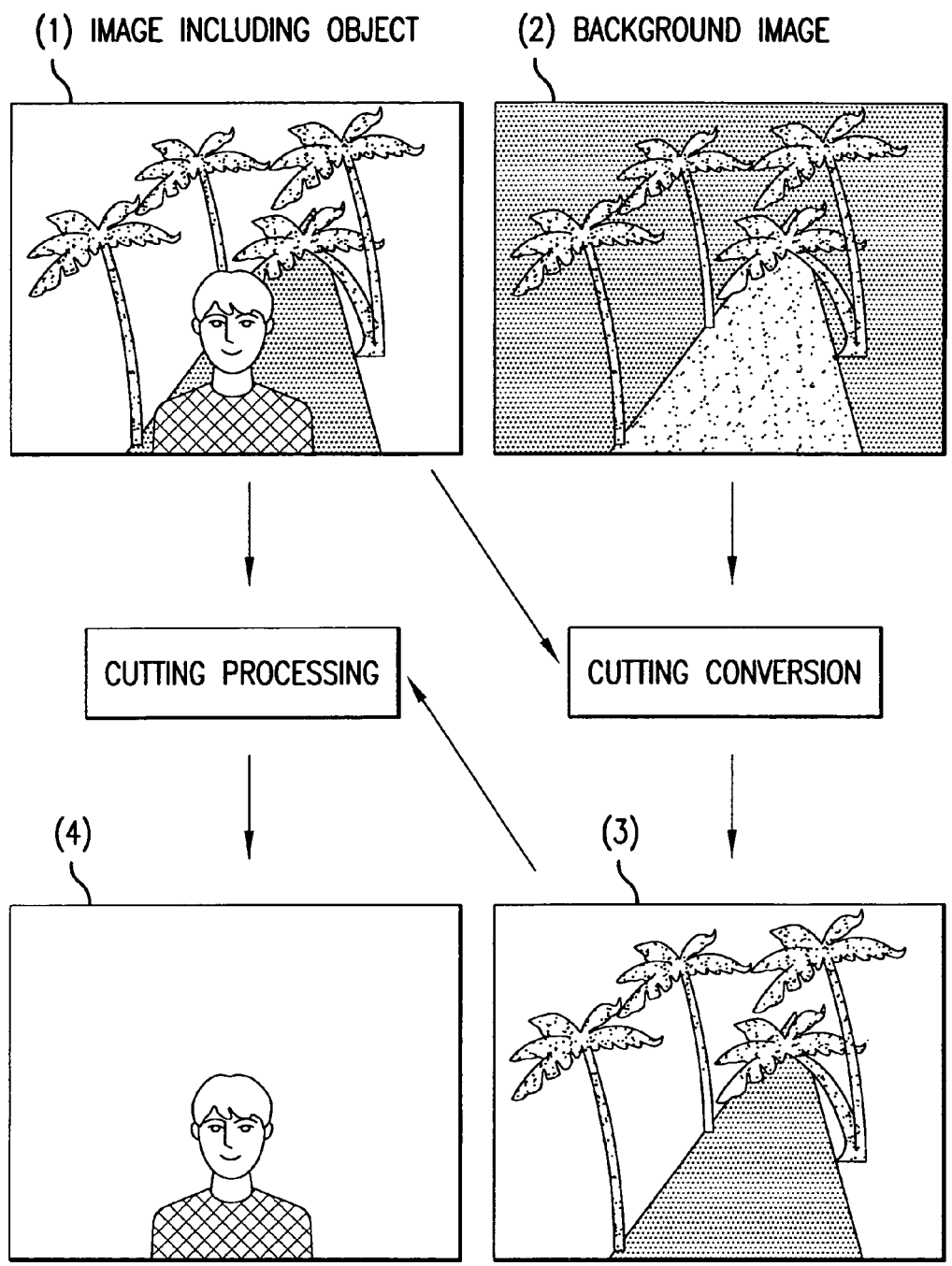
FIG. 22 is a view showing an embodiment of processing steps.

FIG. 18 is a flow chart showing the basic processing of the image sensing apparatus of this embodiment with the above arrangement, and FIG. 22 shows an example of image extraction. The basic processing of this embodiment will be described below. Note that these operations are illustrated in units of functions in FIGS. 18 and 22, but are processed by the microprocessor in practice. The processing program shown in the flow chart may be stored in advance in a ROM or may be loaded from an external storage medium to a RAM. Also, the image database may be stored in an external storage medium.

When the processing is started, the type of image output from the image sensing unit, i.e., whether the image is a background image or an image including a specific object, is checked in step S501. This checking operation is performed based on the image type set by the operator via the image type setting unit 419. More specifically, the image type indicates whether the image to be sensed by the operator is a principal object, only the background, or both of them.

If it is determined as a result of checking in step S501 that an image including a specific object is to be sensed, the flow advances to step S502 to set the image sensing mode. Thereafter, in step S503, various parameters for the image sensing operation are set and the image sensing operation is performed under an optimal image sensing condition (to be described later) to an object. Upon completion of image sensing in step S503, the flow advances to step S504, and additional information such as various image sensing mode parameters and image sensing conditions including the magnification (focal length), focusing level, stop, shutter speed, the presence/absence of camera shake, the presence/absence of panning/tilting, gain, and the like is measured.

The flow advances to step S505, and the additional information measured in step S504 is recorded in a predetermined format together with image data. Note that the additional information may be separately recorded in, e.g., a header file together with the address or the like of corresponding image data.

On the other hand, if it is determined as a result of checking in step S501 that a background image is to be sensed, the flow advances from step S501 to step S506. In step S506, the additional information of the image including an object is loaded. Thereafter, the image sensing mode is set in step S507 in the same manner as described above. In this case, the same condition parameters as those in the processing in step S502 are selected, and basically, the background image is sensed under the same image sensing conditions in the next step S508.

However, in order to cope with variations in, e.g., environmental conditions, an optimal image sensing mode is set using information indicating outdoors or indoors, the presence/absence of flash emission, and the like as the selection mode of the image sensing conditions recorded in the image sensing mode recording unit 408 upon image sensing in step S507. The image sensing parameter measurement control unit 405 discriminates the presence/absence of changes in environmental condition by utilizing these image sensing conditions and additional information, and controls the image sensing parameters to attain identical conditions.

When the image sensing time of the background image is close to that of the image including the object irrespective of indoors or outdoors, the environmental conditions, especially, the illumination condition except for an illumination means such as a flash device built in the image sensing unit, the background pattern, and the like may be assumed to have changed little.

Therefore, when identical image sensing mode parameters except for the image signal characteristic parameters are used in the two image sensing operations (for example, when the image sensing mode parameters for the image including the object are used), variations in image data on an identical region of the background pattern can be suppressed between the two images, and the reliability of the subsequent statistical processing for cutting an image can be improved.

However, since the characteristics (gamma, white balance, and the like) of a sensor signal processing circuit change depending on the spectral reflectance characteristics or the like of the object image or noise is added, image data of the background portion may not always completely match with each other between two images even in the identical image sensing mode in a general situation.

In order to cope with such case, image data conversion processing is performed in step S509. In this case, scale conversion (upon variations in magnification), luminance conversion (upon variations in exposure amount/gamma), color component conversion (upon variations in white-balance characteristics), image position alignment (upon changes in image position), and the like are performed to normalize image data, so that image data of a region, corresponding to an image region consisting of only the background of the image including the object, in the background image becomes substantially the same as that of the image including the object.

In step S510, image comparison processing with the background image is performed to calculate the difference between the two image data. In step S511, image cutting processing is performed. Note that the contents of these processing operations will be described in detail later.

Figure 19:
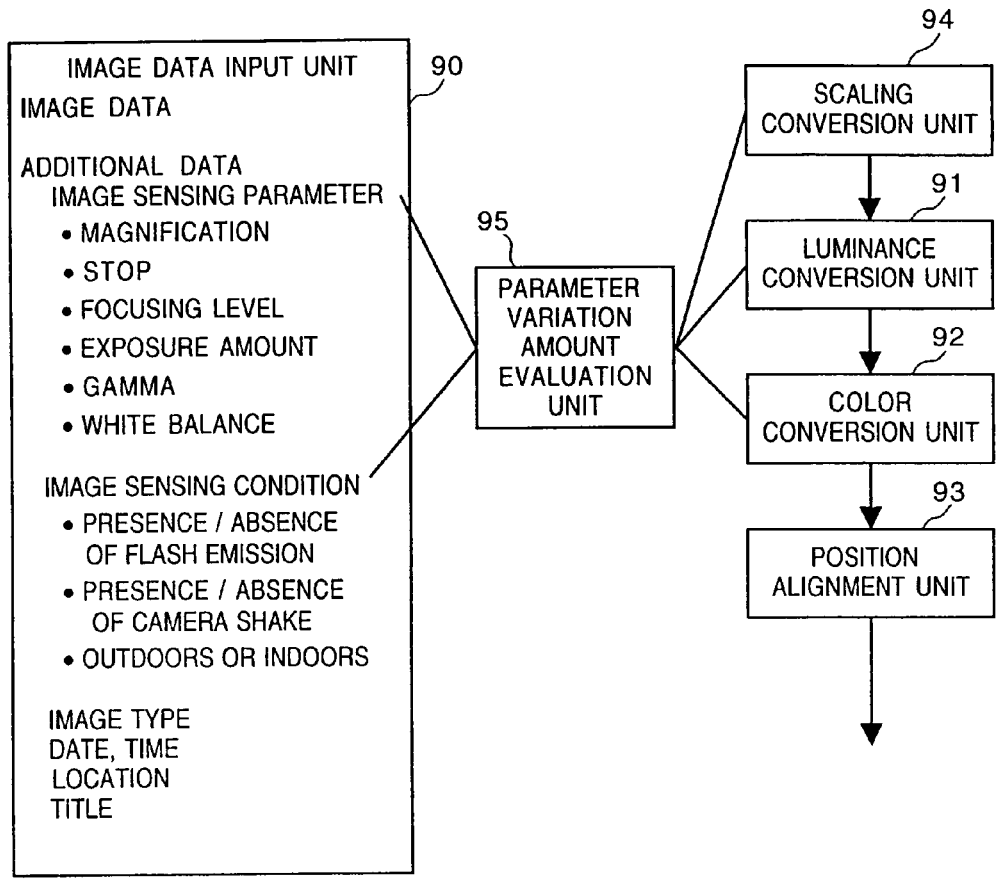
FIGS. 19 and 20 are block diagrams showing the arrangement of an image data conversion unit.
Figure 20:
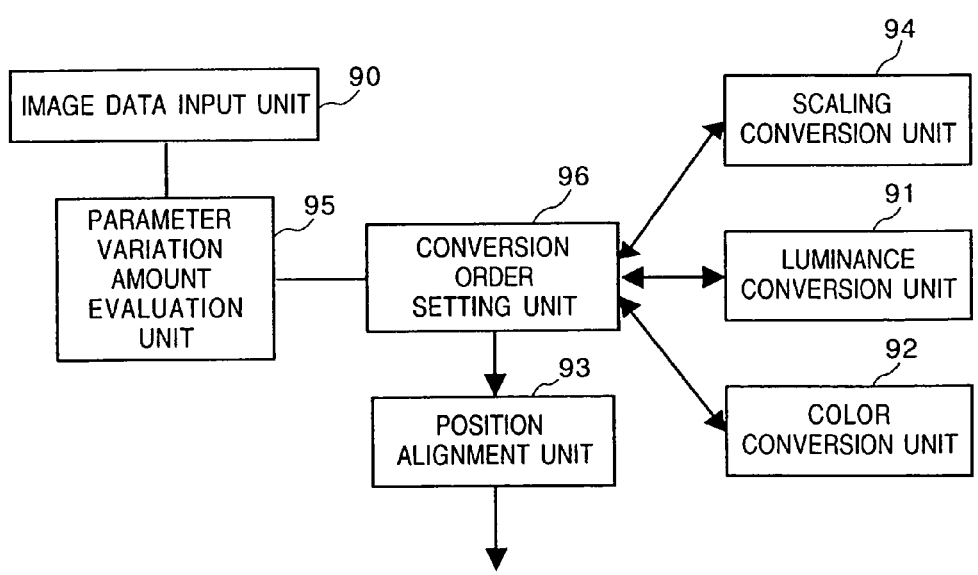

As shown in FIGS. 19 and 20, the image data conversion unit 409 comprises a data input unit 90 for inputting image data and its additional data, a luminance value conversion unit 91, a color component conversion unit 92, a space shift operation (position alignment) unit 93, an image size scaling (scaling conversion) unit 94, a parameter variation evaluation unit 95, and the like. In general, an image including a specific object is used as a reference image. As for the reference image, its image data is fixed, and the image data of the background image is converted.

When the two images have the same image sensing mode, i.e., when the environmental conditions do not change at all, the luminance value and color components need not normally be converted. However, depending on the feature of the object image and the ratio of its area with respect to the background, image signal characteristic parameters, i.e., the gain and white-balance characteristics, and gamma characteristics may change.

Therefore, when at least one of these characteristic values exceeds a predetermined threshold value, the background image is converted based on the differences between parameter characteristic values at the respective points in the background image and the image including the object recorded in a predetermined memory in correspondence with the characteristics values of the image including the object. The processing contents performed by the respective conversion units will be described below.

When variations in parameters are relatively small, it is considered that the image sensing environment does not change largely, and the conversion processing in the image data conversion unit 409 is performed in the order of scaling conversion for adjusting the sizes of a plurality of images, position alignment of the images that allows basic image synthesis, and fine adjustment of images such as luminance conversion, color component conversion, and the like, as shown in FIG. 19. Note that the vertical arrow in FIG. 19 indicates the execution order of processing operations.

However, the order may change when the control for setting an identical image sensing mode is canceled by the image sensing parameter setting unit 420. As shown in FIG. 20, a conversion order setting unit 96 for setting the conversion order except for position alignment may set the conversion order in the order of items having larger variation amounts so as to perform conversion. With this processing, as conversion of items with smaller variation amounts is performed, the influence of errors can be reduced, and the precision can be improved.

The scaling conversion unit 94 for performing the scaling conversion converts the background image to have the same field angle as that of the image including the object, on the basis of the magnification variation amount between the two images.

For example, let f1 and f2 be the focal lengths upon sensing the image including the object and the background image measured by the image sensing parameter measurement control unit 405 shown in FIG. 17. Then, the scaling coefficient of the background image with respect to the image including the object is given by af2/(f1+c) (where a and c are fixed values determined by the layout of the optical system including the sensor position of the image sensing unit). Scaling coefficients corresponding to combinations of the values in the predetermined ranges of f1 and f2 may be recorded in advance in a storage unit such as a ROM in correspondence with this conversion formula, and may be read out upon extracting an object.

In this case, it is assumed that variations in distance between the image sensing unit and the object are sufficiently small. When magnification data has no variations, this processing may be omitted, and the conversion may be started from the position alignment unit 93.

The luminance conversion unit 91 converts the luminance level in units of pixels on the basis of coincidence/non-coincidence of illumination conditions such as variation amounts of the gain and gamma characteristics, exposure amount, outdoors or indoors, the presence/absence of flash emission, and the like between the background image and the image including the object.

More specifically, a conversion coefficient c is given as a function of gains G1 (the value of the image including the object; the same applies to the following parameters) and G2 (the value of the background image; the same applies to the following parameters), gamma values gr1 and gr2, shutter speeds s1 and s2, and the like upon sensing images. In general, the gamma values may be fixed, and other parameters may be set to determine the value c in correspondence with their ratios (G1/G2, s1/s2). Note that C is given as a monotone decreasing function with respect to the ratios G1/G2 and s1/s2, but the actual function pattern varies depending of the device characteristics of the image sensing unit. Hence, the value c is given as a combination of the values (G1/G2 and s1/s2), and appropriate values may be stored in a storage unit such as a ROM in the form of a conversion table and may be read out upon extracting an image. The same applies to color component conversion.

The color component conversion unit 92 converts the color components of image data on the basis of the white-balance characteristic variation amount, and the like.

The position alignment unit 93 performs a space shift operation on a memory so as to maximize the similarity between the background image and the image including the object. More specifically, in order to allow variations in position of the image sensing unit and posture variations (camera shake, when the image sensing unit is re-held, or when the user's foot positions change slightly) upon sensing the two images, extraction of corresponding points between the two images, and position alignment, i.e., a matching calculation based on the extracted corresponding points are performed.

Normally, small variations such as camera shake for a short period of time can be absorbed by extracting corresponding points (at least three points) between local regions at the four corners of images. As a typical algorithm for extracting corresponding points between two images, a block matching method in which an image is segmented into blocks which have respective points in the image as the centers and each have a predetermined size, and points corresponding to the maximum correlation value between blocks are selected as corresponding points, may be used.

In order to perform position alignment, it is important that the background portions of the two images overlap each other at a predetermined ratio or higher. As a general measure of the ratio, the two images must overlap each other by an area of, e.g., 50% or more except for the image region of the object to be extracted.

Note that the minimum value of the overlapping area ratio varies depending on the pattern of the background image, needless to say. In particular, when the background region and the object region can be relatively easily separated, e.g., when the background has nearly a plain pattern or periodic pattern which is quite different from that of the object to be extracted, the overlapping area can be very small.

The image data comparison unit 411 generates difference image data between the background image after image conversion and the image including the object.

The image cutting unit 412 performs smoothing processing (median filter or the like) and statistical processing (based on a color component deviation and luminance level deviation) of the generated difference image data, thereby extracting an object region from a region with large variations.

More specifically, hue data $H_b$ and $H_t$, saturation data $S_b$ and $S_t$, and lightness data $V_b$ and $V_t$ are respectively extracted from the R, G, and B components and luminance signals of an image $I_b$ consisting of only the background after conversion and an image $I_t$ including the object, and the value of an evaluation function F given by equation (8) below is binarized by a predetermined threshold value to identify the object region and the background region.

$$F(H_b-H_t, S_b-S_t, V_b-V_t) = \alpha_h(H_b-H_t)^2 + \alpha_s(S_b-S_t)^2 + \alpha_u(V_b-V_t)^2 \qquad (8)$$

where $\alpha_h$, $\alpha_s$, and $\alpha_u$ are functions of the S/N values of the respective components of the images $I_b$ and $I_t$ or variances of the respective components when each image is segmented into blocks each having a predetermined size, and for example, $\alpha_h = P_h(I_b) \cdot P_h(I_t)$ or the like is used.

Note that $P_h(I)$ represents a monotone increasing function of the S/N value associated with a hue component in a predetermined region of image data I or a monotone decreasing function (reciprocal or the like) of the variance. Likewise, as $P_s(I)$ and $P_u(I)$, parameters associated with saturation and lightness are defined. A threshold value T for discriminating each point in a region may be set to be $T = T_h + T_s + T_u$ if $T_h$, $T_s$, and $T_u$ are obtained by applying the Otsu's method (*Journal of Papers of The Institute of Electronics, Information and Communication Engineers*, Vol. J63, pp. 349–356, 1980) to the respective terms of the evaluation function, e.g., $(H_b-H_t)^2$, $(S_b-S_t)^2$, and $(V_b-V_t)^2$.

Note that the above-mentioned evaluation function and parameters are not limited to the above-mentioned specific definitions. The threshold value itself may be a predetermined constant value over the entire region of the image.

Connected regions which are discriminated to be object regions as a result of the threshold value processing are labeled, and are displayed on the display 417 as mask image data with different colors, luminance values, hatching patterns, or the like.

In this case, an isolated region of connected regions, i.e., a blob region in the background may be considered as an identical object region, and may be converted to a label identical to that of object regions that surround it. The user selects and indicates one of the object regions to be extracted using a mouse (not shown) or the like (by clicking the region using the mouse), and consequently, only the object image after the background or the like is removed is displayed on the display 417.

When the extracted image data is satisfactory, the user inputs a confirmation instruction by clicking, e.g., a confirmation icon. Then, image data of only the object is encoded, and generation of an image data file is executed.

(1) of FIG. 22 shows an example of the image including a specific object, in which both the images of the object and the background are sensed, and (2) of FIG. 22 shows an example of the background image. The image including the object shown in (1) of FIG. 22 is sensed in the image sensing mode that gives optimal sensing condition to the object (person).

The background image shown in (2) of FIG. 22 is sensed at the same magnification and the image signal characteristic are adjusted optimal to the background. The image data of these images often have slightly different characteristics (average luminance level, color components) even on an identical background portion, and (2) of FIG. 22 emphasizes such difference.

(3) of FIG. 22 shows the result of normalization of the background image on the basis of the image sensing conditions of the image including the object. The cutting processing is performed on the basis of difference data (the result of the comparison processing in step S570 above) between the image (1) including the object and the image (3) consisting of only the background (4) of FIG. 22 shows the result of the cutting processing.

Note that a registered image may be retrieved and extracted from the image database 418. In this case, the registered image means an image including a specific object in this embodiment, and the same processing is performed by utilizing additional information upon image sensing recorded in the header portion of an image or in a header file.

The second embodiment of an image sensing apparatus that converts the background image will be explained below.

In the second embodiment, processing that can prevent both the image quality of the object image and the cutting precision from being impaired is performed independently of the image sensing order of the background image and the image including the object.

For this purpose, in this embodiment, an image is sensed and recorded under a condition in which the magnification condition is maintained constant while other image sensing conditions can be independently set. In this case, when an image including a specific object is sensed, the image sensing mode that gives priority to the image quality of the object image is selected.

Figure 21:
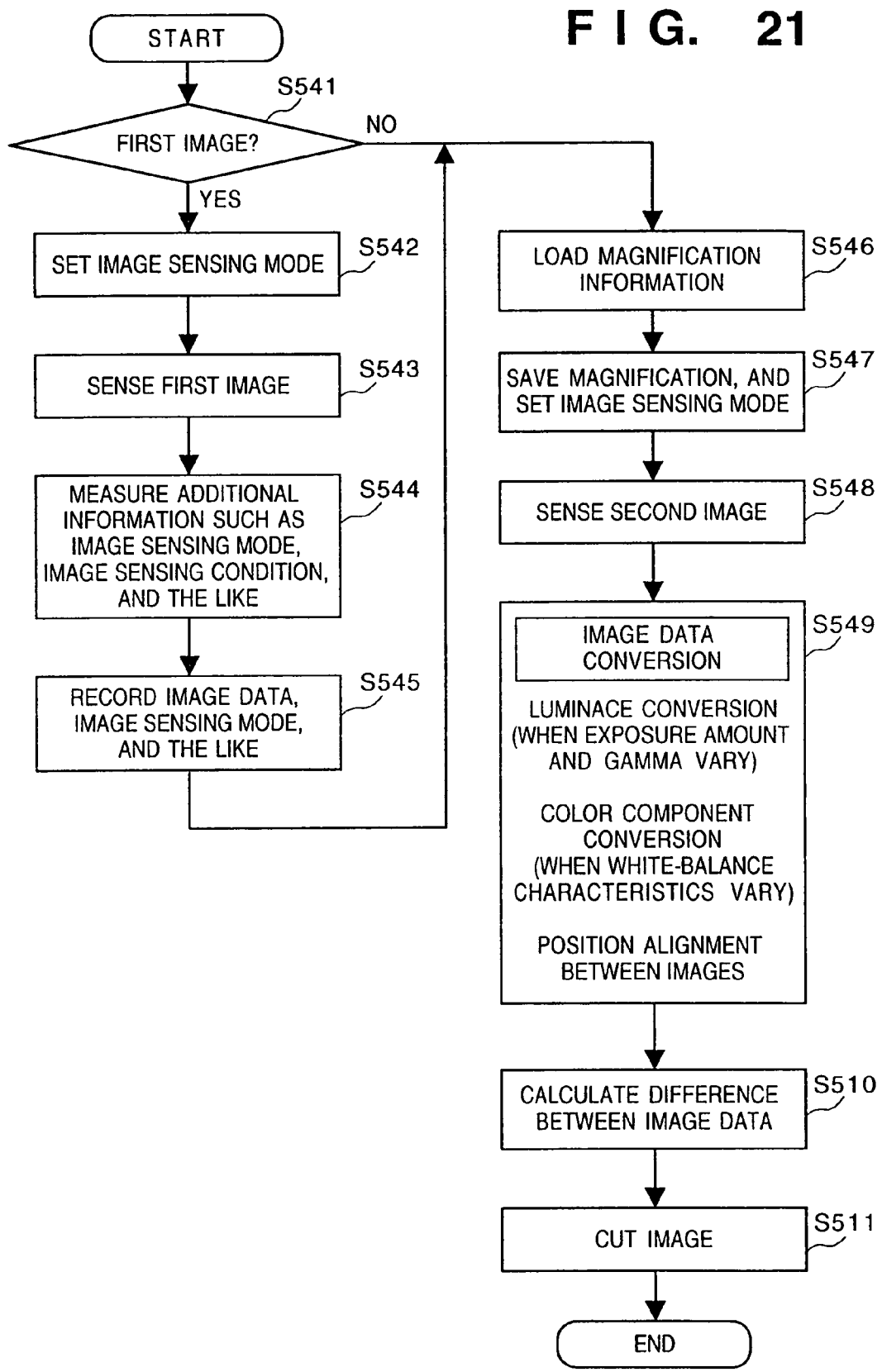
FIG. 21 is a flow chart showing the processing of another embodiment of image conversion.

FIG. 21 shows the processing flow of the second embodiment. Note that first and second images in FIG. 21 respectively-correspond to-the background image and the image including the object, or vice versa in the above description.

Referring to FIG. 21, in image data conversion processing in step S549, one of two image data is converted to adjust its image sensing conditions to those of the other image data, and position alignment between the two images is performed, as in the first embodiment.

Prior to this processing, two image data may be converted into low-resolution images by subsampling or local averaging processing. This is because the focusing state (resolution) may often largely vary between the background region of the image including the object and the corresponding region of the background image even when the magnification condition remains the same. As described above, when both the two images are converted into low-resolution images, and the converted images are processed, the efficiency and precision upon roughly estimating the object region can be improved.

According to this embodiment which converts the background image, since the image sensing conditions are recorded, and image data is converted on the basis of the recorded image sensing conditions, when a specific object is extracted by comparing a plurality of images such as a registered image and a current image, different frame images in a moving image, or the like, the margin for different image sensing conditions in the respective images can be increased. As a result, when a specific object image is extracted from the background image, the object can be satisfactorily extracted irrespective of small variations in position of the image sensing means owing to camera shake, differences in exposure condition, variations in gain of the sensor, and the like. The margin for variations in, e.g., illumination condition can be increased without using any model associated with the object to be extracted such as a color model.

Since difference image data is used as comparison data between the background image and the image including the object, the margin for variations in image sensing conditions and camera parameters can be increased, and the processing for cutting out a specific object from the background can be efficiently performed.

Since image data of the background image is converted using the image including the object sensed under the same image sensing conditions as those used upon sensing the background image, the margin for variations in image sensing conditions and camera parameters can be increased on the basis of both the background image and the image including the object, and a high-quality object image can be extracted independently of the image sensing conditions used. upon imaging the background image. Therefore, a high-quality in-focus image of the object to be cut can be output.

Since image data of a specific image region obtained by the image cutting unit is encoded and recorded in the image recording unit, the extracted image can be efficiently encoded, and image extraction can be satisfactorily performed.

Since the space shift operation is performed to maximize the similarity between the background image and the image including the object, image extraction that permits variations in position or posture of the image sensing unit can be attained, and image extraction which has little adverse influence from, e.g., camera shake upon image sensing can be realized.

Since the image sensing conditions include the exposure amount, focusing state, and the presence/absence of flash emission, a specific object image can be extracted from a plurality of images sensed under different image sensing conditions, and image extraction with a large margin for variations in magnification condition, focusing state, contrast, illumination condition, and the like can be realized.

Since the image data conversion unit converts the image size, luminance level, color components, and resolution, image data of a plurality of images sensed under different image sensing conditions can be normalized, and specific object extraction processing based on comparison between images can be performed with high precision, thus realizing high-precision object image extraction.

<Example of Controlling Template>

Figure 23:
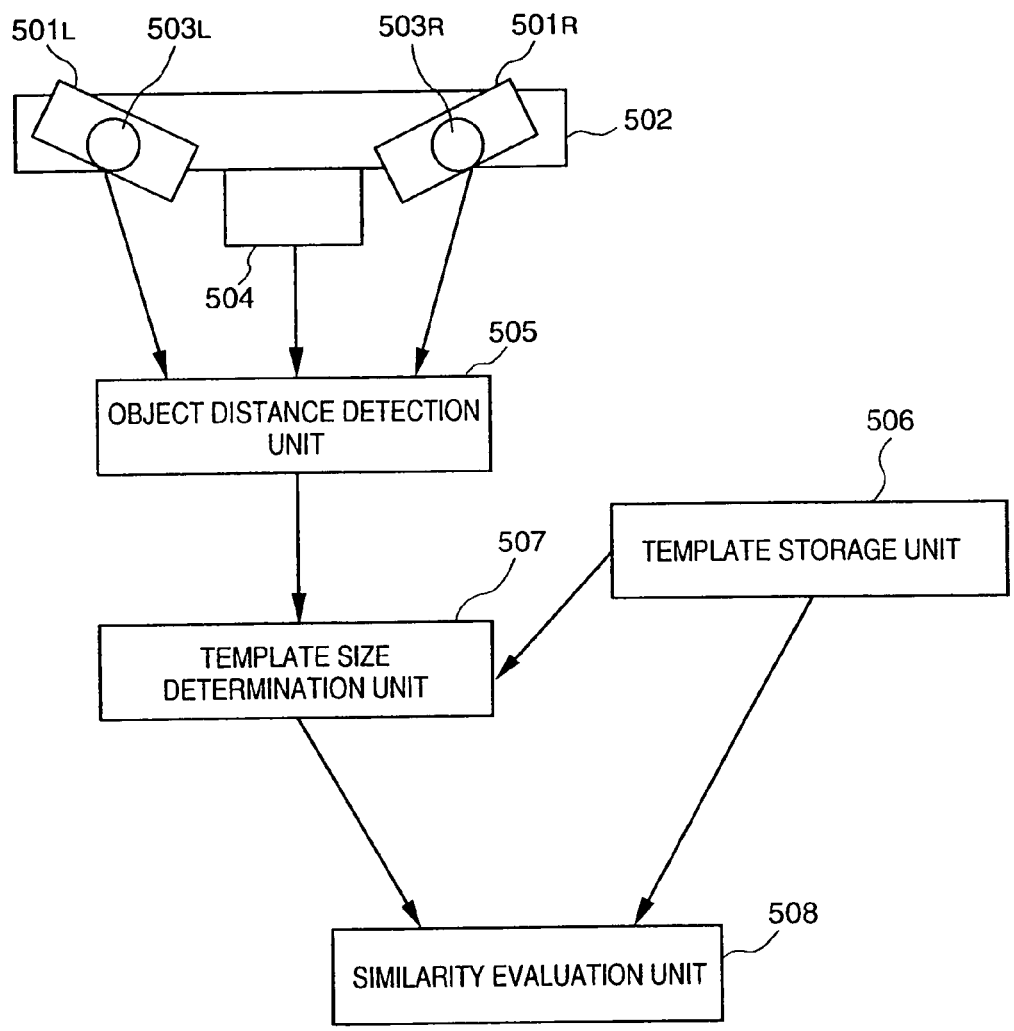
FIG. 23 is a block diagram showing another arrangement of an apparatus according to the present invention.

FIG. 23 is a block diagram showing the arrangement of principal part of the first embodiment of an image sensing apparatus which controls a template. Referring to FIG. 23, reference numerals $501_R$ and $501_L$ respectively denote right and left cameras; 502, a stage having a base length measurement control unit between the right and left cameras; and $503_R$ and $503_L$, optical axis direction measurement control units for varying the convergence angle between the cameras $501_R$ and $501_R$ and detecting their optical axis directions and convergence angle. More specifically, the units $503_R$ and $503_L$ pivotally mount the cameras $501_R$ and $501_L$ on the stage 502, vary the convergence angle defined between the cameras by pivoting them via motors, and have the sensor positions of rotation angle detectors for detecting the pivot positions of the cameras at substantially the pivot centers.

Reference numeral 504 denotes an image sensing system control unit for systematically controlling the base length, convergence angle, focal lengths, and the like between the right and left cameras. An image sensing unit of this embodiment is constituted by the above-mentioned constituting elements.

Reference numeral 505 denotes an object distance detection unit which processes images from the cameras $501_R$ and $501_L$ and calculates the distance to an object included in image frames on the basis of optical parameters of the image sensing unit, the disparity between the right and left image frames, or its distribution (the calculation method will be described in detail later).

Reference numeral 506 denotes a template storage unit which incorporates various templates used for evaluating the similarity between overlapping regions of the two images obtained from the cameras $501_R$ and $501_L$, i.e., the regions of images commonly sensed by the two cameras. The template storage unit 506 comprises means capable of recording an image such as a magnetic (optical) disk memory, a tape type memory, and the like.

The templates include images of the respective portions (head portion, hands, leg, and the like) including the whole figure of a person, similar images of animals and plants, and various other images such as vehicles, gadgets to buildings, downtown sceneries, and the like that are registered by the user, and are not particularly limited to specific ones. Preferably, the template may be an image including only one object to be registered or its simplified image (for example, an image corresponding to a portion of image information upon image sensing or generating an original image or obtained by processing such image information to decrease the information amount or the number of bits, such as an image obtained by binarizing an image from the image sensing unit by a predetermined threshold value or silhouette image, an image consisting of only the contour line of an object, or the like).

Reference numeral 507 denotes a template size determination unit, which determines an appropriate size of a template used in a similarity evaluation unit 508 on the basis of information output from the object distance detection unit 505, and outputs the determined size to the similarity evaluation unit 508.

The processing of the object distance detection unit 505, the template size determination unit 507, and the similarity evaluation unit 508 will be explained below. Note that the processing programs shown in the following flow charts may be stored in advance in a ROM or may be loaded from an external storage medium to a RAM when they are executed.

(1) Processing of Object Distance Detection Unit 505

Figure 24:
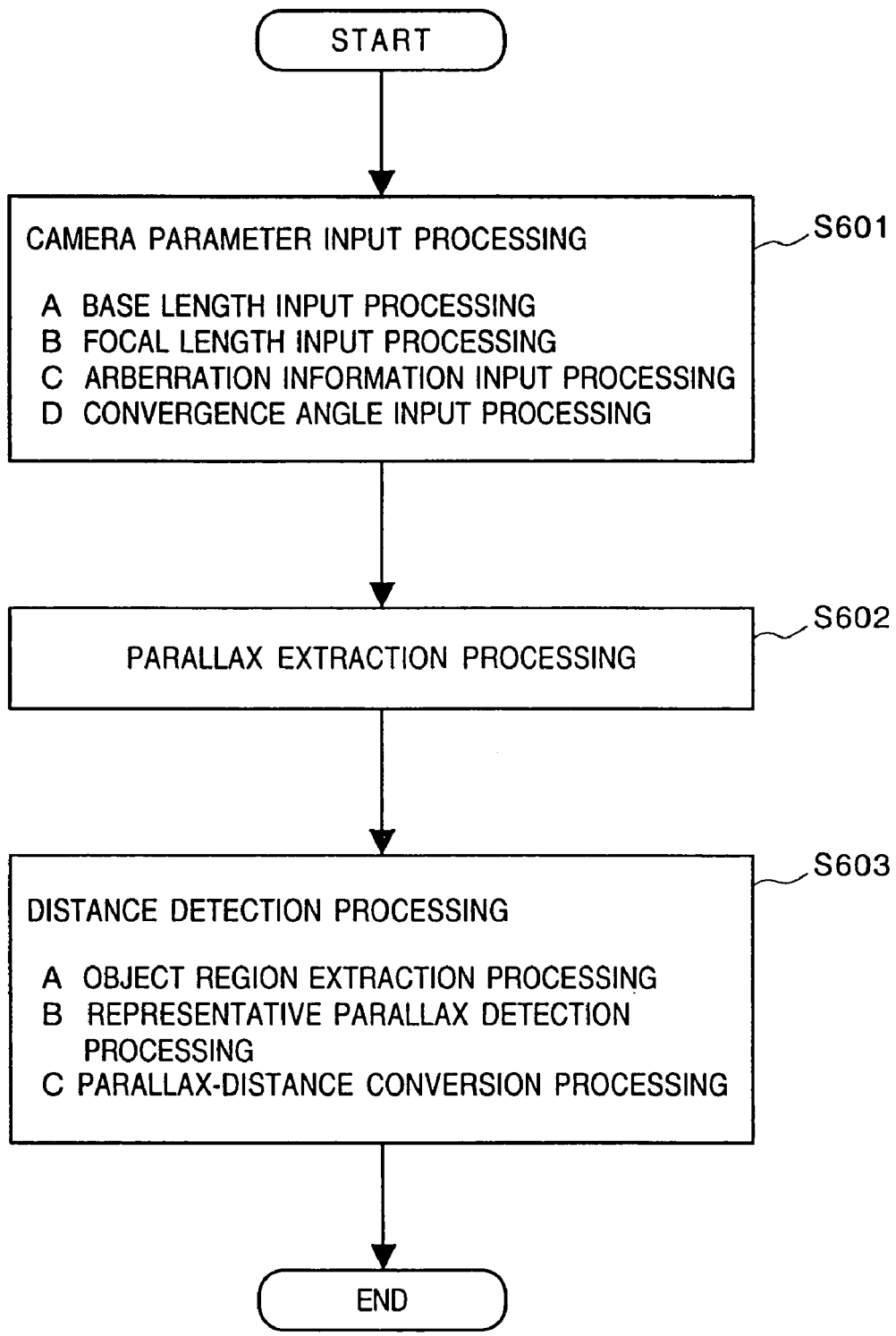
FIG. 24 is a flow chart showing the processing of an object distance detection unit in an embodiment of template determination.

FIG. 24 is a flow chart showing the processing of the object distance detection unit 505.

Camera Parameter Input Processing (S601)

The image sensing system control unit 504 obtains the base length from the base length measurement control unit (not shown) on the stage 503 (base length input processing), the convergence angle between the cameras $501_R$ and $501_L$ from the optical axis direction measurement control units $503_R$ and $503_L$ (convergence angle input processing), and the focal lengths of the cameras from the driving measurement control mechanism of the lens groups of the cameras $501_R$ and $501_L$ (focal length input processing).

In the case of a fixed focallength, the value may be stored in a ROM of the control unit 504. On the other hand, the cameras $501_R$ and $501_L$ or the object distance detection unit 505 may store aberrations (especially, distortion) corresponding to the focal lengths in a ROM or the like, and aberration information may be input (aberration information input processing).

These input parameters are used when the disparity distribution between two images extracted from the two images from the cameras $501_R$ and $501_L$ is converted into depth (distance) information of an object on a reference coordinate system arranged on the image sensing unit.

Disparity Information Extraction Processing (S602)

Images sensed by the right and left cameras $501_R$ and $501_L$ are input, and the disparity (horizontal shift amount of pixels between corresponding points) in the overlapping region between the two images is obtained by image processing.

For example, a region-based technique exemplified by a method in which each of right and left images is segmented into blocks by a predetermined method, and the correlation value between corresponding blocks is calculated, and a feature-based technique for extracting feature components such as edges, line segments, and the like in an image, and performing matching between the extracted feature components are available (Dhond & Aggarwal, IEEE Trans. on System, Man, and Cybernetics, Vol. 19, 1489–1510). In this embodiment, the disparity distribution in the overlapping region need only be extracted, and the extraction method need not be limited.

Distance Detection Processing (S603)

This processing calculates the distance to an object present in the overlapping region on the basis of the disparity distribution. In this embodiment, a region in which the disparity value is larger than a predetermined value (falls within the predetermined distance range) and its variance is smaller than a predetermined threshold value (i.e., values are roughly uniform) is extracted (object region extraction processing), and representative disparity detection processing is performed for the extracted region.

The representative disparity may be obtained by calculating a representative value by executing statistical processing for the disparity distribution such as the average value or peak value of the disparity values in the object region.

The disparity-distance conversion processing will be described below.

Figure 25:
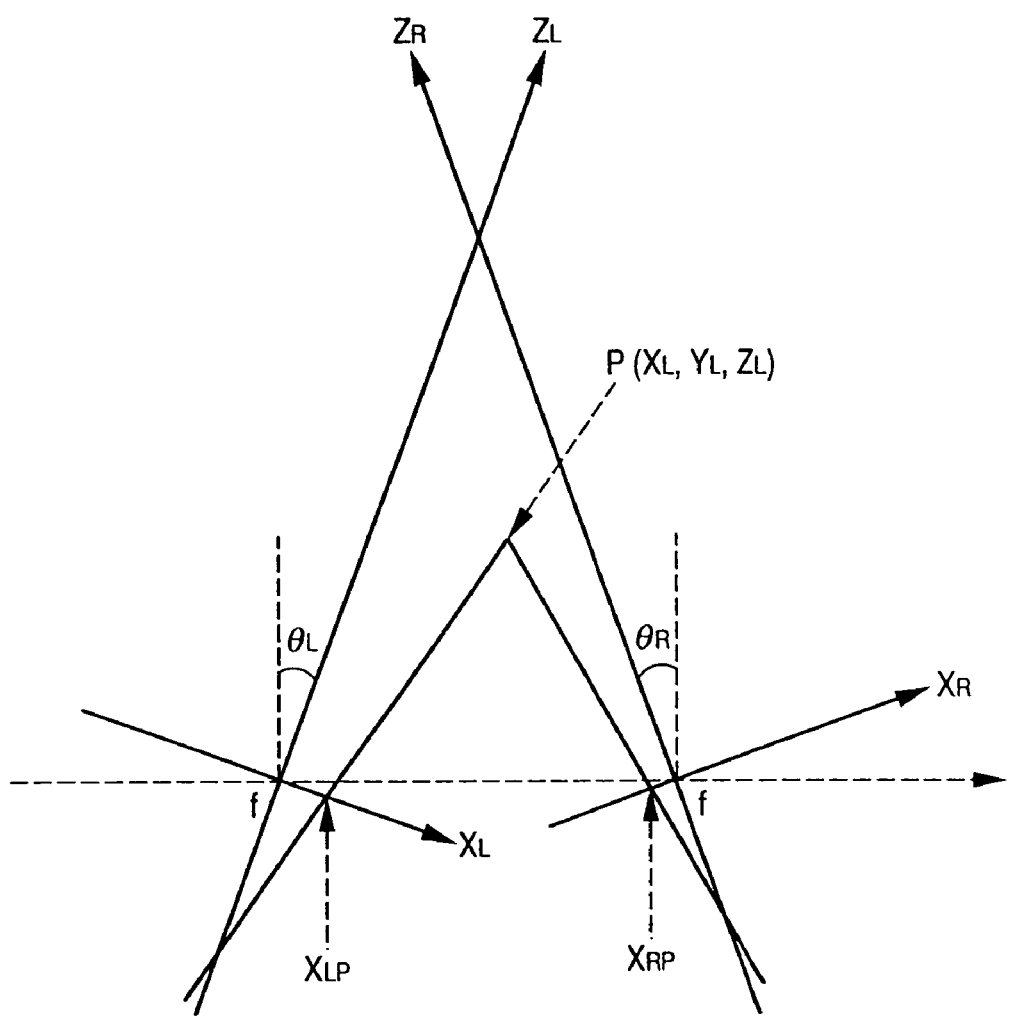
FIG. 25 is a view showing the coordinate system and parameters of an image sensing unit in the embodiment of template determination.

FIG. 25 shows the distance measurement coordinate system. In this embodiment, $Z_L$ is given by the following equation (9):

$$Z_L = f \frac{(a - X_{LP})(X_{RP}\sin\theta + f\cos\theta) + b(f\sin\theta - X_{RP}\cos\theta) + fX_{RP}}{(X_{RP}X_{LP} + f^2)\sin\theta + f(X_{LP} - X_{RP})\cos\theta} \quad (9)$$

The base length, l, between the right and left cameras is given by the following equation (10):

$$l = \sqrt{a^2 + b^2} \quad (10)$$

Note that the aberration information is used for eliminating the influence of distortion on the screen upon calculating $Z_L$ from the corresponding point positions between the right and left images.

The way of setting the coordinate system is not limited to a specific one in this embodiment. For example, a reference coordinate system in which the origin is set at the middle point on the base length between the right and left cameras, the X-axis is set in the base length direction, Z-axis is set in the depth measurement direction perpendicular to the X-axis, and the Y-axis is set in a direction perpendicular to these two axes, may be set.

(2) Processing of Template Size Determination Unit

Figure 26:
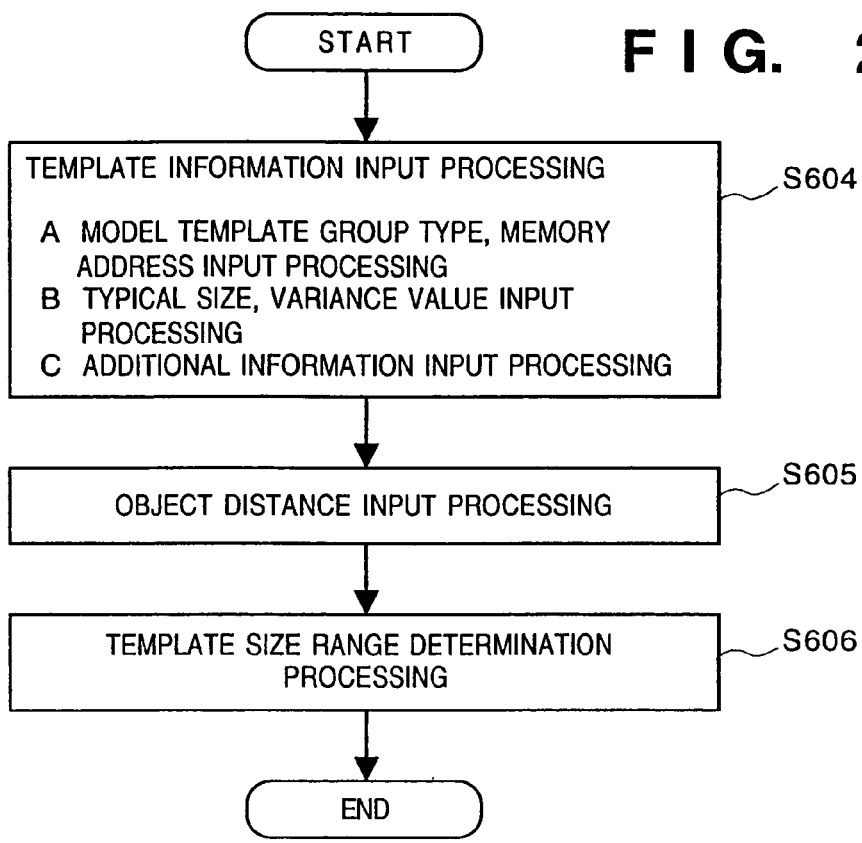
FIG. 26 is a flow chart showing the processing in a template size determination unit.

The processing in the template size determination unit 507 will be described below with reference to FIG. 26.

Template Information Input Processing (S604)

From the template storage unit, the type and address information of a template group associated with one specific object, i.e., a template group including different object images viewed from different view point positions or visual axis directions or different object images that change upon movement of an object and are viewed from one direction, are input. Furthermore, the typical size of the specific object, i.e., the statistical average value and variance are input.

For example, in the case of a template corresponding to the whole figure of a person, the size corresponds to the height, shoulder length, or the like; in the case of a template corresponding to the hand, the size corresponds to the arm length or the length from the wrist to the finger tip. As regards the size, in addition to the above-mentioned information, the coordinate origin is set at the center of the sensor surface of the left camera 501$_L$ of an object image obtained based on a predetermined focal length and a predetermined object distance, the $Z_L$-axis is set in a direction normal to the sensor surface or the optical axis direction, the $X_L$-axis is set in the disparity detection direction on the sensor surface, and the $Y_L$-axis is set in a direction perpendicular thereto.

In this manner, the reference coordinate system is defined on the left camera as a standard coordinate system. In FIG. 25, a point P is the object point in the three-dimensional space, and $X_{LP}$ and $X_{RP}$ are the imaging point positions of the point P on the sensor surfaces of the right and left cameras, i.e., the coordinates on the $X_L$- and $X_R$-axes.

$\theta_R$ and $\theta_L$ are parameters indicating the optical axis directions of the right and left cameras, i.e., the angles which are present in a plane including the depth measurement direction and are formed by a direction perpendicular to the base length direction of the right and left cameras. In FIG. 25, $\theta_L < 0$, and $\theta_R > 0$.

Given $\theta = |\theta_L| + |\theta_R|$, $\theta$ represents the convergence angle between the right and left cameras. For the sake of simplicity, the point P is located at a position separated by equal distances from the right and left cameras, and the focal lengths of the right and left cameras equal each other, i.e., "f".

The coordinate origin position of the right camera is represented by (a, 0, b) on the reference coordinate system of the left camera, and the $Z_L$-coordinate of the point P is approximated as a depth measurement value.

$X_{LP} - X_{RP}$ represents the disparity. In this embodiment, when $Z_L$ is calculated from the values of $X_{LP}$ and $X_{RP}$, $X_{LP} - X_{RP}$ may be the size on the screen or the size of a polygon including an object image on the screen.

Object Distance Input Processing (S605)

The object distance is detected and input by the object distance detection unit 505 by executing the processing shown in the flow chart of FIG. 24.

Template Size Determination Processing (S606)

This processing determines an appropriate range of the template size on the basis of the distance information obtained by the object distance detection unit 505.

For example, a statistical average value S associated with the human's hand size is defined as follows as a central value So' of the size on the screen using the focal length f of the image sensing unit and the object distance d:

$So' = fS/(f+d)$

The range of a template size S' is defined by:

$So' - \alpha f\Delta/(f+d) \leq S' \leq So' + \alpha f\Delta/(f+d)$ where $\Delta$ is the statistical variance of the object size, and $\alpha$ is an arbitrary constant in the range $0 < \alpha \leq 1$. In the present invention, the upper and lower limits of the size range are determined by the variance value using the statistical average value as the center.

Note that the focal length f of the image sensing unit may be input from the object distance detection unit, may be directly input from the image sensing unit, or may be input from a computer (not shown).

(3) Processing of Similarity Evaluation Unit 508

Figure 27:
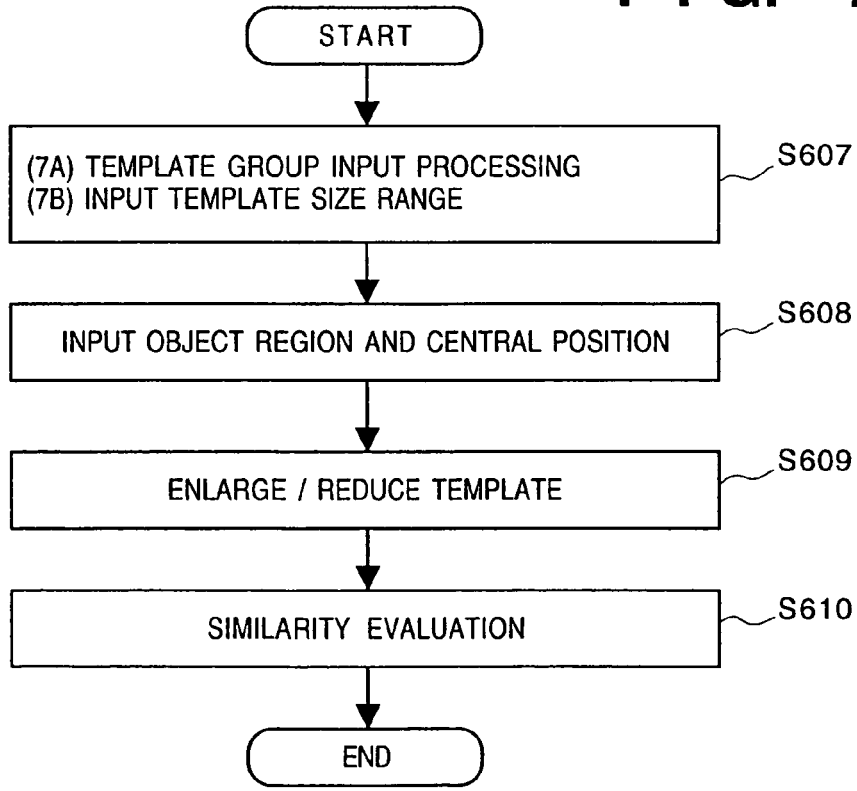
FIG. 27 is a flow chart showing the processing in a similarity evaluation unit.

The processing in the similarity evaluation unit, 508 will be described below with reference to FIG. 27.

(S607) A template group having a standard size is input from the template storage unit in association with a specific object designated in advance by the user by a predetermined method, and the size range is input from the template size determination unit.

(S608) The object region on the screen is input from the object distance detection unit, and its central position (e.g., the barycentric position) is calculated.

At this time, which of images from the right and left cameras is used is set in advance. In this embodiment, the object region is in the overlapping region, as described in the paragraphs of the distance detection processing, and a region in which the disparity value is equal to or larger than a predetermined value, and its variance is smaller than a predetermined threshold value.

(S609) For example, three different sizes of the template group associated with one object and having the standard size are selected from the size range, each template having the standard size is reduced or enlarged to the selected sizes by an appropriate method, and similarity evaluation with the object region is performed at the respective sizes.

Note that only one size may be selected from the size range. As the similarity evaluation method, for example, the center of a template is adjusted to that of the object region, the square sum of the luminance level differences or hue differences between corresponding pixels in the object region is calculated, and if the calculated value is equal to or smaller than a predetermined threshold value, it is determined that the template matches the object region.

Furthermore, the template center may be set in a rectangular region having a predetermined range, which has the center of the object region as its center, and similarity evaluation may be performed.

As an example of another measure for similarity upon comparing regions having a pixel (i,j) as the center, functions given by the following equations are used:

$$C_1(n, m) = \frac{\sum_{(p,q) \in R} (I_{ij}^M(p, q) - I_{nm}(p, q))^2}{\sqrt{\sum_{(p,q) \in R} (I_{ij}^M(p, q))^2 \sum_{(p,q) \in R} (I_{nm}(p, q))^2}} \quad (11)$$

$$C_2(n, m) = \frac{\sum_{(p,q) \in R} I_{ij}^M(p, q) I_{nm}(p, q)}{\sqrt{\sum_{(p,q) \in R} (I_{ij}^M(p, q))^2 \sum_{(p,q) \in R} (I_{nm}(p, q))^2}} \quad (12)$$

$$C_3(n, m) = \frac{\sum_{(p,q) \in R} ((I_{ij}^M(p, q) - I_{nm}^{-M}) - (I_{nm}(p, q) - I_{nm}^{-R}))^2}{\sqrt{\sum_{(p,q) \in R} (I_{ij}^M(p, q) - I_{ij}^{-M})^2 \sum_{(p,q) \in R} (I_{nm}(p, q) - I_{nm}^{-R})^2}} \quad (13)$$

$$C_4(n, m) = \frac{\sum_{(p,q) \in R} (I_{ij}^M(p, q) - I_{nm}^{-M})(I_{nm}(p, q) - I_{nm}^{-R})}{\sqrt{\sum_{(p,q) \in R} (I_{ij}^M(p, q) - I_{ij}^{-M})^2 \sum_{(p,q) \in R} (I_{nm}(p, q) - I_{nm}^{-R})^2}} \quad (14)$$

where $$I_{ij}^M(p, q) \quad (15)$$

represents the luminance, hue, or the like of a pixel at the pixel position (p,q) of the template image having (i,j) as the center.

R is the template region or object region, and the following variable represents the luminance average value or the average value of parameters associated with hue on the region R of the template image:

$$I_{ij}^{-M} \quad (16)$$

Similarly, $I_{mm}(p,q)$ represents the luminance or hue of a pixel at the pixel position (p,q) of the object region having (n,m) as the center in the image obtained from the image sensing unit, and $$I_{nm}^{-R} \quad (17)$$

represents the luminance average value or the average value of hue parameters on the region R in the sensed image.

By the processing in the similarity evaluation unit in this embodiment, a specific object or its additional information can be stably extracted at high speed with a small memory capacity.

Figure 28:
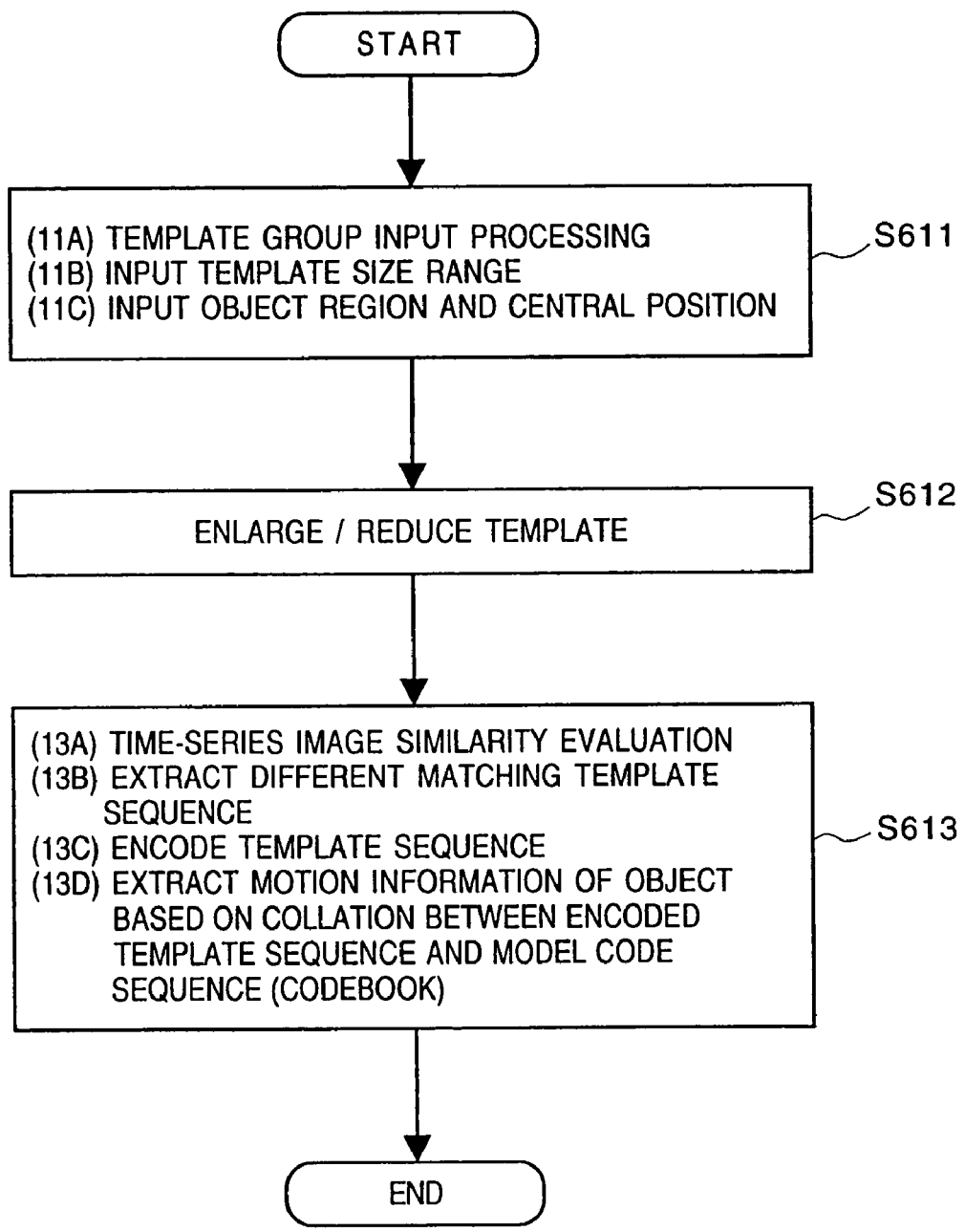
FIG. 28 is a flow chart showing the processing of the similarity evaluation unit in another embodiment of template determination.

FIG. 28 shows the processing of a similarity evaluation unit in the second embodiment of an image sensing apparatus which controls a template. In this embodiment, the motion pattern or action category of an object is extracted by processing a moving image including an object from the image sensing unit in the basic arrangement shown in FIG. 23.

In particular, in order to deal with time-series images, (11A) the template group input processing, (11B) the template size range input processing, and (11C) the object region & central position input processing in processing step S611 are simultaneously performed, and thereafter, the template having the standard size is enlarged/reduced in processing step S612. Then, similarity evaluation (processing steps 13A, 13B, 13C, and 13D) is performed in processing step S613.

A case will be explained below wherein an action such as a body gesture, hand gesture, or the like is to be extracted.

Figure 29:
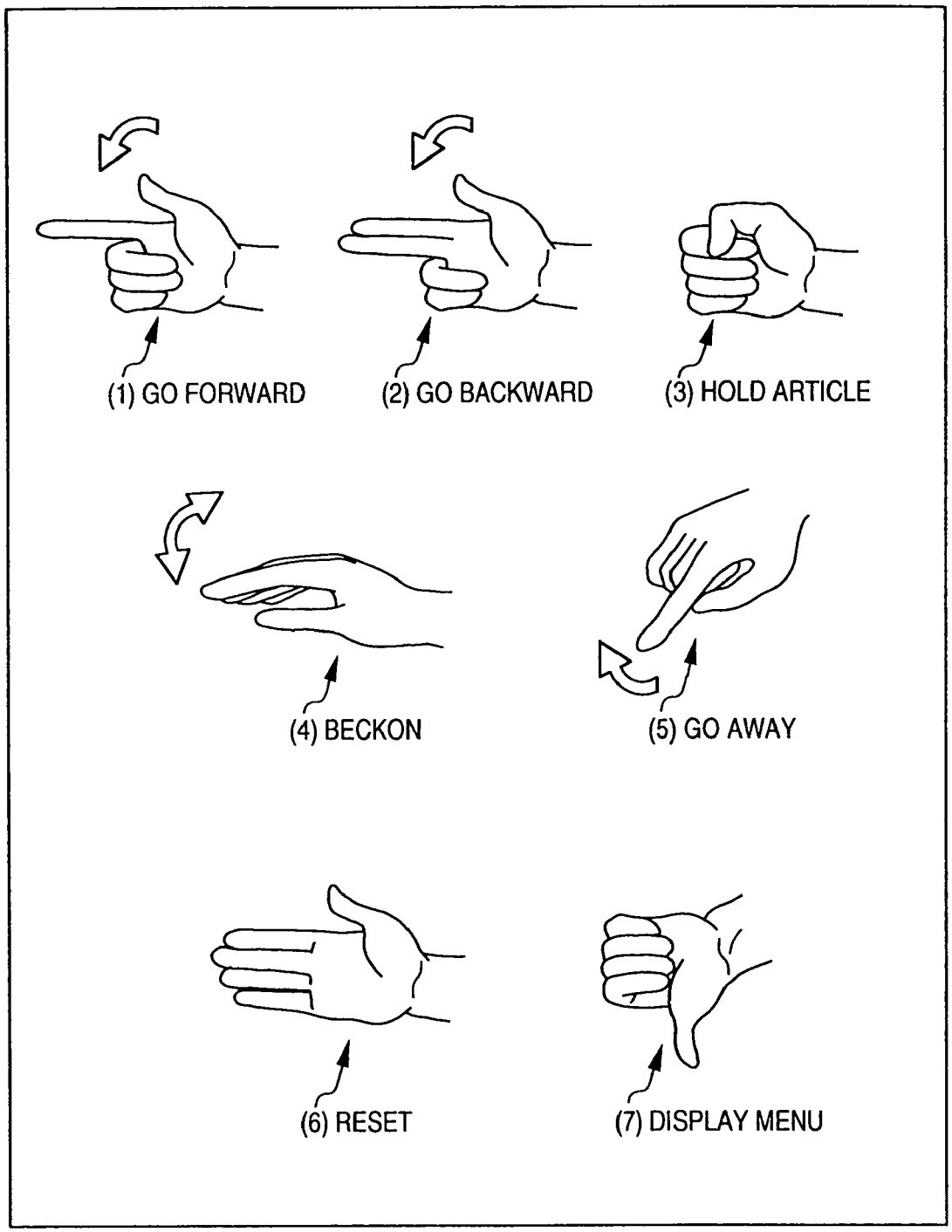
FIG. 29 is a view showing examples of original images used for creating templates to be stored in a template storage unit.

FIG. 29 shows examples of original images for forming templates, which are used for extracting gesture categories of hand gestures. For one gesture category, a plurality of different hand images are used as templates on the basis of the motion patterns of the hand viewed from the view point position in a predetermined direction.

In this case, at least two different images. are used from the start to end of a hand gesture corresponding to one meaning information or command information.

In processing step (13A), the similarities of time-serially input images are evaluated.

In processing step (13B), a template sequence corresponding to the hand gesture obtained as a result of matching with a template group is extracted.

For example, when a template image at the beginning of an action corresponding to a command category "beckoning" shown in (4) of FIG. 29 is encoded as 4A, and a template image corresponding to the time after an elapse of half the required action time is encoded as 4B (processing step (13C)), a template sequence like 4A, 4B, 4A, 4B, . . . is extracted in correspondence with action (4) shown in FIG. 29.

The sequence is updated only when a different template code is extracted between frames. By performing collation or discrimination processing between the template sequence and commands prepared in advance or a template code sequence corresponding to the action category, the hand gesture is finally recognized.

FIG. 32 shows the correspondence between the gesture categories and encoded template sequences (codebooks).

Note that this embodiment is not limited to the hand gesture, but can also be used for extracting information associated with actions of persons, animals, machines, vehicles, and the like, needless to say.

Figure 30:
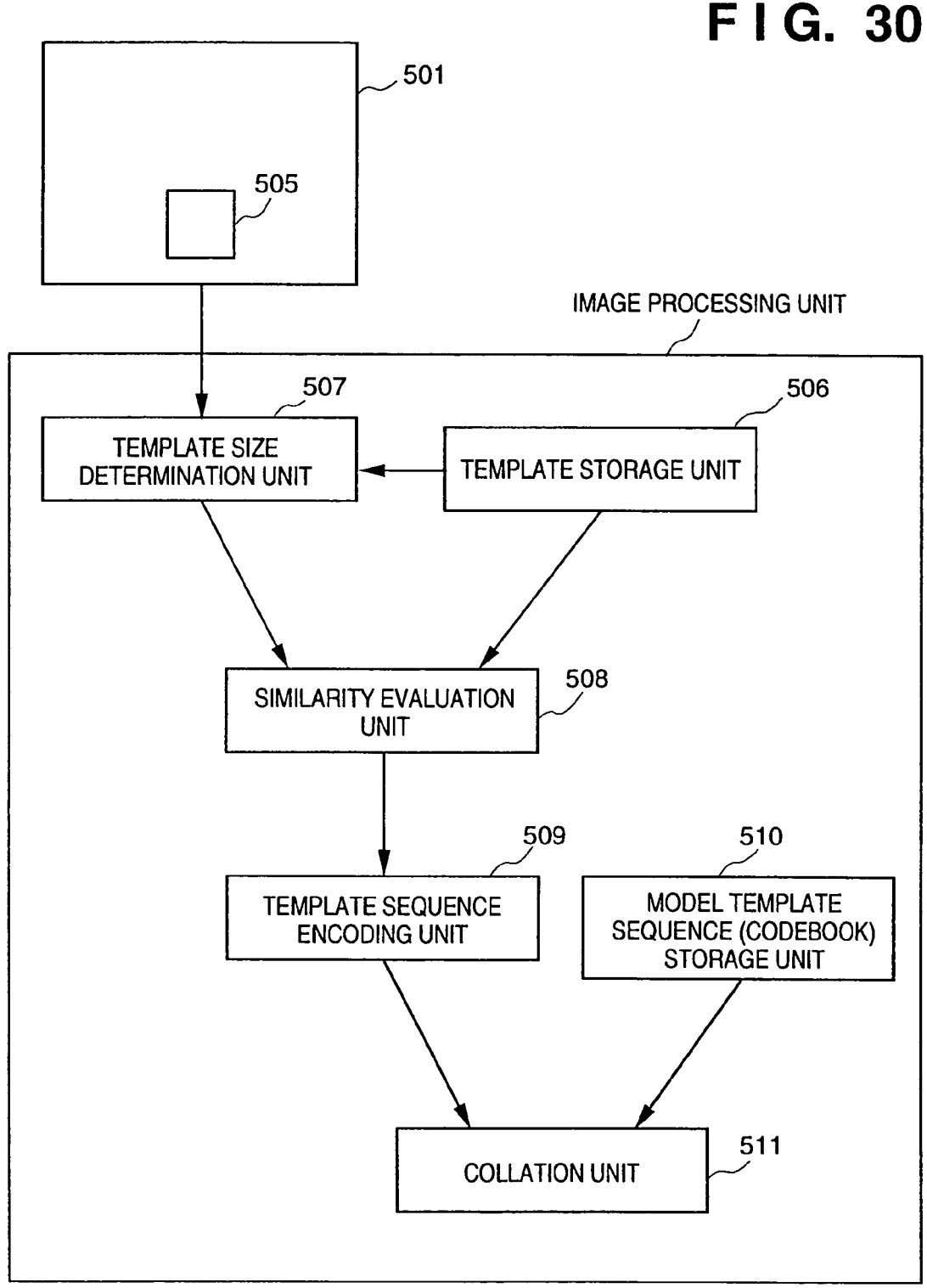
FIG. 30 is a block diagram showing another arrangement of an apparatus according to the present invention.

FIG. 30 is a block diagram showing the arrangement of principal part of the third embodiment of an image sensing apparatus which controls a template. In this embodiment, an image sensing unit 501 is a single video camera which incorporates an object distance detection unit 505 (or a focusing discrimination unit). In FIG. 30, other principal part arrangements of the image sensing unit such as a lens optical system, a lens driving system, a control system, and a signal processing system are not shown.

Other units 506 to 508 are the same as those in FIG. 23, but may be grouped as an image processing unit, which can communicate with the image sensing unit. As an example of the object distance detection unit 505, a method of irradiating light waves (electromagnetic waves) in the object direction, receiving waves reflected by the object, and measuring the phase of the received waves and the like are available in addition to the focusing discrimination unit (including active and passive systems). With this method, object distance detection with higher precision can be realized.

In this embodiment, the apparatus may be applied to motion pattern detection or actin detection of a moving object, may recognize a specific object which nearly stands still and perform an image sensing operation having the object as the center when a person or a machine that holds the image sensing unit 501 freely moves about and performs an image sensing operation, or may extract the motion information of the image sensing unit 501 itself as the third object.

Figure 31:
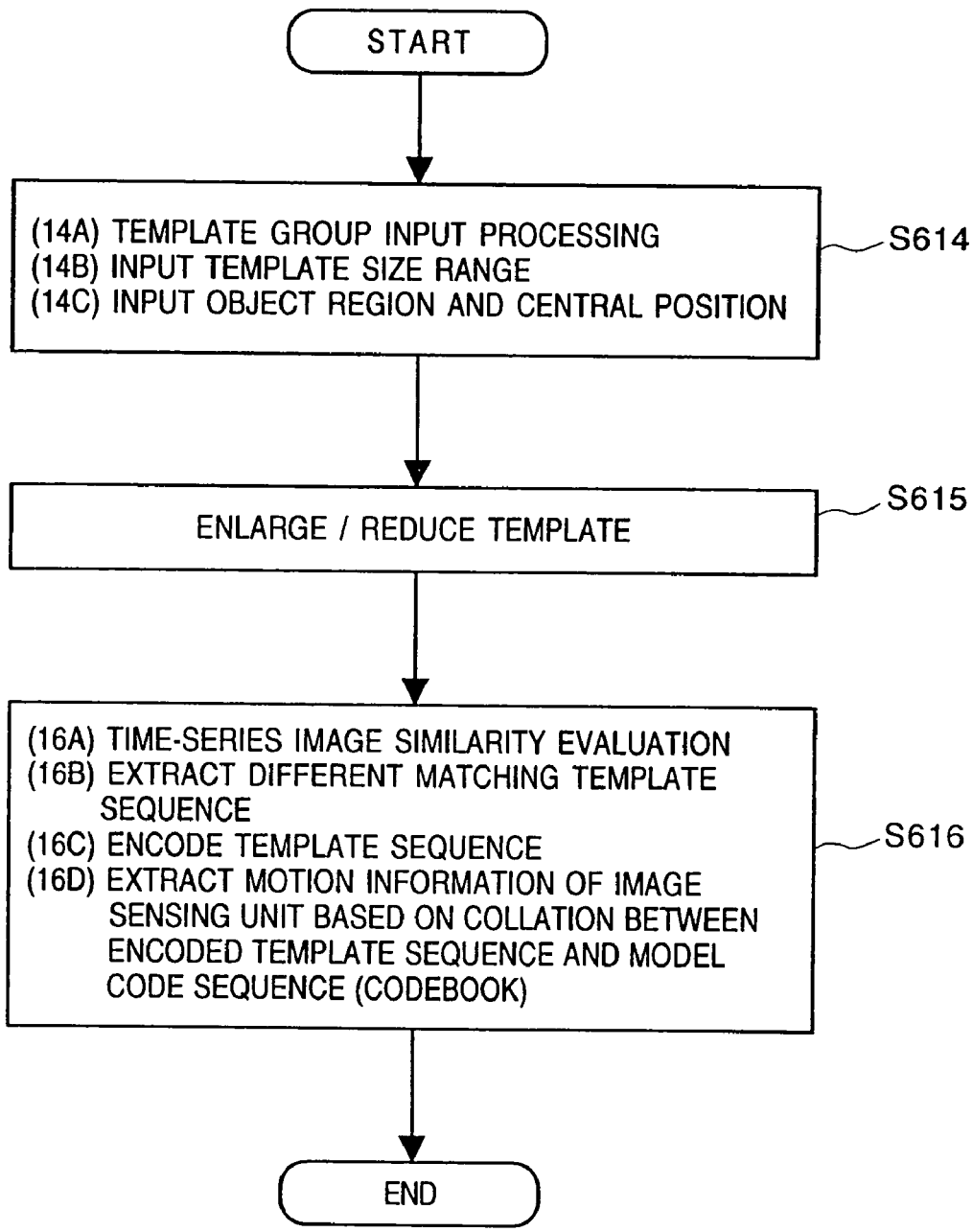
FIG. 31 is a flow chart showing the processing in the similarity evaluation unit upon extracting action (motion) information of the image sensing unit or an object.

FIG. 31 is a flow chart showing the processing of this embodiment. In FIG. 31, the processing operations in processing steps S614 and S615 are the same as those in processing steps S611 and 612 in the flow chart shown in FIG. 28.

In a similarity evaluation unit 508, as shown in FIG. 31, time-series image similarity evaluation processing and extraction of a matching template sequence are performed in processing steps 16A and 16B (the same as processing steps 13A and 13B in step S613 in the flow chart shown in FIG. 28). Then, a template sequence encoding unit 509 encodes the template sequence (processing step 16C). In processing step (16D), a collation unit 511 performs collation between the encoded template sequence and a model code sequence which corresponds to the self motion pattern of the image sensing unit or the action category of an object and is stored in a model template sequence storage unit 510.

As the fourth embodiment, similarity evaluation with an image obtained by the image sensing unit is performed by emphasizing a specific color component in a specific object in a template.

FIG. 33 is a flow chart showing the processing of a similarity evaluation unit of this embodiment. In this embodiment, in input processing steps (17A) and (17B), an object and its information (e.g., the action pattern, the direction of the object, or the like) are extracted at high speed without inputting an object region and its central position. Template conversion processing step S618 is characterized in that template enlargement/reduction processing (the same as that in step S615 in FIG. 31) is performed in processing step 18A, and specific color component emphasis processing is performed (processing step (18B).

Subsequently, the same processing operations as in processing steps 16A to 16D in processing step S616 in FIG. 31 are performed.

As the fifth embodiment, repetitive processing is performed while sequentially controlling the resolution of template matching to be performed in similarity evaluation from coarse to fine.

FIG. 34 is a flow chart showing the processing of a similarity evaluation unit of this embodiment. In this embodiment, as in the fourth embodiment, neither an object region nor its central position are input. In FIG. 34, the processing in processing step S620 is the same as that in processing step S617 in FIG. 33.

Processing step 21A in processing step S621 corresponds to processing step 18A in processing step S618 in FIG. 33.

In processing step S618, an object and its information can be extracted at high speed by controlling the resolution from coarse to fine. More specifically, in processing step 21B in template conversion processing step S621, the template resolution is set in the lowest state, and matching with an image output from the image sensing unit is performed using the template, thereby estimating the object position on the screen.

In this case, in processing step 22A in processing step S622, when there are a plurality of regions each having a similarity evaluation value equal to or higher than a predetermined threshold value, substantially the central positions of these regions are recorded in a predetermined recording medium (not shown)

The flow returns to processing step 21B in processing step S621, and the resolution is increased to perform similarity evaluation having the recorded positions of the plurality of regions as centers and selection of an object region.

Other steps are the same as those in the third embodiment shown in FIG. 33. Note that the resolution step to be prepared can be arbitrarily set by the user.

In this embodiment, when there are a plurality of objects to be extracted on the screen, information extraction associated with their motions or actions may be performed by parallel processing.

According to this embodiment that controls a template, high-speed information extraction of an object can be stably attained while saving the memory capacity irrespective of the distance between the object and the image sensing unit or the size on the screen.

Also, information extraction of a specific object is hardly influenced by a difference in view angle of the object.

The object distance detection unit measures the distance between the object and the image sensing unit from an image, and at the same time, an object region on the screen can be extracted.

The appropriate size of the model to be subjected to matching can be automatically set.

Information extraction of the object can be attained without being sensitively influenced by variations in object size.

The motion information of the image sensing unit itself can be extracted from time-series images.

A specific object can be stably extracted from time-series images irrespective of the motion or action of the object.

Information associated with the motion or action of a specific object can be stably extracted at high speed.

Information associated with the motion or action category of a specific object can be stably extracted by a small memory amount.

Misalignment between the center of a template model and that of a specific object region can be absorbed, and information associated with the object can be extracted at high speed.

A specific object region and information associated with the object can be extracted at high speed.

Information associated with a specific object can be stably extracted at high speed without being influenced by variations in illumination condition, luminance level, and the like.

Information associated with a specific object can be stably extracted without being influenced by variations in background pattern.

The object distance can be stably detected with higher precision even in the darkness.

Since time-series images from the image sensing unit are subjected to matching calculations using a plurality of templates in the similarity evaluation unit so as to form a template sequence, and the template sequence is collated with a model sequence to extract a specific object, the object can be accurately and stably extracted at high speed without being largely influenced by changes and variations in background, and changes and variations in object size.

<Image Sensing System Using the Object Extraction Method>

An example of applying the method using images having different image sensing conditions as one of the object extraction methods of the present invention to the image sensing system will be explained below. Note that other object extraction methods can be applied as a matter of course.

Figure 35:
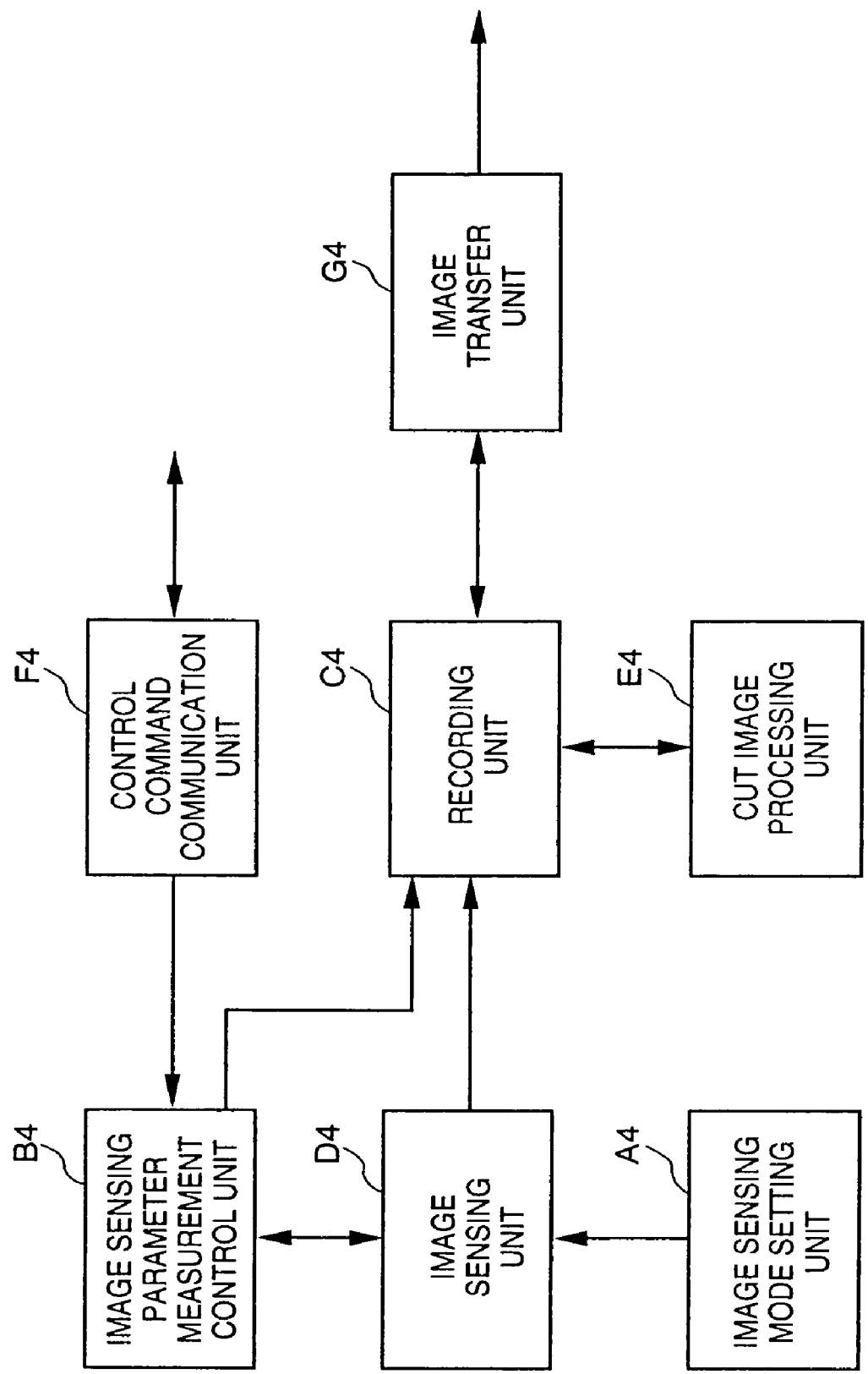
FIG. 35 is a functional block diagram showing another arrangement of principal part of an apparatus according to the present invention.

FIG. 35 is a functional block diagram showing the arrangement of principal part of an image sensing apparatus of this embodiment. Referring to FIG. 35, reference numeral A4 denotes an image sensing mode setting unit; B4, an image sensing parameter measurement control unit; C4, a recording unit; D4, an image sensing unit; E4, a cut image processing unit; F4, a control command communication unit; and G4, an image transfer unit.

The image sensing mode setting unit A4 sets the image sensing mode in which the image sensing unit D4 performs object extraction. Also, the image sensing mode setting unit A4 has an image sensing mode setting button (not shown), and starts the setting operation of the image sensing mode upon operation of the image sensing mode setting button. The image sensing mode setting unit A4 automatically returns to a standard image sensing mode after it sets the image sensing mode to fetch a required image.

The image sensing parameter measurement control unit B4 performs measurement and control of the image sensing parameters based on the image sensing mode set by the image sensing mode setting unit A4. Also, the unit B4 performs measurement control of the image sensing parameters based on a pre-set image sensing mode. Furthermore, the unit B4 controls the image sensing parameters on the basis of a control command supplied from the control command communication unit F4. Moreover, the unit B4 sets the control amounts of the image sensing parameters on the basis of the image sensing parameter measurement values, and can set desired priority order for the image sensing parameters.

The image sensing parameter measurement control unit B4 operates in accordance with a basic control program written in the internal storage unit of the image sensing apparatus or a detachable recording medium.

Furthermore, the image sensing parameter measurement control unit B4 comprises a lens layout control unit for controlling the lens layout of an imaging optical system on the basis of a signal from the image sensing mode setting unit A4, a focusing level detection unit for detecting the focusing level, and a fetching signal generation unit for generating a signal for fetching a plurality of images having different focusing levels on the basis of the output from the focusing level detection unit (none of them are shown).

The fetching signal generation unit controls the exposure conditions by controlling the shutter speed and the aperture diameter of an optical stop, or the characteristic value of an image sensor on the basis of a signal from the image sensing mode setting unit A4, and generates a signal for fetching a plurality of images having different exposure conditions.

The recording unit C4 records the image sensing parameters and images. The recording unit C4 stores a video signal before signal processing, and has a plurality of high-speed image recording units C4 and image transfer units G4. The recording unit C4 has an image compressing/encoding unit (not shown) corresponding to a moving image or still image, and can vary the compression method in correspondence with the type of extracted image in the image sensing mode for object extraction.

The image sensing unit D4 senses images for object extraction.

The image cutting processing unit E4 cuts out an image by performing predetermined processing of images obtained by the image sensing unit D4 under a plurality of different image sensing conditions. The unit E4 comprises a comparison data generation unit (not shown) for generating comparison data between a plurality of images obtained based on different image sensing parameters, and processes the image to be cut out on the basis of the comparison data generated by the comparison data generation unit and a control command supplied from the control command communication unit F4.

Furthermore, the image cutting processing unit E4 comprises an image cutting processing unit (not shown) for cutting out an image from time-series images, and an image tracking unit (not shown) for tracking time-series images using the extracted data obtained by the image cutting processing unit as initial data.

The control command communication unit F4 performs communications associated with control commands for controlling the image sensing operation of the image sensing unit D4.

The image transfer unit G4 transfers image data generated by the image sensing unit D4 to an external circuit.

According to the image sensing apparatus with the above-mentioned arrangement, optimal image sensing parameters can be set or controlled when the image sensing unit D4 senses images from which a specific object image is to be extracted. Since the image quality of the extracted image can be optimized by controlling the image sensing conditions, a high-quality object image can be extracted at high speed.

Since the amount of features amounts and the like of an image can be externally controlled, the image sensing operation for object extraction and image processing executed inside the image sensing apparatus can be remote-controlled, and an extracted image can be on-line transferred to a remote place.

Since the image sensing parameters can be controlled by supplying a control command from an external circuit via the control command communication unit F4, the image sensing parameters for object extraction can be externally controlled, and a high-quality extracted image and high-speed extraction processing can be realized.

The image sensing mode setting unit A4 has the image sensing mode setting button, starts the setting operation of the image sensing mode upon operation of the image sensing mode setting button, and sets the control amounts of the image sensing parameters on the basis of the image sensing parameter measurement values. With this operation, the image sensing parameters in the object extraction mode can be automatically set, and the user need not manually set the control amounts of the image sensing parameters.

The need for the operation for restoring the normal image sensing mode after the image sensing operation (image fetching operation) for extracting a specific object from a plurality of images having different image sensing conditions is completed can be obviated, i.e., the user need not set to return from the image sensing operation in the object extraction mode to that in the normal image sensing mode, thus improving operability.

Since the image to be cut is processed on the basis of comparison data generated by the comparison data generation unit and a control command supplied from the control command communication unit F4, pre-processing required for the cutting processing of a specific object image by controlling the image sensing conditions can be executed at high speed in the image sensing apparatus.

Since the apparatus comprises the lens layout control unit for controlling the lens layout in the imaging optical system on the basis of a signal from the image sensing mode setting unit A4, the focusing level detection unit for detecting the focusing level, and the fetching signal generation unit for generating a signal for fetching a plurality of images having different focusing levels on the basis of the output from the focusing level detection unit, a specific object image can be extracted at high speed from a plurality of images obtained by resolution (focusing) control, and stable image extraction is assured irrespective of the illumination conditions.

Since the apparatus comprises the fetching signal generation unit (not shown) for controlling the exposure conditions by controlling the shutter speed and the aperture diameter of the optical stop or the characteristic value of the image sensor on the basis of a signal from the image sensing mode setting unit A4, and generating a signal for fetching a plurality of images having different exposure conditions, the exposure conditions in the entire image frame or a specific region can be appropriately controlled, and a specific object image can be stably extracted at high speed.

Since desired priority order can be set for the image sensing parameters, for example, focusing priority control or exposure amount priority control can be designated, and appropriate image sensing condition control corresponding to each image sensing situation can be set, thus improving the image quality of the extracted image and attaining high-speed processing.

Since a video signal before signal processing is stored in the recording unit C4, a stable image cutting operation can be performed without artifacts due to changes in image sensing environmental conditions or object actions, and a high-speed image sensing operation can be performed under the control of the image sensing conditions. Therefore, the precision of the extracted shape can be improved without being influenced by changes in image sensing environmental conditions or object actions, and image quality can be stabilized.

A desired image can be cut out based on a still image or moving image, and an appropriate compressing/encoding method can be automatically selected depending on whether the extraction mode is the still or moving image mode.

Also, a desired image can be stably extracted irrespective of the presence/absence of object actions or the presence/absence of camera actions (panning, scanning, or the like), and the image can be selectively extracted from a moving image or a still image.

Since the image sensing parameter measurement control unit B4 operates on the basis of a basic control program written in the internal storage unit of the image sensing apparatus or a detachable recording medium, there is no need for an on-line operation from an external terminal or a complicated manual operation. A control program that can appropriately execute a basic image sensing operation required for object extraction can be stored, and the control program can be supplied from a detachable memory.

The arrangement and operation of the image sensing apparatus of this embodiment will be described in more detail below.

The first embodiment of the image sensing apparatus which adopts the object extraction method of this embodiment will be described below.

In this embodiment, processing for extracting a specific object from images having different image sensing conditions by controlling the focusing state is stably performed at high speed irrespective of the illumination conditions and the like.

Figure 36:
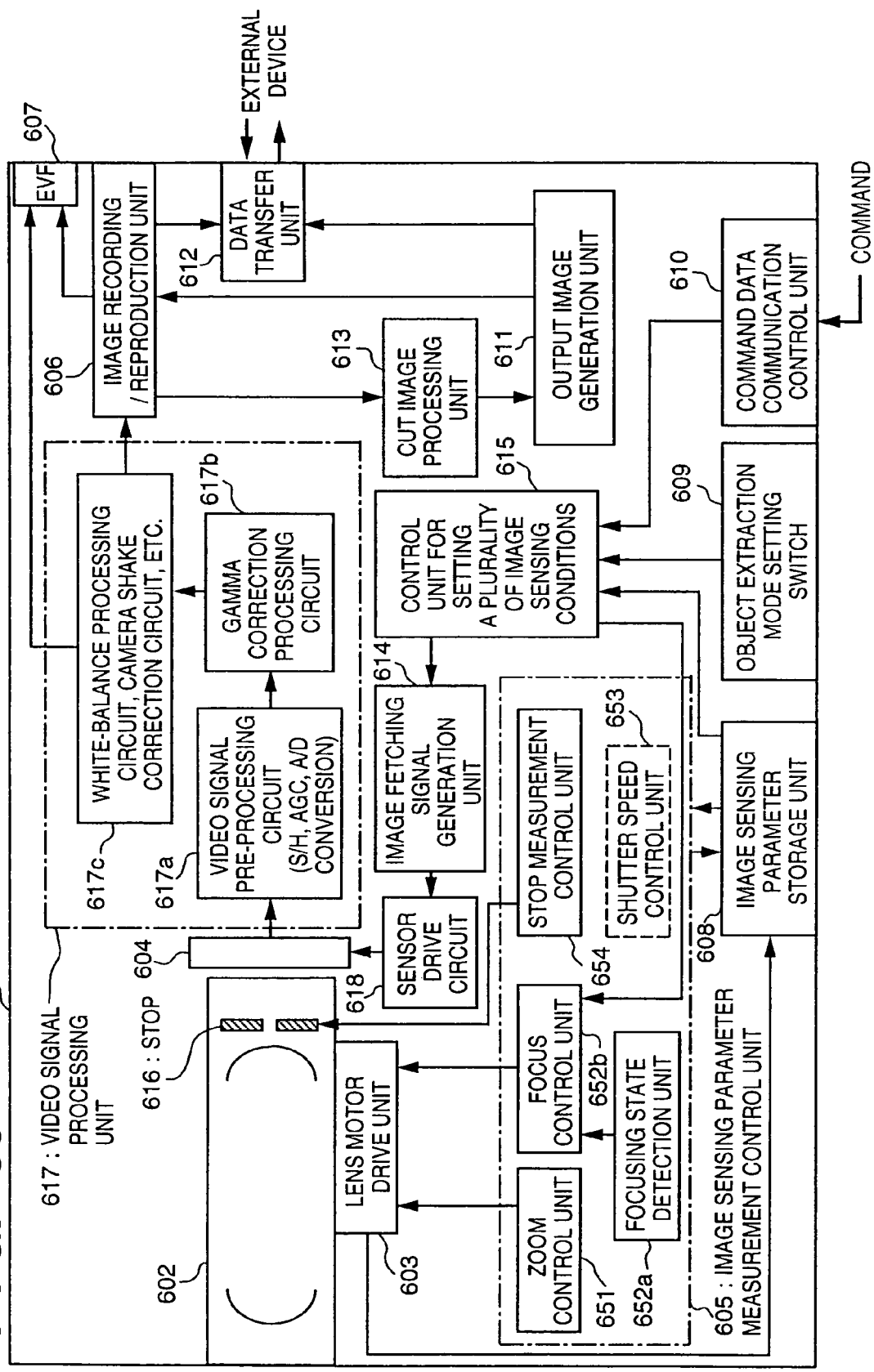
FIG. 36 is a block diagram showing principal part of an image processing camera that performs object extraction by focusing control.

FIG. 36 is a block diagram showing the arrangement of principal part of an image processing camera which has an image sensing mode for extracting a specific object, and an extraction processing mechanism. Note that the image sensing mode for object extraction represents an image sensing operation mode includes output operation of a plurality of image data from an image sensor to an image recording (storage) unit by controlling the image sensing parameters (lens layout, shutter speed, aperture diameter, and the like).

Referring to FIG. 36, reference numeral 601 denotes an entire image sensing unit (camera head) serving as an image input unit; 602, an imaging optical system; and 603, a lens motor drive control unit which comprises a focusing lens drive unit (focus motor), a zoom lens drive unit, a lens information leading (measurement) unit for reading the type of lens mounted on the camera, and the like.

Reference numeral 604 denotes an image sensor which normally comprises a solid-state image sensing element such as a CCD; and 605, an image sensing parameter measurement and control unit, which comprises a zoom detection control unit 651, a focusing signal (focusing state) detection control unit 652 (a focusing state detection unit 652a and a focus control unit 652b), a shutter speed control unit 653, a stop measurement and control unit 654, and the like.

The shutter speed control unit 653 controls a mechanical shutter (not shown). When an electronic shutter is used, a sensor drive circuit 618 controls a quantity that essentially corresponds to the shutter speed (charge accumulation time). The focusing state may be detected by either a detection method using a video signal or a distance measurement method using infrared rays.

Reference numeral 606 denotes an image recording/reproduction unit for digitally recording data in a recording medium (tape medium, optical (magnetic) disk medium, or an IC memory medium such as an IC memory card or the like) in a predetermined format upon image sensing.

Note that the recording medium or the image recording/reproduction unit 606 may be detachable from the camera main body. The recording medium may store an image sensing operation sequence program and necessary data for the object extraction mode, and the image sensing operation may be performed on the basis of the stored information.

In an image reproduction mode, image data is output to a viewfinder (EVF or the like) 607 or a data transfer unit 612 (to be described later). Reference numeral 608 denotes an image sensing parameter recording unit which records information upon image sensing, including lens information from the lens motor drive unit 603, image sensing parameters, image signal characteristic parameters, the presence/absence of flash emission, intentional camera operations by hand (motions) such as scanning, the presence/absence of camera shake, and the like.

Especially, the camera operations (scanning, panning, or the like) may be detected by video signal processing, or may be discriminated based on the output data from an acceleration sensor, a gyro, or the like (not shown) built in the image sensing unit.

Reference numeral 609 denotes a switch serving as an object extraction mode setting unit for object extraction. When this mode is set, an image fetching operation in the image sensing mode for object extraction is performed in response to an image sensing start operation signal from, e.g., a shutter button (not shown) after the ON operation of the switch.

Note that the image sensing start switch may also serve as an object extraction mode setting switch. Reference numeral 610 denotes a command data communication control unit for external command data; and 611, an output image generation unit for generating an analog/digital image signal suitable for correspondence with the output destination.

For example, the unit 611 generates an NTSC or PAL signal for a TV receiver. Furthermore, the unit 611 may output an image signal subjected to density gradation correction, error diffusion processing, and color component correction processing suitable for an output device.

Generation and processing of such output signal can be instructed by an external circuit via the command data communication control unit 610 or using a switch on an operation panel (not shown) of the camera.

Reference numeral 612 denotes a data transfer unit, which includes a communication interface unit, an adapter terminal, and the like, and is used when image data or the like is output to an external display apparatus, a computer, or the like.

Reference numeral 613 denotes an object cutting image processing unit for processing images obtained under a plurality of image sensing conditions by a method to be described later, and performs cutting operation of an image.

Reference numeral 614 denotes an image fetching signal generation unit for checking the control state of the exposure and image sensing conditions, and appropriately fetching sensed images in accordance with the charge accumulation transfer time of the image sensor (CCD) and the timing of an image write control unit in a memory.

Reference numeral 615 denotes a system control unit serving as a means for setting a plurality of image sensing conditions. The system control unit 615 generates a series of image sensing operation control signals in the object extraction mode in accordance with signals from the command data communication control unit 610 and the object extraction mode setting switch 609 or by loading information of the control program written in the storage medium of the image recording/reproduction unit 606.

Reference numeral 616 denotes a stop; and 617, a video signal processing unit which is constituted by a pre-processing circuit (617a: including an S/H circuit, an AGC circuit, an A/D converter, and the like), a gamma correction control circuit 617b, and other video signal processing circuits (617c: including a white balance correction circuit, a camera shake correction circuit, and the like). Note that rough arrangement of these circuits is not limited to the specific one shown in FIG. 36.

Reference numeral 618 denotes a sensor drive circuit for driving the image sensor 604 to control the charge accumulation time, transfer timing, and the like. In FIG. 36, the flows of control signals particularly associated with this embodiment are indicated by arrows.

In this embodiment, in the object extraction image sensing mode, the focusing lens motor (focus motor) is driven on the basis of the output from the focusing level detection unit, and a high-resolution image is fetched from the image sensor at an optimal in-focus level, i.e., in the best focusing state of the object.

Thereafter, the focusing lens motor is driven in the same direction as the immediately preceding driving direction to cause an out-of-focus state, and low-resolution images at appropriate out-of-focus levels are successively fetched. Note that the appropriate out-of-focus levels are values which are set in advance and are recorded in the storage unit or values set by a command signal from an external terminal, and each out-of-focus level is given by the ratio from the in-focus level (i.e., a numerical value, e.g., 90% of the in-focus value). Also, an image may be sensed at another out-of-focus level, and may be used for extracting initial data (coarsely cut image data) for image cutting processing.

Upon completion of the successive image sensing operations, the object extraction mode is automatically canceled or is restored to the standard mode by the object extraction mode setting switch 609. Note that the above-mentioned image sensing mode may be set and canceled in response to commands input from a terminal (not shown).

Figure 37:
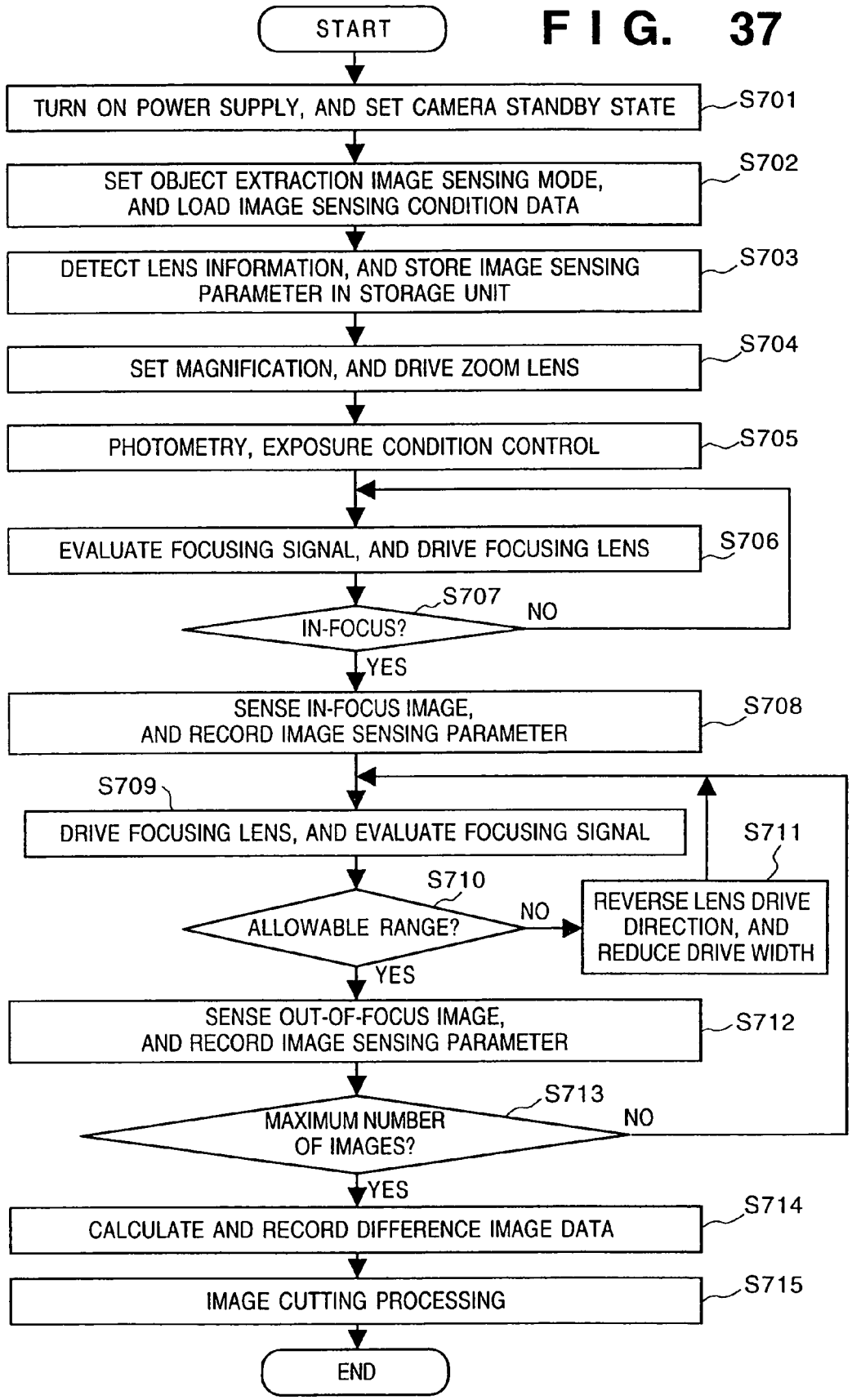
FIG. 37 is a flow chart showing the basic processing in an image input device in the object extraction mode.

FIG. 37 shows the basic processing flow when a plurality of images having different focusing states are sensed and image cutting processing is performed, and an operation is basically performed by operating the switches on the camera without receiving any control commands from an external apparatus. Note that the processing program shown in the flow chart may be stored in advance in a ROM or may be loaded from an external storage medium when it is executed.

As shown in FIG. 37, when the processing is started, a power switch is turned on, and the camera is set in a standby state (step S701). Next, the object extraction image sensing mode is set, and image sensing condition data is loaded (step S702). This processing reads out standard parameter values (e.g., the out-of-focus level range, the number of images to be sensed for cutting processing, and the like) for controlling the image sensing conditions stored in the system control unit 615 for setting a plurality of image sensing conditions, a basic control program, or the like.

The flow then advances to step S703, and processing for detecting lens information and storing it in an image sensing parameter storage unit is performed. In this processing, the lens motor drive unit 603 obtains lens information such as the specifications and type of the imaging optical system mounted on the camera. This information is used for the purpose of appropriately controlling the drive amount of the focus motor upon focusing control, or allowing a high-speed setting operation corresponding to the type of optical system when the same image sensing conditions previously used are to be set.

Thereafter, the magnification is set as in the normal image sensing mode (step S704), and photometry and (automatic) exposure conditions are set (step S705). Then, the focus motor is driven until an optimal in-focus level is obtained for the object, and focusing signal evaluation is performed (step S706). The flow advances to step S707 to discriminate the focusing state on the basis of, e.g., the hill-climbing method, and an in-focus image of an object is sensed (step S708).

The focus motor is driven by a predetermined width in the same direction, and the focusing signal level is evaluated (step S709) to check if the focusing signal level is an out-of-focus level within the predetermined allowable range (step S710). If YES in step S710, the flow advances to step S712 to perform an image sensing operation.

Subsequently, the flow advances to step S713 to check the number of sensed images. The focusing control and the image sensing operation are repeated until a predetermined maximum number of sensed images are obtained.

On the other hand, if it is determined in step S710 that the focusing signal level falls outside the allowable range, the flow advances to step S711 to perform processing for reversing the lens driving direction and reducing the driving width. Thereafter, the flow returns to step S709 to repeat the above-mentioned operations.

Finally, difference image data is extracted from a plurality of images having a small focusing signal level difference (step S714), and image cutting processing is performed (step S715).

Figure 38A:
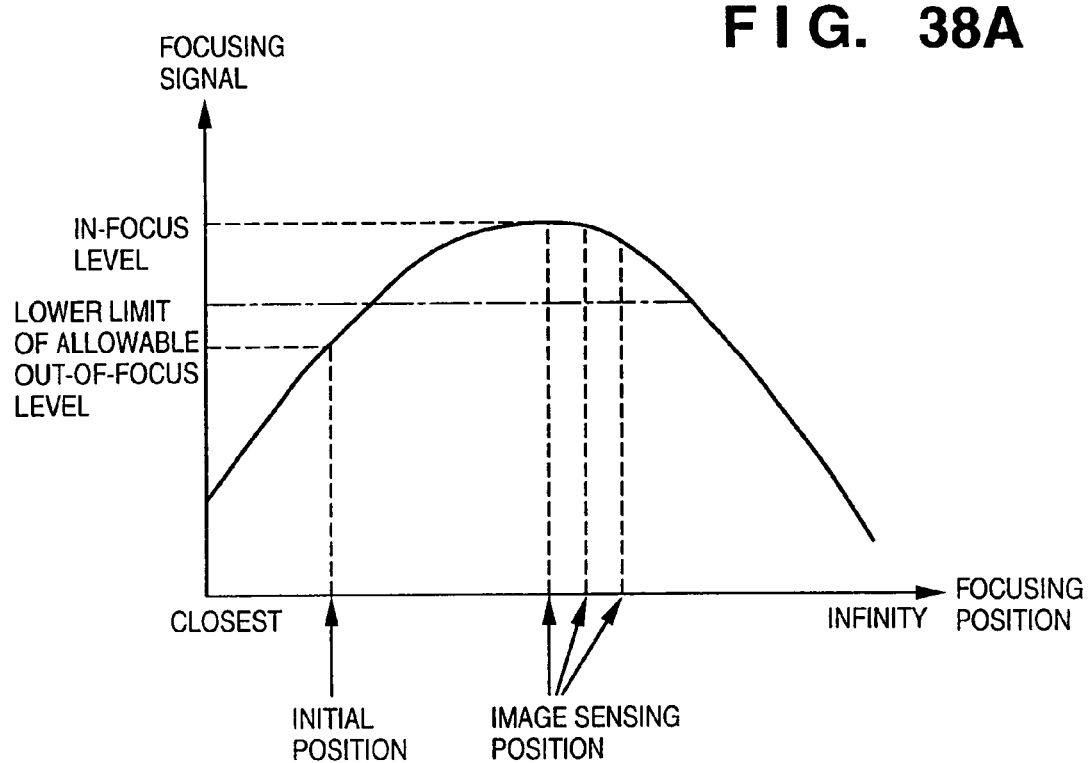
FIGS. 38A and 38B are graphs showing the relationship between changes in image sensing parameter and the image characteristics.

FIG. 38A is a graph showing the relationship between the focusing signal and the position of the focusing lens when image taking operations are performed under a plurality of image sensing conditions based on focusing control.

As can be seen from FIG. 38A, the focusing lens is driven from its initial position, and an image taking operation is performed by detecting the in-focus level once. Thereafter, the focusing signal level is driven by a predetermined amount, and out-of-focus images within the allowable range are fetched.

Figure 39:
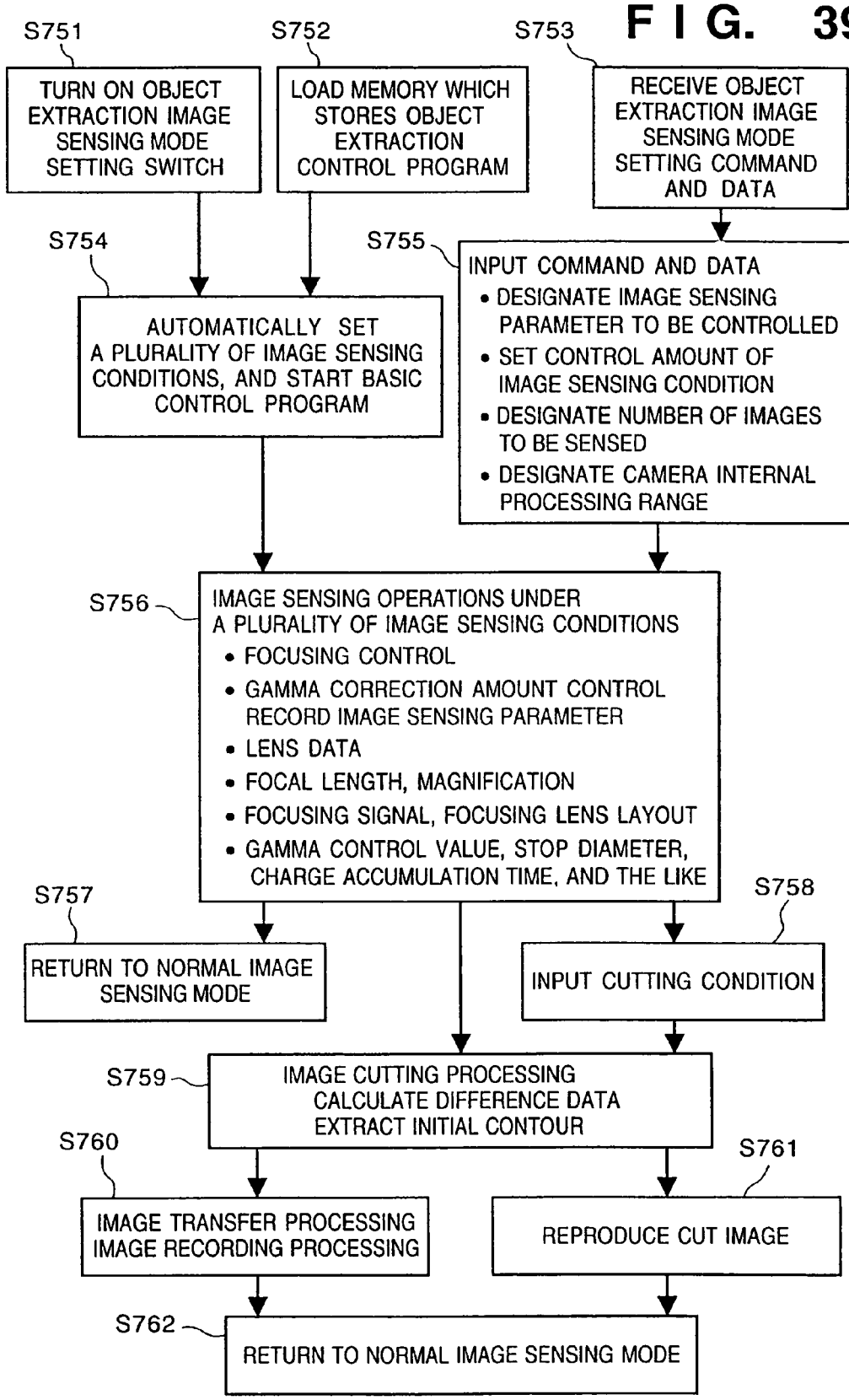
FIG. 39 is a flow chart showing the basic control sequence of the image input device main body from the setting operation of the object extraction mode to the output operation of an extracted image.

FIG. 39 is a flow chart showing the basic control sequence of the camera main body. As described above, the object extraction image sensing mode can be set in three different ways, i.e., the setting method by the operation on the camera main body (step S751), the setting method by loading a recording medium that stores a program for object extraction (step S752), and the setting method by means of command data received from, e.g., an external terminal (step S753).

In the two former methods, the basic control program is started (step S754), and when the mode is set in response to received command data, the image sensing parameters to be controlled, the control amounts of the image sensing conditions, the number of images to be sensed, the range of processing mode inside the camera (pre-processing such as calculation of difference data for cutting processing, only the image taking operations under a plurality of image sensing conditions, and so on), and the like are also set (step S755).

Note that the basic control program as standard ones is set in advance with these conditions. In image sensing operations under a plurality of image sensing conditions (step S756), the image sensing conditions are controlled based on the set parameters (focusing control, gamma correction control), and image sensing parameters (lens data, focal length, magnification, focusing signal, focusing lens layout, gamma control value, stop diameter, charge accumulation time, and the like) used at that time are recorded.

The subsequent operation sequence branches to three different control flows in correspondence with the processing range inside the camera.

More specifically, the first operation is to automatically return to the standard mode (step S757). The second operation is to receive cutting conditions (step S758) upon completion of the image sensing operations in the object extraction mode. The third operation is to perform cutting processing (step S759: to be described later) under predetermined standard conditions.

Upon completion of the processing, the extracted image is recorded in the internal storage unit in the camera main body or is transferred to an external memory or display apparatus (step S760). Alternatively, the extracted image may be displayed on a monitor such as a finder or display (step S761). After the above-mentioned processing has been completed, the image sensing mode automatically or manually returns to the standard image sensing mode (step S762).

The processing steps of images fetched from the image sensor 604 will be described in detail below.

The video signal processing unit 617c performs gamma correction, white-balance correction, and the like for at least two video signals obtained from the sensor by controlling the focusing states.

The image cutting processing unit 613 in the image sensing unit calculates difference data between a high-resolution image (in-focus image) and a low-resolution image (out-of-focus image) or difference data between two different low-resolution images, and performs processing such as smoothing, binarization, line thinning, and the like for the calculated data.

Note that the processing other than the difference calculation processing may be performed by inputting appropriate processing parameters from an external terminal (not shown) via the command data communication control unit 610. When a plurality of low-resolution images having different out-of-focus levels are used, high spatial frequency components are cut, and the influence of unwanted isolated feature points or isolated regions can be suppressed when the contour line of a specific object is extracted from the difference data.

Therefore, initial data (contour line) with stably high precision can be obtained independently of noise or high spatial frequency components of the background portion or illumination conditions. Note that the output value of a pixel which assumes a negative value upon calculating the difference may be set to be zero, or the absolute value of the difference of each pixel may be output.

The subsequent initial data (contour data) extraction processing will be described below.

This processing can be performed at a terminal connected to the camera. Processing by the internal calculation unit in the camera may be registered as a standard processing mode or may be designated by a terminal via the command data communication control unit 610.

Typically, as standard processing inside the camera, the difference calculation processing between a plurality of images having different image sensing conditions and binarization processing, or the difference calculation processing and smoothing processing, and the like are set in the basic control program.

After comparison (difference) data between images obtained by controlling the image sensing conditions is calculated, the smoothing processing performs removal of isolated features (local regions having indefinite shapes but identical luminance level or color, line segments, and the like), a convolution calculation with a Gaussian filter, normal low-pass filter processing, or the like.

A threshold value for the subsequent binarization processing may be set by the Otsu's method (*Journal of Papers of The Institute of Electronics, Information and Communication Engineers*, Vol. J63, pp. 349–356, 1980), the method in which an image is divided into blocks each having an appropriate size, and a threshold value is then set on the basis of statistical processing (hypothesis testing based on the average, variance, or histogram, or the like) of local image data (luminance, color, or the like), or the like.

The processing steps of image data to which the above-mentioned processing method is applied have already been described above with reference to FIG. 15.

To obtain difference image data, two out-of-focus images having different focusing levels may be used. In this embodiment, the image sensing operation and the image processing operation of an image processing camera 701 may be controlled from a terminal 721 using the arrangement shown in FIG. 40.

The image extraction processing sequence in a system which comprises a computer terminal as the terminal (calculation unit) 721, display units 722 (first and second display devices 722a and 722b), a pointing unit (mouse 723), and a data communication network unit 724 (including a bus control unit and the like) will be described below with reference to FIG. 40.

In this case, a binarization threshold value may be set on the basis of statistical processing for a local region with a predetermined size which has a point designated by, e.g., the mouse 723 as the center (or a region set in an arbitrary shape by, e.g., the mouse 723), and binarization, line-thinning, and contour line tracing processing may be performed within the region. Upon completion of the processing, a local region having the edge point of the previous region as the center is automatically set to repeat the same processing. Of these processing operations, the line-thinning is a processing for obtaining representative points inside the thick initial contour line, and is not limited to a specific method performed in conventional image processing.

For example, an edge point may be searched for from arbitrary one point in the coarse initial contour in one of the right, left, up, and downward directions, and then, an edge point adjacent to the obtained edge point is searched for, thus determining representative points. When a plurality of edges or contour lines are present in a neighboring region as a result of the line-thinning processing, they may be displayed while being superposed on an input image, and may be selected using a means such as a mouse.

When only one edge is present in a neighboring region or the user selects an edge, the contour line tracing processing is performed in a pre-set direction, and the positions of the respective points of the thinned image, which are connected to the edge, are sequentially recorded as sampling points of the initial contour line.

As the method of selecting the branch direction when the thinned image has a branch structure, the branch direction in which the image data attribute (color, luminance, its variance, or the like) of the contour line in a direction perpendicular to the tracing direction of a point before the branch is continuous or a direction in which changes in direction before and after branch are small is preferentially selected.

In this case, the processing is performed by detecting the image attribute of a small region after the branch. As another method, the contour tracing may be suspended, and a region having the branch point as the center may flicker, so that the user may select the branch direction.

When a given contour line is interrupted by the binarization and line-thinning processing, edge linking processing is performed. In this case, automatic linking may be performed on the basis of a predetermined algorithm (see Papers of the 23rd Image Engineering Conference, pp. 67–70, 1992 and the like), or remaining edge points as a result of the contour tracing may be caused to flicker on the display unit.

Alternatively, the edge point may be clearly displayed using, e.g., a different color from other contour lines, and the user may confirm and indicate edge points to be connected using the selection/indication unit 723.

As a contour line that links connection points, a straight line or a spline interpolation curve using representative points on the contour line may be generated. In particular, when an edge point after the contour tracing is present on an image frame, it may be coupled to one on another frame.

In this manner, after the closed contour line and image data therein are extracted, more precise image extraction may be performed by applying background region removal processing based on, e.g., statistical processing, a region growing method, an active contour processing method, or the like.

The second embodiment of an image sensing apparatus that adopts the object extraction method will be described below.

In this embodiment, the image cutting processing unit 613 performs averaging processing of (a plurality of) difference data among a plurality of (three or more) images obtained by continuously controlling the focusing state, and performs initial contour line extraction processing (smoothing, binarization, line-thinning processing, and the like) of the image to be cut out.

For this purpose, the focusing motor is driven at high speed on the basis of the output from the focusing state detection unit, and at least three still images including near-focus or far-focus images, or both near- and far-focus images as well as an optimal in-focus image are continuously sensed at predetermined time intervals. The sensed images are stored in the image storage unit 606. Typically, after an image upon detection of an in-focus state is fetched, a predetermined number of out-of-focus images are continuously sensed.

Figure 41:
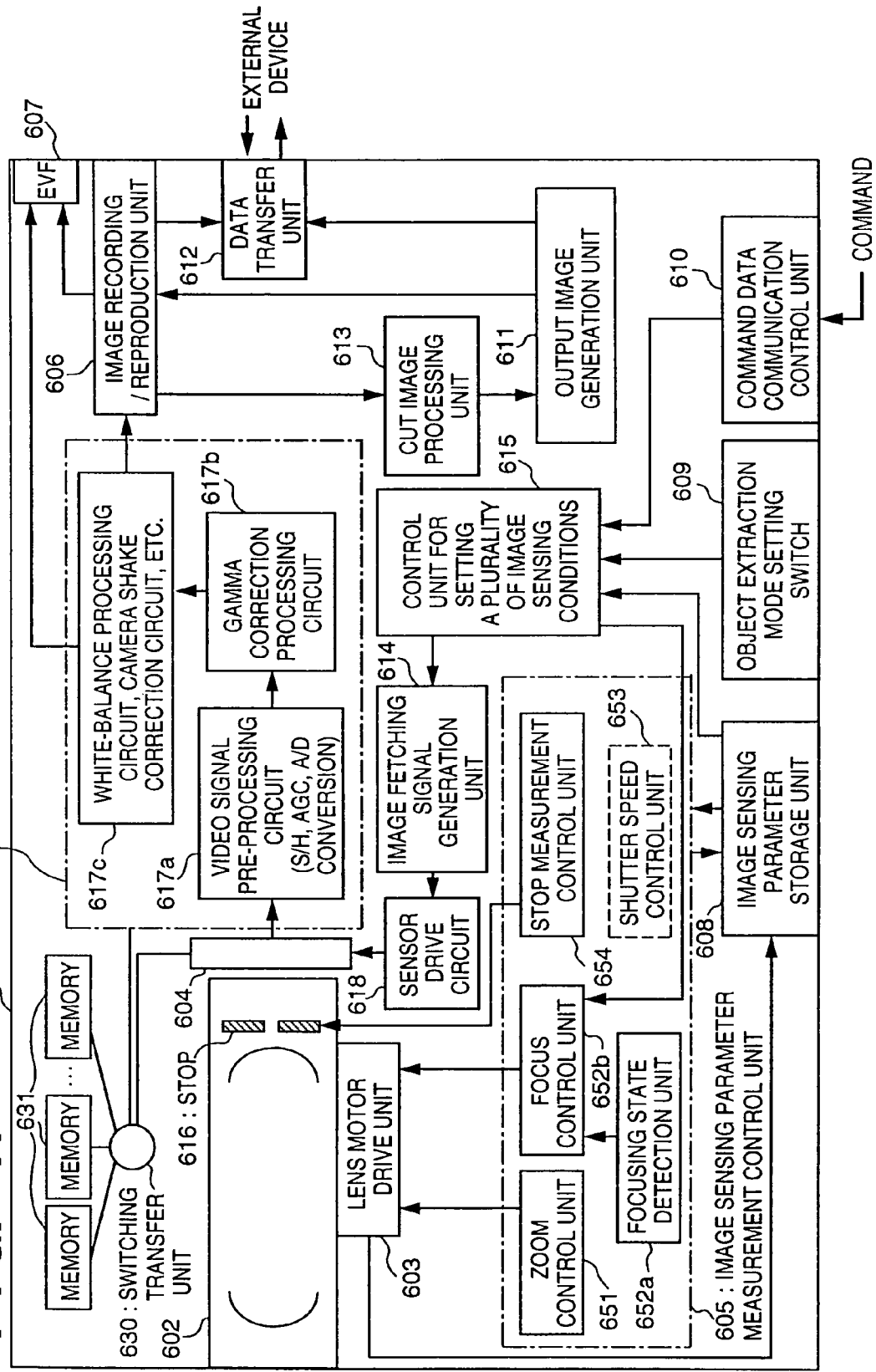
FIG. 41 is a block diagram showing principal part of an image processing camera which fetches an image at high speed.

FIG. 41 shows the internal arrangement of the camera when a relatively large number of images are fetched while changing the image sensing conditions like the one in this embodiment.

In this arrangement, signals from the image sensor 604 are transferred and recorded in temporary storage units 631 via a high-speed switching transfer unit 630 without going through any video signal processing unit.

Upon completion of the image sensing operations under a plurality of different image sensing conditions, i.e., after images are written in the temporary storage units 631, the images are sequentially transferred and are subjected to pre-processing or the like required for video signal processing and image cutting processing. At this time, the switching transfer unit 630 may directly transfer images to the image cutting processing unit 613.

In this manner, since a video signal from the sensor 604 is not subjected to nonlinear processing, which is normally performed, the processing precision can be stabilized by suppressing the influence of changes in illumination conditions, object motions, and the like upon image sensing. When the video signal processing is performed after a series of images are fetched, a high-speed image sensing operation, stable cutting processing, and high flexibility can be realized.

When images are sensed time-serially, only difference data updated by the averaging processing with the immediately preceding image data may be temporarily stored. If the number of images to be used in the initial contour line extraction processing is designated to be N in advance, when N or more images are fetched during the focusing process, the latest N images may be held (images are deleted in the order of older ones), and thereafter, the calculation of difference data and averaging processing may be performed.

By averaging difference data among a plurality of images obtained under slightly different focusing states as in this embodiment, the adverse influence of noise can be suppressed, and image extraction with high precision and resolution can be attained.

The third embodiment of an image sensing apparatus that adopts the object extraction method will be described below.

In this embodiment, extraction processing is performed using a plurality of images having different image sensing conditions by controlling the exposure conditions or sensor sensitivity characteristics.

Figure 42:
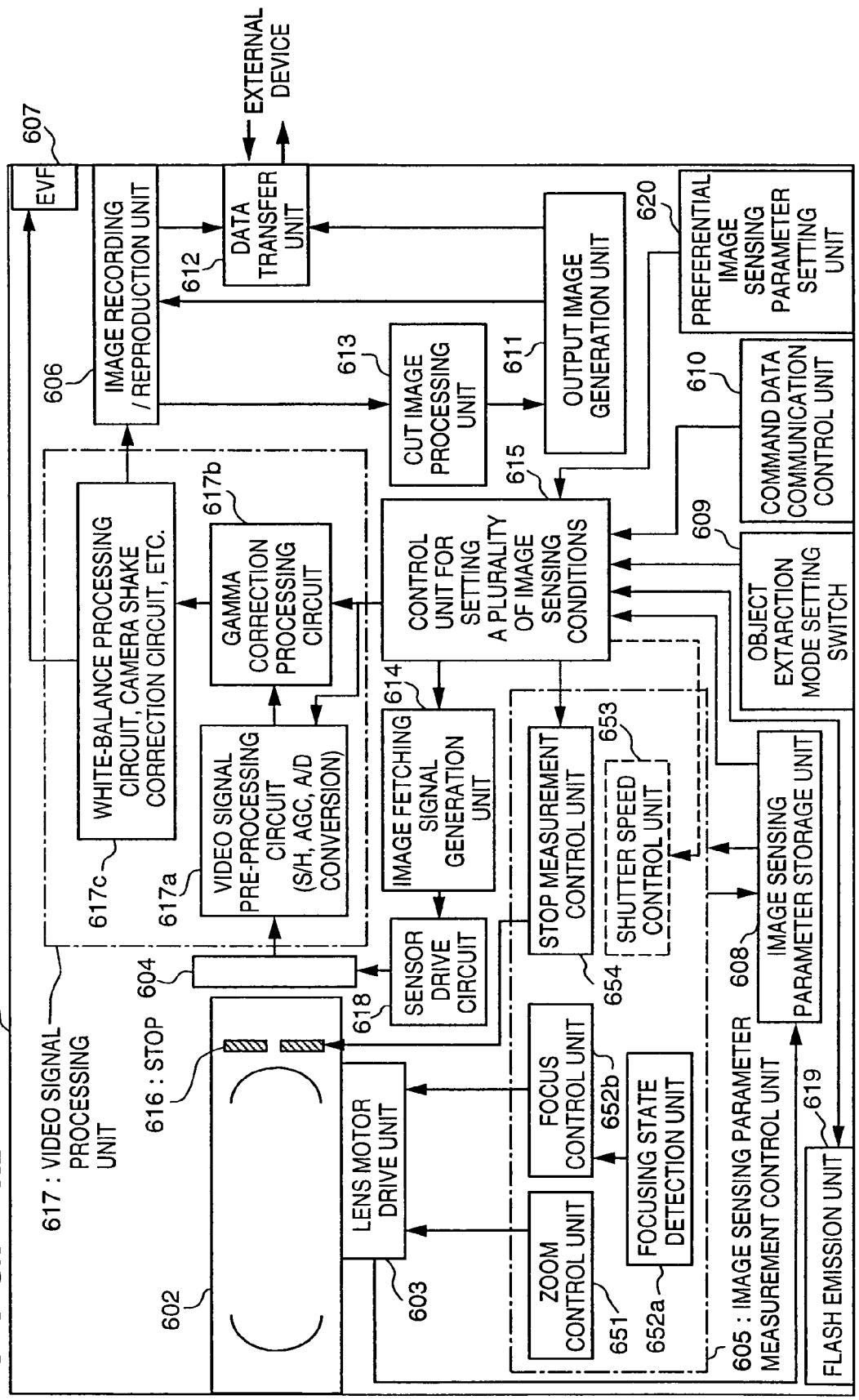
FIG. 42 is a block diagram showing principal part of an image processing camera which performs object extraction by exposure amount control.

FIG. 42 is a block diagram showing the arrangement of the image processing camera. The image sensing parameters to be controlled in this case include the diameter of the stop, the gain of the image sensor, the gamma characteristics, the flash emission intensity, the flash color temperature (light-emission spectrum), the charge accumulation time (or shutter speed) of the sensor (CCD), and the like. The gamma characteristics are controlled by the gamma correction control circuit 617b arranged in the video signal processing unit 617.

In this embodiment, by supplying a control signal to the video signal processing unit 617, a flash emission unit 619, or an image sensing parameter measurement and control unit (shutter speed control unit 653 or stop measurement control unit 654), image sensing operations are performed under different image sensing conditions, i.e., an image obtained by controlling one of the above-mentioned parameters by a small amount from an optimal value in the normal image sensing mode, and an image under optimal conditions are sensed.

In this embodiment, a switch for setting an image sensing parameter to be preferentially controlled, i.e., a preferential image sensing parameter setting unit 620 for setting desired priority order is arranged. For example, a switch for setting the focusing priority mode or exposure condition priority mode for controlling conditions by relatively weighting the focusing level, exposure conditions, sensor sensitivity characteristics, and the like may be arranged.

Figure 40:
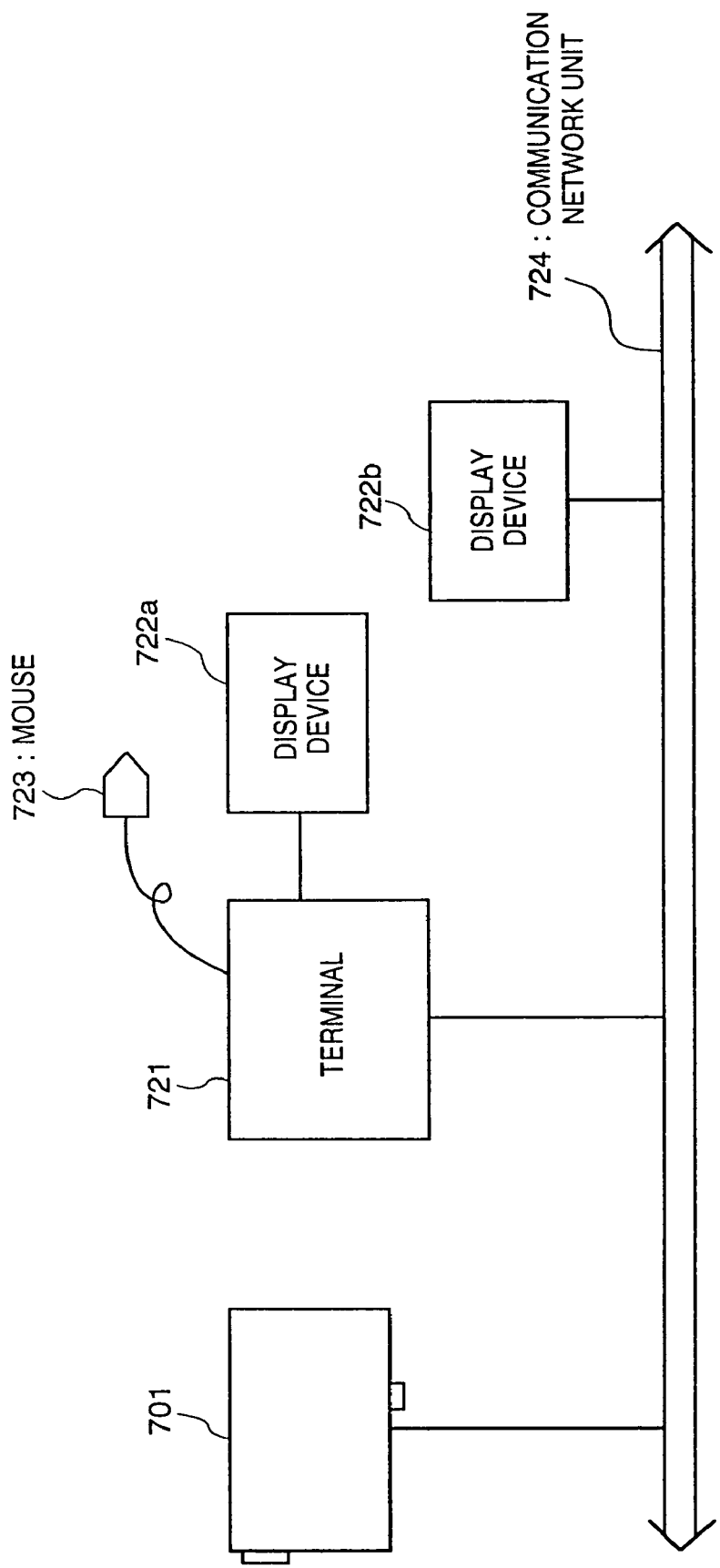
FIG. 40 is a block diagram showing an example of an image extraction system.

In the system arrangement shown in FIG. 40, when one point on an image displayed on a display device 622 is indicated by, e.g., the mouse 623, a control unit 615 for setting a plurality of image sensing conditions shown in FIG. 42 supplies a control signal to the video signal processing unit 617 in a region with a predetermined size, which has the designated point as the center or the entire screen.

When an image having the gamma characteristic value set in the normal image sensing mode and a plurality of images are obtained by controlling the characteristic parameters of the video signal in units of pixels or in a local region (changed by a predetermined width), the shape and size of the region may be directly designated by the pointing unit 623.

Figure 38B:
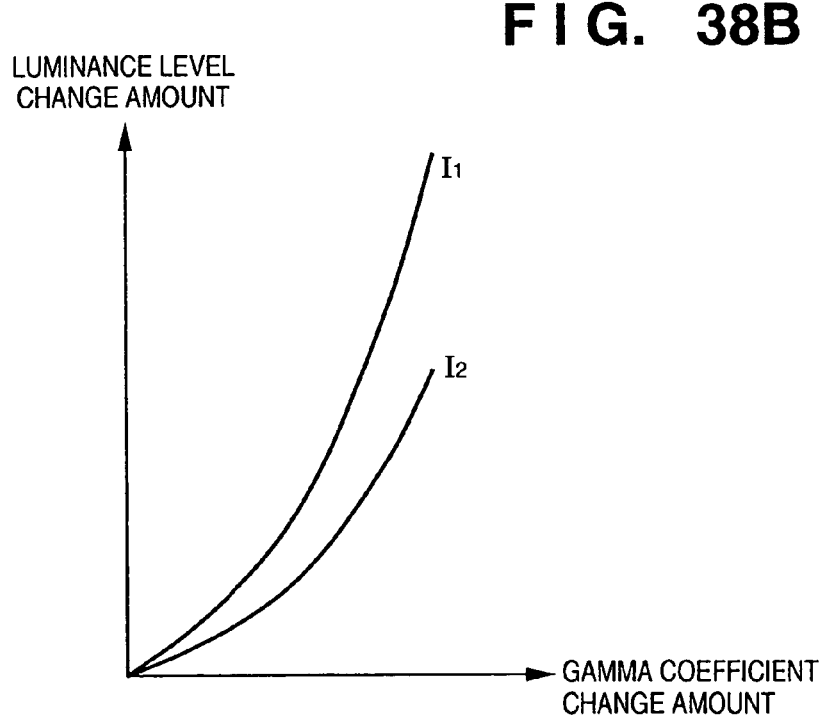

FIG. 38B is a graph showing the relationship between the change amount of a gamma coefficient from an optimal value (that changes in correspondence with the sensor signal level) and the amount of change amount of the luminance level for the absolute luminance levels ($I_1 > I_2$).

When difference data between images obtained by the above-mentioned modulation is subjected to binarization and line-thinning using an appropriate threshold value, a line image corresponding to a contour line (edge component) in an actual image can be obtained owing to the nonlinearity of the gamma characteristics. From this image, an initial contour line is obtained by the method described in the first embodiment.

As for the control of the stop diameter or the charge accumulation time, when the background and the object have considerably different luminance levels, the contour line extraction by the above-mentioned method is often particularly effective due to the nonlinear saturation characteristics of accumulated charges.

An image sensing operation by controlling the flash emission characteristics (intensity, spectrum) is effective when the intensity of light emitted by a flash device and reflected by an object is sufficiently high (in an indoor image taking operation or when the object distance is sufficiently small).

The fourth embodiment of an image sensing apparatus that adopts the object extraction method will be explained below.

An image processing camera of this embodiment performs a moving image sensing/recording operation (including video signal processing for camera shake correction), and when an object extraction image sensing mode switch is pressed, the camera automatically performs continuous recording operations of still images under a plurality of image sensing conditions like in the above embodiment.

Figure 43:
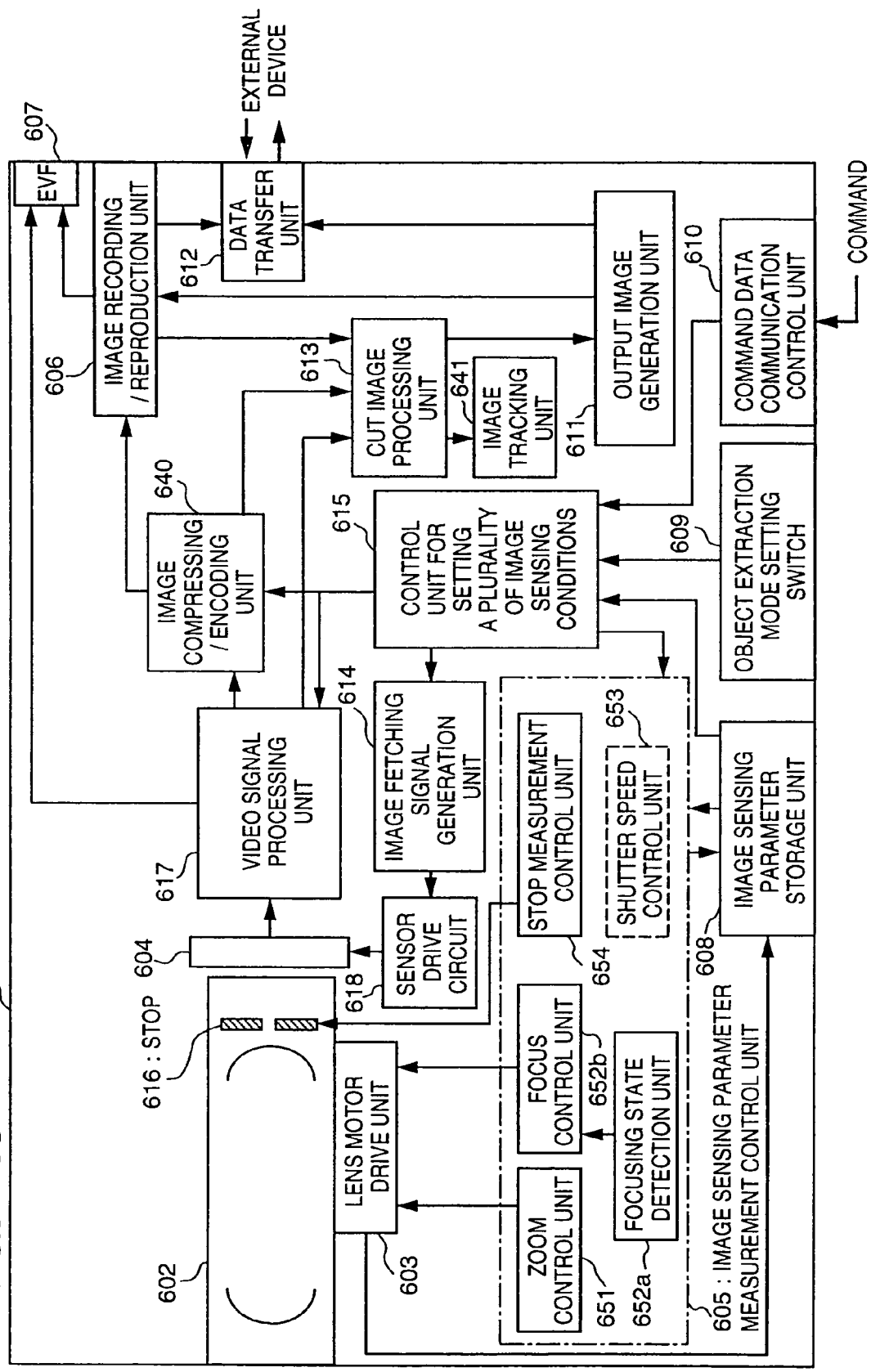
FIG. 43 is a block diagram showing principal part of a camera which senses an image in the object extraction mode in a specific scene during a moving image taking operation.

FIG. 43 is a block diagram showing the arrangement of principal part of the image processing camera of this embodiment.

When an image sensing/recording mode is set after the power switch is turned on, a moving image is sensed and recorded. During the recording, an image compressing/encoding unit 640 may encode a moving image by, e.g., the MPEG method, and may encode the image to be cut out by, e.g., the JPEG method.

When a moving image of a specific object is cut out by the image cutting processing unit 613, the extracted moving image may be encoded by the image compressing/encoding unit 640 by a method suitable for the moving image. The switching operation of the processing is done when the control unit 615 for setting a plurality of image sensing conditions supplies a switching control signal to the image compressing/encoding unit 640 in response to an ON/OFF signal of the object extraction mode setting switch.

The image compressing/encoding unit 640 generates an index indicating a moving image or successive still images as a header portion of image data or a header file. In this embodiment, when the object extraction mode setting switch 609 for object extraction is pressed, high-speed image fetching operations are performed while controlling the image sensing conditions as in the above embodiment, and video signal data output from the video signal processing unit 617 are processed by the image cutting processing unit 613. Then, the extracted image may be output to and further compressed/encoded by the image compressing/encoding unit 640.

The extracted image obtained as a result of cutting processing for successive still images obtained in the object extraction mode may be registered, and an image tracking unit 641 may track the object image using the registered image as a template image to perform cutting processing using a moving image.

In this manner, a moving image is sensed while changing the viewpoint direction, and high-quality still images can be cut from desired view point positions.

According to the image sensing apparatus that adopts the object extraction method of this embodiment, when the image sensing unit senses images from which a specific object image is to be extracted, optimal image sensing parameters can be set or controlled. Since the image quality of the extracted image can be optimized by controlling the image sensing conditions, a high-quality object image can be extracted at high speed.

Since the feature amounts and the like of an image can be externally controlled, image sensing operations for object extraction and image processing to be executed inside the image sensing apparatus can be remote-controlled, and the extracted image can be on-line transferred to a remote place.

Since the image sensing parameters can be controlled by supplying a control command from an external circuit via the control command communication unit, the image sensing parameters for object extraction can be externally controlled, and a high-quality extracted image and high-speed extraction processing can be realized.

The image sensing mode setting unit has the image sensing mode setting button, starts the setting operation of the image sensing mode upon operation of the image sensing mode setting button, and sets the control amounts of the image sensing parameters on the basis of the image sensing parameter measurement values. With this operation, the image sensing parameters in the object extraction mode can be automatically set, and the user need not manually set the control amounts of the image sensing parameters.

The need for the operation for restoring the normal image sensing mode after the image sensing operation (image fetching operation) for extracting a specific object from a plurality of images having different image sensing conditions is completed can be obviated, i.e., the user need not set the operation mode to return from the image sensing operation in the object extraction mode to that in the normal image sensing mode, thus improving operability.

Since the image to be cut out is processed on the basis of comparison data generated by the comparison data generation unit and a control command supplied from the control command communication unit F4, pre-processing required for the cutting processing of the specific object image by controlling the image sensing conditions can be executed at high speed in the image sensing apparatus.

Since the apparatus comprises the lens layout control unit for controlling the lens layout in the imaging optical system on the basis of a signal from the image sensing mode setting unit, the focusing level detection unit for detecting the focusing level, and the fetching signal generation unit for generating a signal for fetching a plurality of images having different focusing levels on the basis of the output from the focusing level detection unit, a specific object image can be extracted at high speed from a plurality of images obtained by resolution (focusing) control, and stable image extraction is assured irrespective of the illumination conditions.

Since the apparatus comprises the fetching signal generation unit for controlling the exposure conditions by controlling the shutter speed and the aperture diameter of the optical stop or the characteristic value of the image sensor on the basis of a signal from the image sensing mode setting unit A4, and generating a signal for fetching a plurality of images having different exposure conditions, the exposure conditions in the entire image frame or a specific region can be appropriately controlled, and a specific object image can be stably extracted at high speed.

Since desired priority order can be set for the image sensing parameters, for example, focusing priority control or exposure amount priority control can be designated, and appropriate image sensing condition control corresponding to an image sensing situation can be set, thus improving the image quality of the extracted image and attaining high-speed processing.

Since a video signal before signal processing is stored in the recording unit, a stable image cutting operation can be performed without being influenced by changes in image sensing environmental conditions or object actions, and a high-speed image sensing operation can be performed under the control of the image sensing conditions. Therefore, the precision of the extracted image shape can be improved without being influenced by changes in image sensing environmental conditions or object actions, and image quality can be stabilized.

A desired image can be cut out based on a still image or moving image, and an appropriate compressing/encoding method can be automatically selected depending on whether the extraction mode is a still or moving image mode.

Also, a desired image can be stably cut out irrespective of the presence/absence of object actions or the presence/absence of moving camera operations (panning, scanning, or the like), and the image can be selectively cut out from a moving image or a still image.

Since the image sensing parameter measurement and control unit operates on the basis of a basic control program written in the internal storage unit of the image sensing apparatus or a detachable recording medium, there is no need for an on-line operation from an external terminal or a complicated manual operation. A control program that can appropriately execute a basic image sensing operation required for object extraction can be stored, and the control program can be supplied from a detachable memory.

Another embodiment of an image sensing apparatus according to the present invention will be explained below. An image sensing apparatus of this embodiment is applied to an image sensing system.

[Another Embodiment]

An image sensing system of another embodiment is characterized in that specific object extraction processing from images obtained under different image sensing conditions by controlling the focusing state is stably performed at high speed independently of the illumination conditions and the like. The specific object extraction processing is processing for cutting out an object image from the background image, and may be applied to other processing operations such as classification, recognition, tracking, and the like of images.

Figure 44:
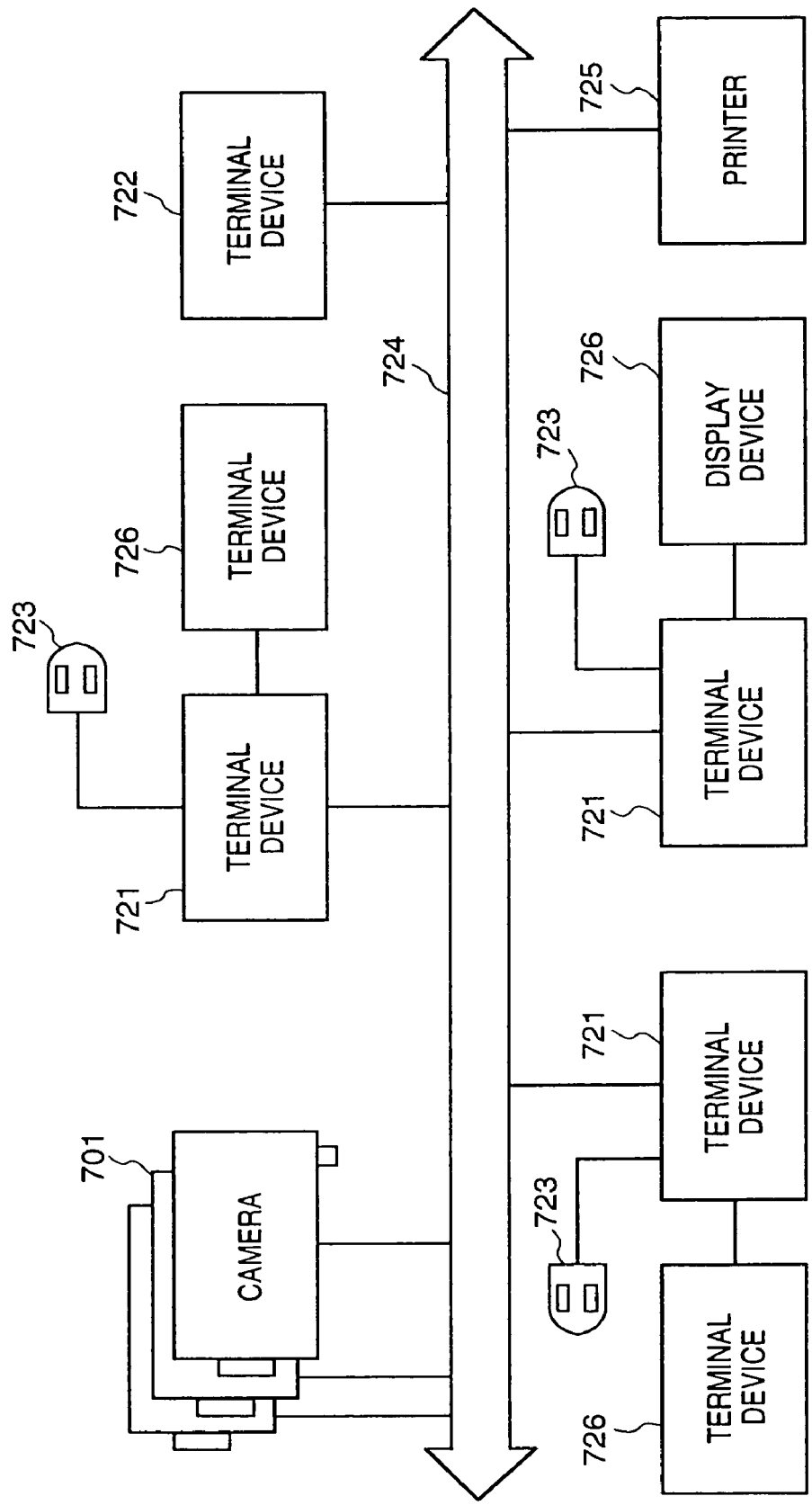
FIG. 44 is a block diagram showing the arrangement of an image sensing system according to another embodiment of the present invention.

FIG. 44 is a block diagram showing the arrangement of an image sensing system of this embodiment. The image sensing system has an arrangement in which at least one camera (image sensing apparatus) 701, a plurality of terminal devices 721, a display device 722, and a printer 725 are connected to a data communication bus 724. Each terminal device 721 has a mouse 723 for performing indication/selection, and a display device 726. In place of the mouse 723, the indication/selection may be performed by means of a pen input. The data communication bus 724 includes a control bus.

In the image sensing system of this embodiment, when a plurality of terminal devices 721 and a plurality of cameras 701 are connected, an arbitrary terminal device 721 can control the image sensing mode of an arbitrary camera 701 and image processing in the camera, and one of the terminal devices 721 serves as a server.

On the other hand, image data sensed in a predetermined mode and output from the camera 701 can be processed by a given terminal device 721 to perform cutting processing of a specific object. Furthermore, the extracted image can be output to an arbitrary display device (the display device 722 or 726 or a finder display (not shown) in the camera) or can be output to the printer 725.

Figure 45:
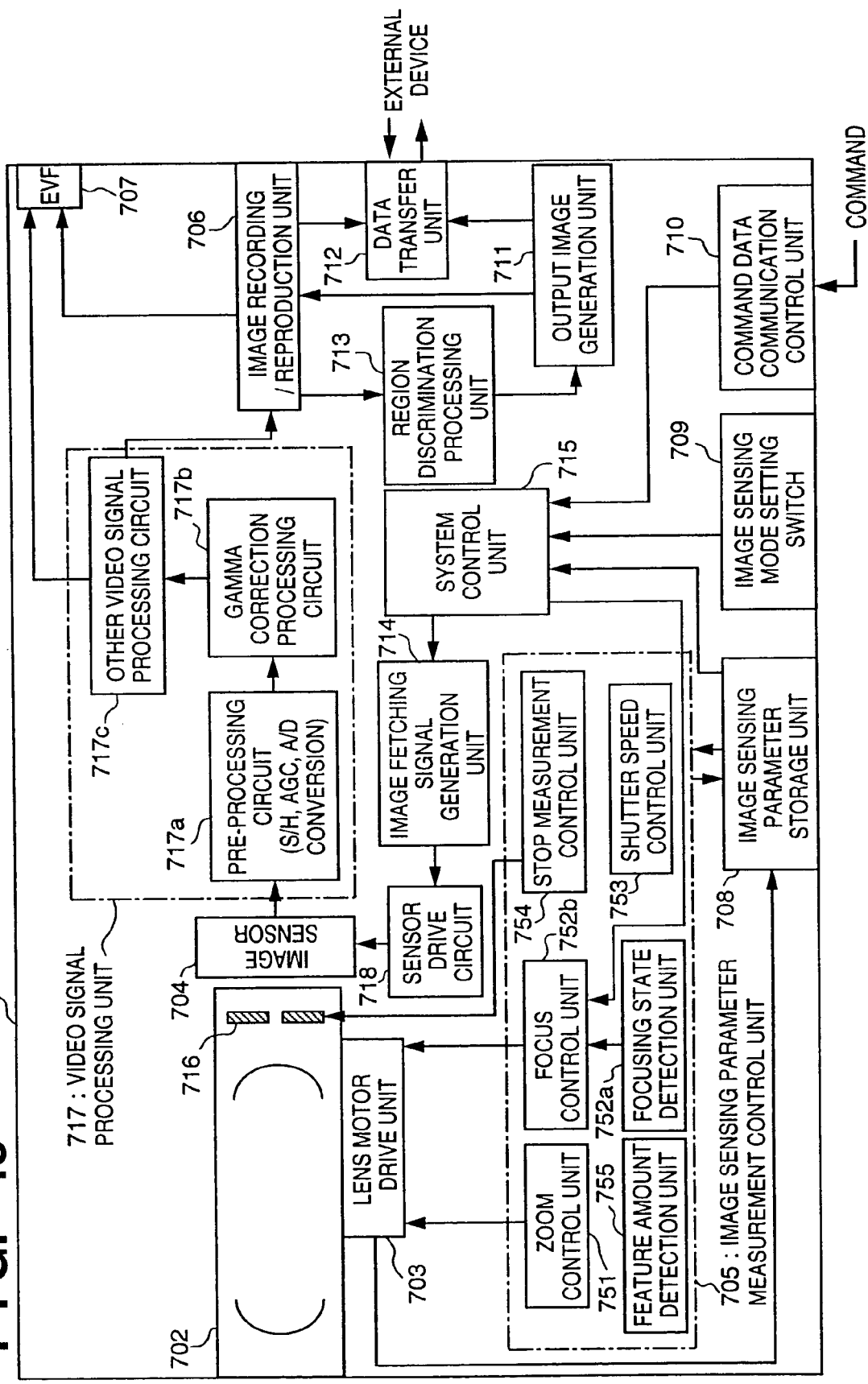
FIG. 45 is a block diagram showing the internal arrangement of a camera 701.

FIG. 45 is a block diagram showing the internal arrangement of the camera 701. The camera 701 has an extraction processing mechanism for extracting a specific image from images sensed in an object extraction image sensing mode. Note that processing required for extracting an image may be performed by the terminal device 721 in place of the camera 701. The object extraction image sensing mode includes an image sensing operation and outputting a plurality of image data are output from an image sensor to an image recording unit by controlling the image sensing parameters (lens layout, shutter speed, stop diameter, and the like).

In the internal arrangement of the camera 701 shown in FIG. 45, reference numeral 702 denotes an imaging optical system. The imaging optical system 702 preferably has a shallow focal depth. Reference numeral 703 denotes a lens motor drive control unit which is constituted by a focusing lens drive unit (focus motor), a zoom lens drive unit, and a lens information reading (measuring) unit for reading out e.g., the type of lens mounted, and the like.

Reference numeral 704 denotes an image sensor which comprises a solid-state image sensing element such as a CCD. Reference numeral 705 denotes an image sensing parameter measurement and control unit, which includes a zoom control unit 751, a focusing state detection unit 752a, a focusing control unit 752b, a shutter speed control unit 753, a stop measurement and control unit 754, a feature amount (e.g., a correction coefficient or the like as for gamma) detection unit 755 for detecting the feature amounts of image signal characteristic parameters (gamma, knee, white-balance correction, CCD accumulation time), and the like.

The shutter speed control unit 753 controls a mechanical shutter (not shown). When an electronic shutter is used, a sensor drive circuit 718 (to be described later) controls an effective shutter speed (charge accumulation time). The focusing state may be detected by either a detection method using a video signal or a distance measurement method using infrared rays. Reference numeral 706 denotes an image recording/reproduction unit for digitally recording data in a recording medium (tape medium, optical (magnetic) disk medium, or an IC memory medium such as an IC memory card or the like) in a predetermined format upon image sensing. Note that the recording medium or the image recording/reproduction unit 706 may be detachable from the camera main body. The recording medium may store an image sensing operation sequence program and required data in the object extraction mode, and the image sensing operation may be controlled on the basis of the stored information.

In an image reproduction mode, image data is output to a viewfinder (EVF or the like) 707 or a data transfer unit 712 (to be described later). Reference numeral 708 denotes an image sensing parameter storage unit which records information upon image sensing, including lens information from the lens motor drive unit 703, image sensing parameters, image signal characteristic parameters, the presence/absence of flash emission, intentional camera actions (motions) such as scanning, the presence/absence of camera shake, and the like. Such information is recorded in any modes of external control, a manual operation, and self control based on the internal program, and is used later for reproducing identical image sensing conditions.

Note that camera action (scanning, panning, or the like) information may be detected by video signal processing, or may be discriminated based on the output data from an acceleration sensor, a gyro, or the like (not shown) built in the image sensing apparatus.

Reference numeral 709 denotes an image sensing mode setting switch for selecting an object extraction mode, tracking mode, identification mode, and the like. When this switch is set, an image fetching operation in the selected image sensing mode is started in response to an image sensing start operation signal from, e.g., a shutter button (not shown) after the ON operation of the switch. Note that the image sensing start switch may also serve as the image sensing mode setting switch.

Reference numeral 710 denotes a command data communication control unit for external command data. Reference numeral 711 denotes an output image generation unit for generating an analog/digital image signal in correspondence with the output destination. For example, the unit 711 generates an NTSC or PAL signal for a TV receiver. Furthermore, the unit 711 may output, to a display, a printer, or the like, an image signal subjected to density gradation correction, error diffusion processing, and color component correction processing corresponding to an output device. Generation and processing of such output signal can be instructed by an external circuit via the command data communication control unit 710 or using a switch on an operation panel (not shown) of the camera.

Reference numeral 712 denotes a data transfer unit, which includes a communication interface unit, an adapter terminal, and the like (not shown), and outputs image data to an external display apparatus, a computer, or the like. Reference numeral 713 denotes an object extraction region discrimination processing unit (image cutting processing unit), which performs discrimination between the background region and the object region based on images obtained under a plurality of image conditions by a method (to be described later), cutting processing of an image, and the like.

Reference numeral 714 denotes an image fetching signal generation unit for checking the control state of the exposure and image sensing conditions, and appropriately fetching sensed images in accordance with the charge accumulation-transfer time of the image sensor (CCD) and the timing of an image write control signal in the image recording/reproduction unit 706.

Reference numeral 715 denotes a system control unit serving as a means for setting a plurality of image sensing conditions. The system control unit 715 generates a series of image sensing operation control signals in the object extraction mode in accordance with signals from the command data communication control unit 710 and the image sensing mode setting switch 709 or by loading information of the control program written in the storage medium of the image recording/reproduction unit 706.

Reference numeral 716 denotes a stop; and 717, a video signal processing unit which is constituted by a pre-processing circuit (including an S/H circuit, an AGC circuit, an A/D converter, and the like) 717a, a gamma correction control circuit 717b, and other video signal processing circuits (including a white balance correction circuit, a camera shake correction circuit, and the like) 717c. Note that the circuit arrangement of these circuits is not limited to the specific one shown in FIG. 45.

Reference numeral 718 denotes a sensor drive circuit for driving the image sensor 704 to control the charge accumulation time, transfer timing, and the like. In FIG. 45, the flows of control signals particularly associated with this embodiment are indicated by arrows.

In this embodiment, in the object extraction image sensing mode, the focusing lens motor (focus motor) is driven on the basis of the output from the focusing state detection unit 752a, and a high-resolution image is fetched from the image sensor 704 at an optimal in-focus level, i.e., in the best focusing state of the object. Thereafter, the focusing lens motor is driven in the same direction as the immediately preceding driving direction to cause an out-of-focus state, and low-resolution images at appropriate out-of-focus levels are successively fetched.

Note that the appropriate out-of-focus levels are values which are set in advance and are recorded in a storage unit such as the image recording/reproduction unit 706 or values set by a command signal from the external terminal device 721 or the like, and each out-of-focus level is given by the ratio from the in-focus level (i.e., a numerical value, e.g., 90% of the in-focus value).

Also, an image may be sensed at another out-of-focus level, and may be used for extracting initial data (coarsely cut image data) for subsequent image cutting processing.

Upon completion of the successive image sensing operations, the object extraction mode is automatically canceled or is restored to the standard mode by the image sensing mode setting switch 709. Note that the above-mentioned image sensing mode may be set and canceled in response to commands input from the terminal device 721.

Figure 46:
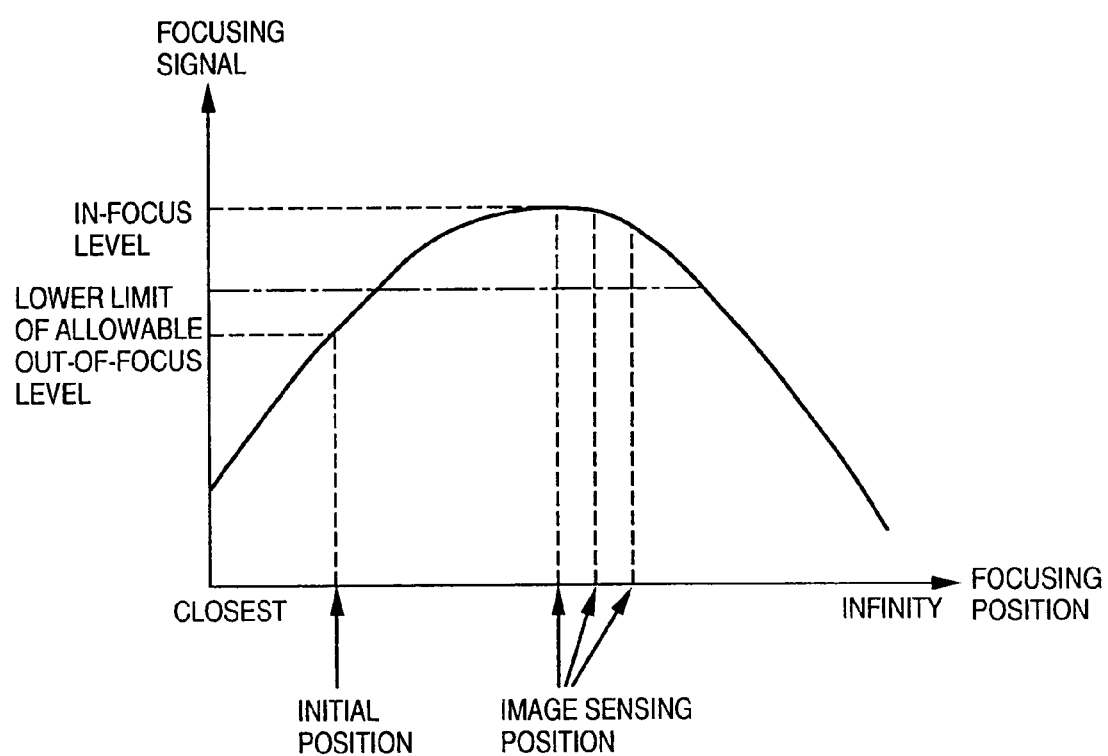
FIG. 46 is a graph showing the relationship between the focusing signal and the image sensing position of the focusing lens when image sensing operations are performed under a plurality of image sensing conditions based on focusing control.

FIG. 46 is a graph showing the relationship between the focusing signal and the image sensing position of the focusing lens when image sensing operations are performed under a plurality of image sensing conditions based on focusing control. As shown in FIG. 46, the focusing lens is driven from its initial position and an image is sensed upon detecting the in-focus level. Thereafter, the focusing lens is driven by a predetermined amount, and an out-of-focus image within an allowable range is fetched.

Figure 47:
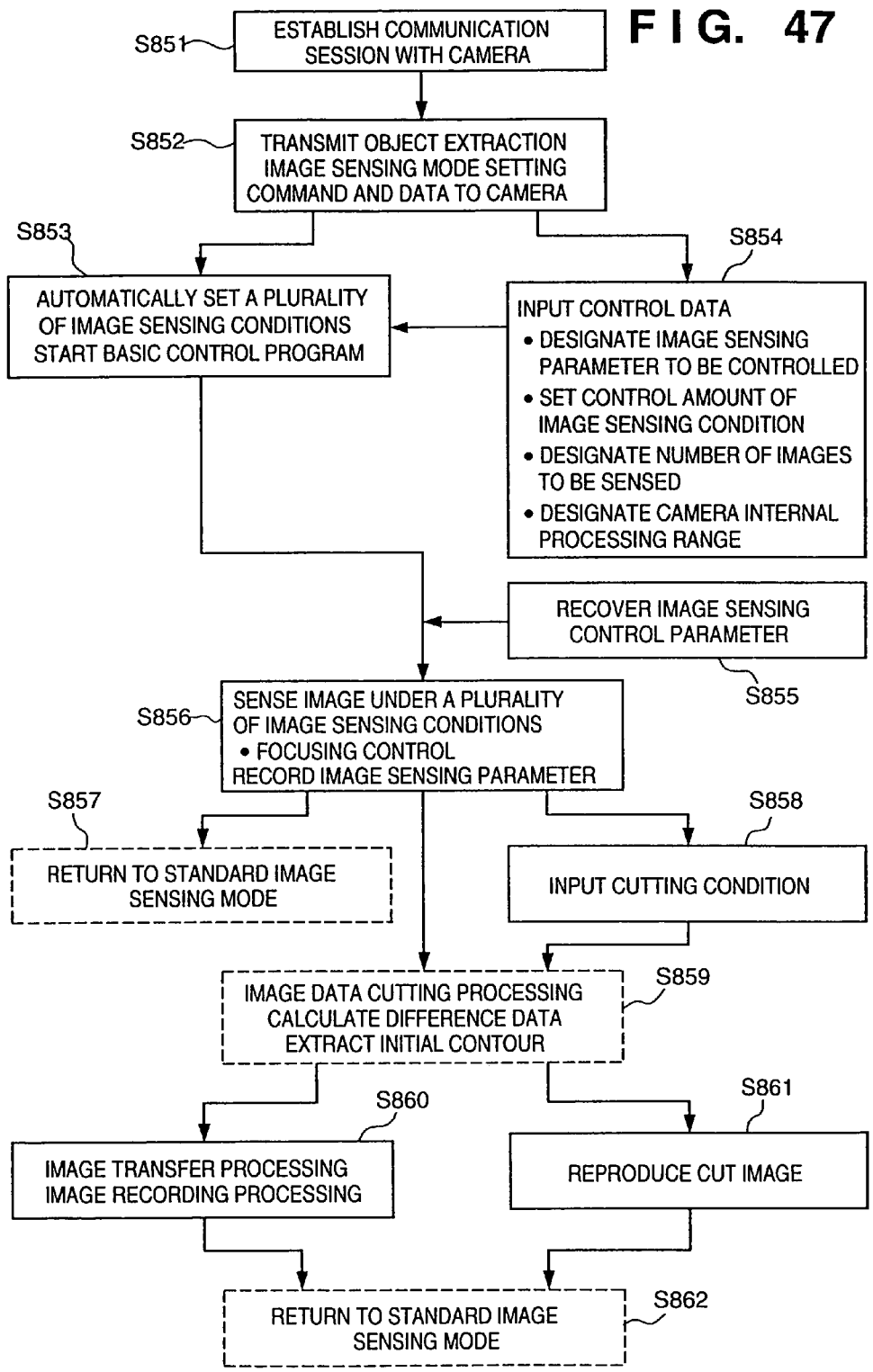
FIG. 47 is an explanatory view showing functions in a basic image sensing system to which a camera and a terminal device are connected.

FIG. 47 is an explanatory view showing the functions in the basic image sensing system to which the camera and the terminal device are connected. In FIG. 47, functions indicated by bold lines (steps S851, S852, S854, S858, S860, and S861) are performed at those of the terminal device 721, and functions indicated by broken lines (steps S857, S859, and S862) are those of either the camera or the terminal device. Other functions are those in the camera (steps S853, S855, and S856). These functions will be described in turn below.

The terminal device 721 establishes a communication session with the camera 701 (step S851). The terminal device 721 transmits an object extraction image sensing mode setting command to the camera 701 (step S852).

In this process, whether the basic control program operates (step S853) or image sensing parameters to be controlled, the control amounts of the image sensing conditions, the number of images to be sensed, the processing range in the camera (e.g., up to pre-processing such as calculation of difference data for cutting processing, only image sensing operations under a plurality of image sensing conditions, or the like), and the like are input and set from the terminal device 721 (step S854) is selected. One of these processing operations may be selected from, e.g., a menu displayed on the display device 726 of the terminal device 721.

Note that these conditions are prepared in advance in the basic control program as standard conditions. When image sensing operations are to be performed by setting a plurality of image sensing conditions (step S856), the image sensing conditions are controlled based on the pre-set parameters, and the image sensing parameters (lens data, focal length, magnification, focusing signal, focusing lens layout, gamma control value, stop diameter, charge accumulation time, and the like) at that time are recorded.

The subsequent operation sequence branches to three different control processing sequences in correspondence with the processing range inside the camera. That is, the image sensing mode automatically returns to a standard mode (step S857), input cutting conditions are received after image sensing operations in the object extraction mode are completed (step S858), or cutting processing is performed under a predetermined standard condition (step S859).

Upon completion of the processing, the extracted image may be recorded by the image recording/reproduction unit 706 in the camera main body, may be transferred to an external memory or the display device 722 (step S860), or may be displayed on the finder display (step S861). Note that the output format of the extracted image has already been designated in advance upon reception of control data or in the basic program. After the processing, the image sensing mode finally automatically or manually returns to the standard image sensing mode (step S862).

The processing steps of images fetched from the image sensor 704 will be described in detail below. The video signal processing unit 717 performs gamma correction, white-balance correction, and the like for at least two video signals obtained from the sensor by controlling the focusing state.

The region discrimination processing unit 713 in the image sensing apparatus calculates difference data between a high-resolution image (in-focus image) and a low-resolution image (out-of-focus image) or difference data between two different low-resolution images, and performs processing such as smoothing, binarization, line-thinning and the like for the calculated data.

Note that the processing other than the difference calculation processing may be performed by inputting appropriate processing parameters from the terminal device 721 via the command data communication control unit 710.

When a plurality of low-resolution images having different out-of-focus levels are used, high spatial frequency components are cut, and the influence of unwanted isolated feature points or isolated regions can be suppressed when the contour line of a specific object is extracted from the difference data. Therefore, initial data (contour line) with stably high precision can be obtained independently of high spatial frequency components of noise or the background portion or illumination conditions. Note that the output value of a pixel which assumes a negative value upon calculating the difference may be set to be zero, or the absolute value of the difference of each pixel may be output.

The subsequent initial data (contour data) extraction processing will be described below. This processing can be performed at the terminal device 721 connected to the camera 701. Calculation processing inside the camera may be registered as a standard processing mode or may be designated by the terminal device 721 or the like via the command data communication control unit 710. Typically, as standard processing inside the camera, the difference calculation processing between a plurality of images having different image sensing conditions and binarization processing, or the difference calculation processing and smoothing processing, and the like are set in the basic control program.

After comparison (difference) data between images obtained by controlling the image sensing conditions is calculated, the smoothing processing is attained by removal of isolated features (local regions having indefinite shapes but identical luminance level or color, line segments, and the like), a convolution calculation with a Gaussian filter, normal low-pass filter processing, or the like. A threshold value for the subsequent binarization processing may be set by the Otsu's method (*Journal of Papers of The Institute of Electronics, Information and Communication Engineers*, Vol. J63, pp. 349–356, 1980), the method in which an image is divided into blocks each having an appropriate size, and a threshold value is then set on the basis of statistical processing (hypothesis testing based on the average, variance, or histogram, or the like) of local image data (luminance, color, or the like), or the like.

In this embodiment, the region discrimination processing unit 713 may perform averaging processing of (a plurality of) difference data among a plurality of (three or more) images obtained by continuously controlling the focusing state, and initial contour line extraction processing (smoothing, binarization, thin-line conversion processing, and the like) of the image to be cut out may be performed for the averaging processing result.

For this purpose, the lens motor is driven at high speed on the basis of the output from the focusing state detection unit 752*a*, and at least three still images including near-focus or far-focus images, or both near- and far-focus images as well as an optimal in-focus image are continuously sensed at predetermined time intervals. The sensed images are stored in the image recording/reproduction unit 706. Typically, after an image upon detection of the focusing state is fetched, a predetermined number of out-of-focus images are continuously sensed.

In this case, signals from the image sensor 704 are transferred to and recorded in a temporary storage unit (not shown) such as a cache memory via a high-speed switching transfer unit (not shown) without going through the video signal processing unit 717. After image sensing under a plurality of image sensing conditions, i.e., writing images in a temporary storage unit is completed, the images are sequentially transferred and subjected to pre-processing necessary for video signal processing and image cutting.

Note that the high-speed switching transfer unit may directly transfer data to the region discrimination processing unit 713. In this manner, since a video signal from the sensor is not subjected to nonlinear processing, which is normally performed, the processing precision can be stabilized by suppressing the influence of changes in illumination conditions, object motions, and the like upon image sensing.

When the video signal processing is performed after a series of images are fetched, a high-speed image sensing operation, stable cutting processing, and high flexibility can be realized. When images are sensed time-serially, only difference data updated by the averaging processing with the immediately preceding image data may be temporarily stored. If the number of images to be used in the initial contour line extraction processing is designated to be N in advance, when N or more images are fetched during the focusing process, the latest N images may be held (images are deleted in the order of older ones), and thereafter, the calculation of difference data and averaging processing may be performed. When difference data among a plurality of images having slightly different focusing states are averaged like in this embodiment, the influence of noise can be suppressed, and image extraction that assures high precision and high resolution can be realized.

The processing steps of image data are the same as those in the explanatory view in FIG. 15. (1) of FIG. 15 shows an in-focus image, (2) of FIG. 15 shows an out-of-focus image, which is emphasized for the sake of illustration, and (3) of FIG. 15 shows a local region set when the user indicates one point in the object to be extracted while confirming the image in (1) of FIG. 15 on the display device 726.

(4) of FIG. 15 shows an example of an image in an initial contour line obtained as a result of the smoothing, binarization, line-thinning, and contour line tracing processing in the local region on the basis of difference image data between (1) and (2) of FIG. 15. Although not shown, upon calculating the difference image data, two out-of-focus images having different focusing levels may be used, as described above. Also, only the contour line tracing processing may be performed without performing smoothing and binarization.

Figure 48A:
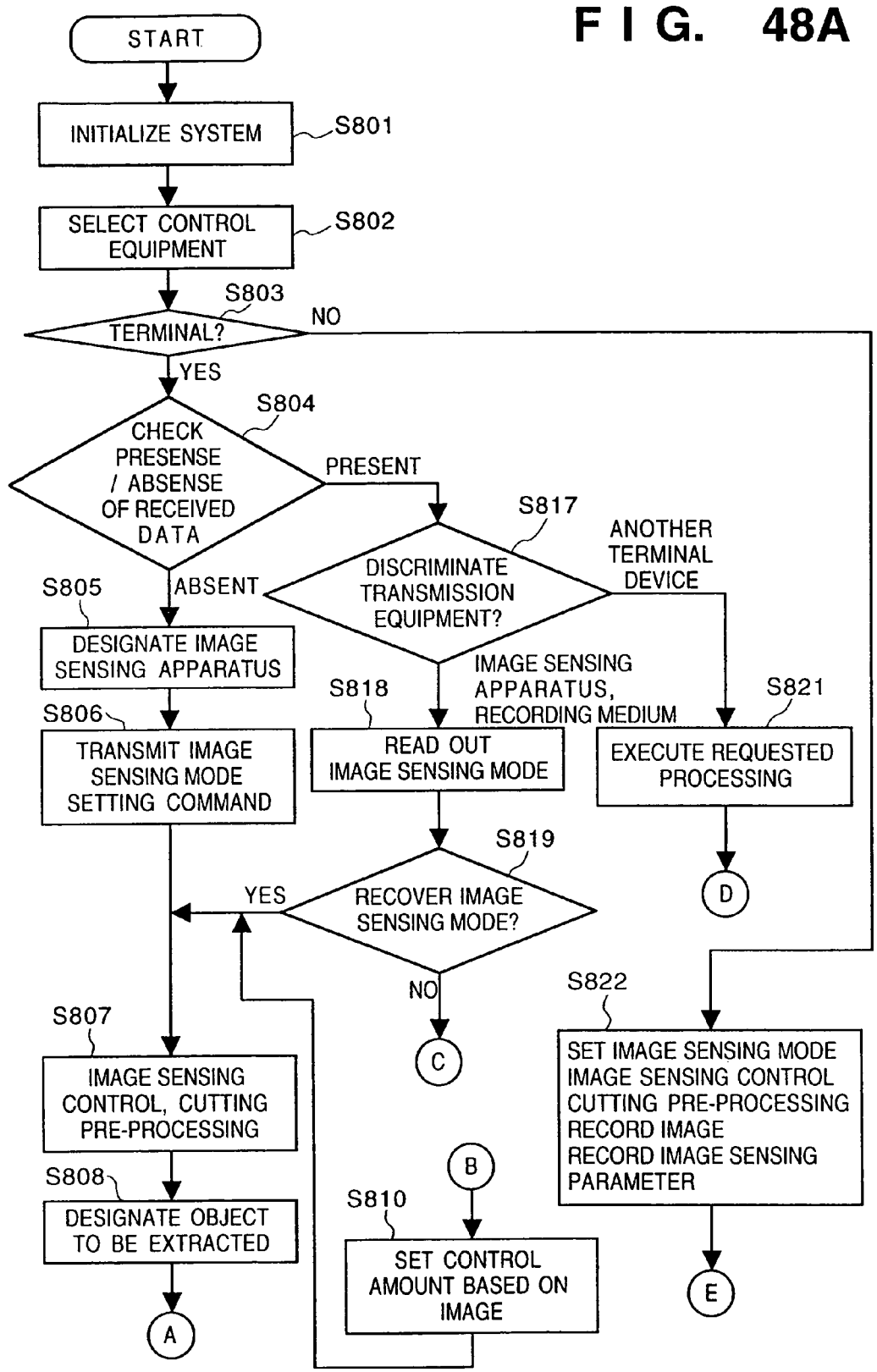
FIGS. 48A and 48B are flow charts showing the image extraction processing sequence.
Figure 48B:
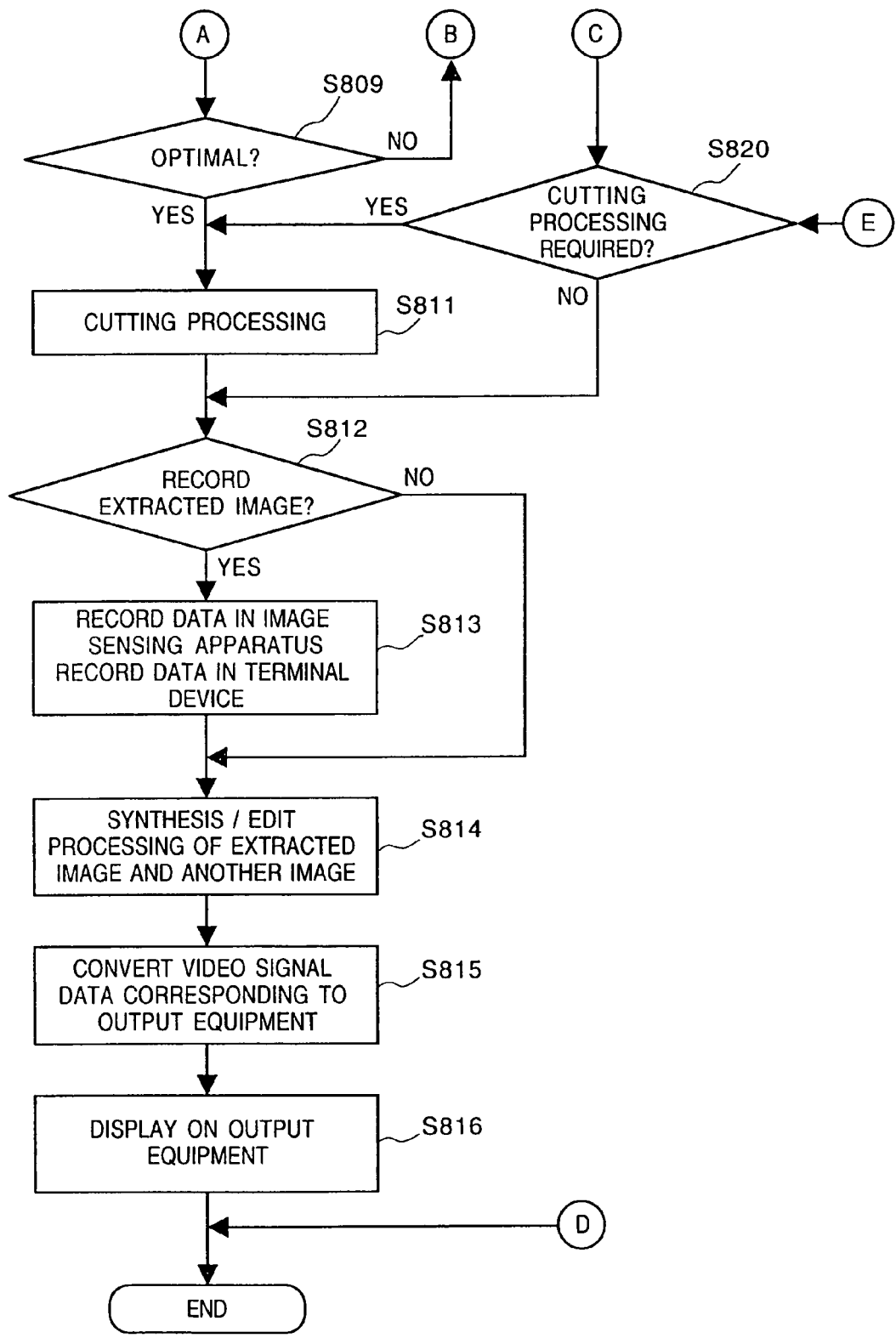

FIGS. 48A and 48B are flow charts showing the image extraction processing sequence. The image sensing system is initialized (step S801), and devices connected to the network are set in the standby state. Normally, this initialization is performed by the terminal device 721 side.

Subsequently, a device that controls from the image sensing operation to the output operation is selected (step S802). It is checked if the selected control device is a terminal device 721 (step S803). If YES in step S803, the presence/absence of received data or command is checked in the standby state (step S804). If received data is not present, the image sensing apparatus 701 which is to perform operations is designated (step S805).

When the user selects an object extraction mode setting menu from an initial menu panel displayed on the display device 722, an object extraction image sensing mode setting command is transmitted to the image sensing apparatus 701 (step S806). Upon reception of this command, the image sensing apparatus 701 reads out the basic control program that has a standard data set for object extraction from the internal memory (e.g., a ROM) of the system control unit 715.

In this embodiment, the standard data set includes the control image sensing parameters (focusing), the number of images to be sensed, the allowable range of the image sensing parameters to be controlled (given as the ratio with respect to the in-focus level in this embodiment), the output destination of image data (given as a terminal device or the memory in the camera main body), and the like. Note that this basic program may be read out from the recording medium in the image recording/reproduction unit 706.

At this time, the contents of the standard data set are displayed, and a message for prompting the user to change the contents is displayed. The user changes the contents at that time if necessary. Thereafter, the setting control of a plurality of image sensing conditions and pre-processing (calculation of comparison data between a plurality of images and the like) for cutting processing are performed by the above-mentioned method (step S807).

An image from the image sensing apparatus 701 is displayed on the screen of the display device 726, and the user selects an object to be selected (step S808). More specifically, the user indicates (clicks), e.g., a point near the boundary between a portion inside the object and the background using the pointing device 723 such as a mouse. In this case, it is desired to set appropriate field angle/exposure conditions upon image sensing. In this step, it is checked if the image sensing conditions are proper (e.g., if the object image is sensed under appropriate exposure conditions, if the entire region to be extracted is present, if the region to be extracted has a sufficiently large size, and so on) (step S809). If the image sensing conditions are proper, the control enters region discrimination and cutting processing are performed (step S811).

On the other hand, if the image sensing conditions are improper, zooming, the posture of the image sensing apparatus 701, and other image sensing parameters are automatically changed on the basis of image data (step S810). For example, the photometry and exposure conditions in a predetermined region having the indicated point as the center may be set, the area of a region having similar image attributes may be calculated, and zooming control may be performed, so that the area ratio of the region to the screen has a predetermined value or more.

As an interactive designation method, the user may indicate a plurality of points to roughly designate the region of an object, or may designate the shape and size of a region that surrounds the object and may indicate a point on the object image using a mouse to determine the position of a rectangular or elliptic region or may scan the mouse in one direction to semi-automatically set a predetermined shaped region corresponding to the scanning length.

Thereafter, zooming and focusing operations having the region as the center are performed. After the in-focus level is detected, the above-mentioned image sensing operations at out-of-focus levels, the calculation of difference data, and the above-mentioned contour line tracing processing on the boundary for extracting the object region are performed.

Upon completion of the cutting processing, whether or not to record the extracted data is selected (step S812). If data is to be recorded, the location is designated and data is written (the internal storage unit of the image sensing apparatus 701 or the internal storage unit of the terminal device; step S813). Thereafter, and also when the image is not recorded, the edit processing (synthesis with another image or the like) of the extracted image is performed using the mouse 723 of the terminal device 721 (step S814). Furthermore, image data may be subjected to conversion processing in correspondence with the visual characteristics of a person in accordance with the characteristics of the output device (printer, display, or the like) (step S815), and the converted data may be displayed (step S816).

A case will be described below wherein it is determined upon checking the presence/absence of received data (step S804) that data transmitted from the image sensing apparatus 701 is received, or a recording medium that stores an image sensing control program of the object extraction mode is loaded into a terminal device 721.

The transmission device is checked (step S817), and image sensing mode data (the standard or object extraction mode, or the like) is read out together with image data (step S818). It is then checked if the image sensing operations and cutting processing are performed in the object extraction image sensing mode under identical conditions (step S819). If the image sensing operations and cutting processing are performed in the object extraction image sensing mode under identical conditions, the image sensing apparatus 701 is designated to execute the processing in step S807 and the subsequent steps.

Otherwise, the user selects whether or not to perform the cutting processing at the terminal device 721 (step S820). Thereafter, step S811 or S812 and the subsequent steps are executed in correspondence with the user's choice. If it is determined in step S804 that command data from another terminal device is received, processing (step S821) corresponding to the received request is performed, needless to say.

On the other hand, when the image sensing apparatus 701 is selected upon selecting the control device (step S802), the operation on the image sensing apparatus 701 is executed prior to all other operations. When processing is basically attained by only a switch operation or the like on the camera, the processing sequence of the basic processing (step S822) from when a plurality of images having different focusing states are sensed until pre-processing for image cutting processing is performed is as follows.

When the object extraction mode is set after the power switch is turned on, standard parameter values (e.g., the out-of-focus level range, the number of images to be sensed for cutting processing, and the like) stored in a plurality of image sensing condition setting units, the basic control program, or the like are read out.

The lens motor drive control unit 703 detects lens information such as the specifications and type of imaging optical system mounted. This information is used for the purpose of appropriately controlling the drive amount of the focus motor during the focusing control or of attaining high-speed setting processing corresponding to the type of optical system upon setting identical image sensing conditions to those used previously.

Thereafter, the magnification, and photometry and (automatic) exposure conditions are set as in the normal image sensing mode. The focus motor is then driven until an optimal in-focus level is attained with respect the object, and the focusing state is detected on the basis of, e.g., a hill-climbing method, thereby sensing an in-focus image of the object.

The focus motor is driven by a predetermined width in the same direction as the previous drive direction, and the focusing signal level is evaluated. If the focusing signal level corresponds to an out-of-focus level falling within the predetermined allowable range, an image sensing operation is performed. At this time, the number of images to be sensed is checked, and the focusing control and the image sensing operation are repeated until a predetermined maximum number of images are sensed. Difference image data between a plurality of images having a small focusing signal level difference is extracted, and image cutting processing is performed.

The image cutting processing (contour line extraction processing) will be described below. A binarization threshold value may be set on the basis of statistical processing for a local region having a predetermined size (or a region set in an arbitrary shape using a mouse or the like) having the designated point set by the mouse or the like as the center, and binarization, line-thinning, and contour tracing processing may be performed within the region.

Upon completion of the processing, a local region having the edge point of the previous region as the center is automatically set to repeat the same processing. Of these processing operations, the line-thinning is processing for obtaining representative points in a bold initial contour line, and is not limited to a specific method performed in conventional image processing. For example, an edge point may be searched for from one arbitrary point in the coarse initial contour in one of the right, left, up, and downward directions, and then, an edge point adjacent to the obtained edge point is searched for, thus determining representative points.

When a plurality of edges or contour lines are present in a neighboring region as a result of the line-thinning processing, they may be displayed while being superposed on the input image, and may be selected using a means such as a mouse.

When only one edge is present in a neighboring region or the user selects an edge, the contour line tracing processing is performed in a pre-set direction, and the positions of the respective points of the thinned line image, which are connected to the edge, are sequentially recorded as sampling points of the initial contour line.

As the method of selecting the branch direction when the thinned line image has a branch structure, the branch direction in which the image data attribute (color, luminance, its variance, or the like) of the contour line in a direction perpendicular to the tracing direction of a point before the branch is continuous or a direction in which changes in direction before and after branch are small is preferentially selected. In this case, the processing is performed by detecting the image attribute of a small region having each point after the branch as the center.

As another method, the contour tracing may be suspended, and a region having the branch point as the center may be caused to flicker, so that the user may select the branch direction. When an imaging optical system with a shallow focal depth is used, and when the distance between the object to be extracted and the background is sufficiently larger than the object distance, the branch structure can be inhibited from appearing in difference image data at the boundary portion between the background and the object, needless to say.

When the contour line is divided by the binarization and line-thinning processing, edge linking processing is performed. In this case, automatic linking may be performed on the basis of a predetermined algorithm (see Papers of the 23rd Image Engineering Conference, pp. 67–70, 1992 and the like), or remaining edge points as a result of the contour tracing may be caused to flicker on the display unit. Alternatively, the edge point may be clearly displayed using, e.g., a different color from other contour lines, and the user may confirm and indicate edge points to be connected using the selection/indication unit. As a contour line that links connection points, a straight line or a spline interpolation curve using representative points on the contour line may be generated. In particular, when an edge point after the contour tracing is present on the image frame, it may be coupled to one on another frame.

As described above, after the closed contour line and image data therein are extracted, more precise image extraction may be performed by applying background region removal processing based on, e.g., statistical processing, a region growth method, an active contour processing method, or the like.

In this embodiment, a plurality of images having different focusing states are processed by controlling the focusing lens. Alternatively, a plurality of images having different image sensing parameters (stop, shutter speed, or the like), different image sensing conditions (exposure conditions, sensor signal characteristics, or the like), or their combinations may be processed, and extraction, identification, tracking, and the like of a specific object may be performed.

[Still Another Embodiment]

This embodiment will exemplify a case wherein the image sensing system and the specific object extraction principle described in the above embodiment are applied to a digital copying machine connected to, e.g., a computer terminal.

FIG. 49 is a block diagram showing the arrangement of an image sensing system of this embodiment. In this image sensing system, a copying machine 727 serving as an image input unit is connected to a communication network.

Figure 50:
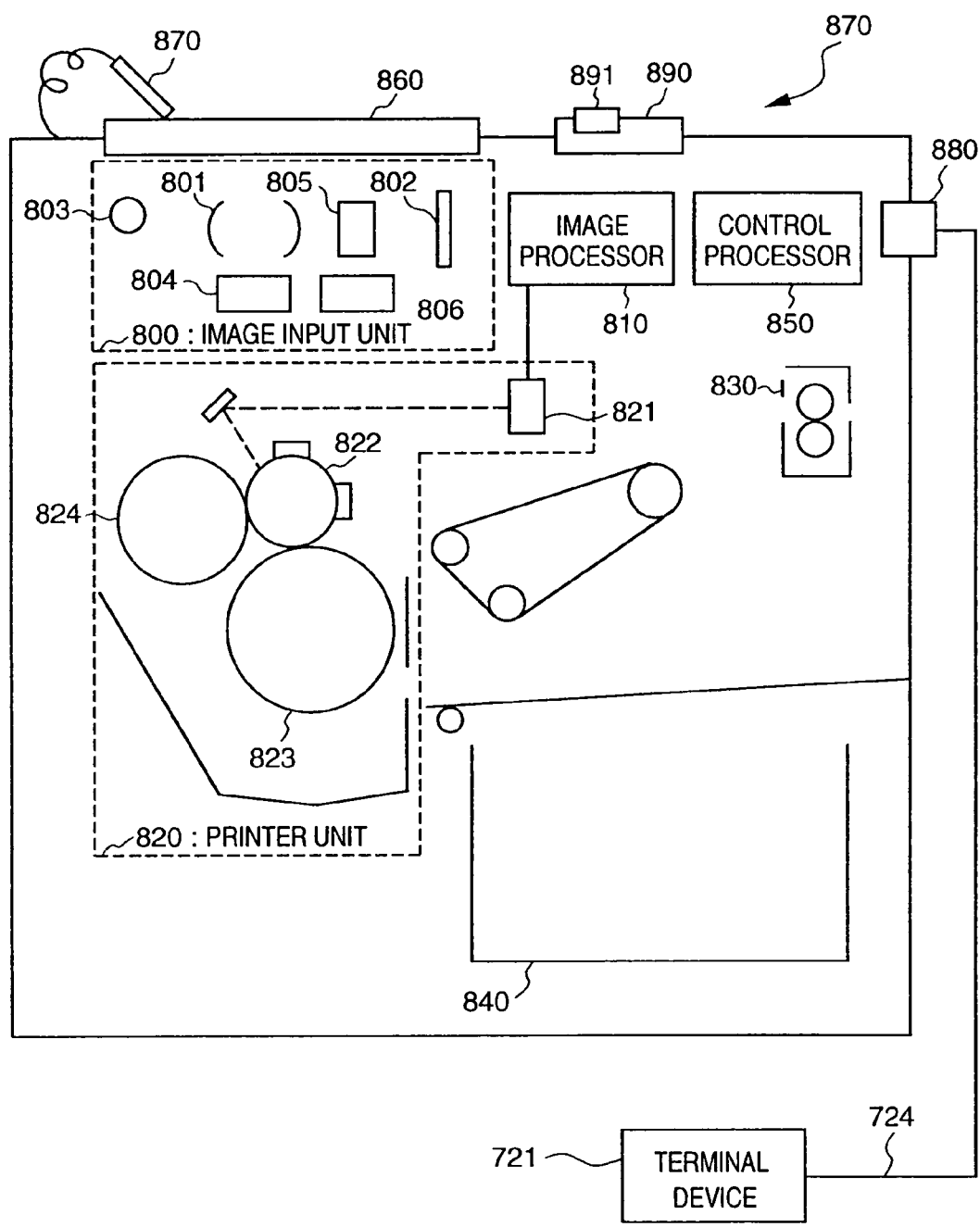
FIG. 50 is a schematic explanatory view showing the arrangement of a digital copying machine.

FIG. 50 is a schematic explanatory view showing the arrangement of a digital copying machine. An image input unit 800 is constituted by an optical system 801 having zoom and focusing functions, an image sensor 802, an illumination unit 803 such as a halogen lamp, a focus/zoom lens motor 804, a visible light spectral filter 805, a control unit 806, an infrared cut/spectral correction filter (not shown), and the like.

A printer unit 820 is constituted by an image processor 810, a semiconductor laser 821, a photosensitive drum 822, a transfer drum 823, a rotary developer 824, and the like. Also, the copying machine comprises a fixing device 830, a paper feed unit 840, a toner supply unit (not shown), a control processor 850, an original table 860, an indication/selection unit 870, a data communication control unit 880, an operation panel 890, and the like.

An optical system (not shown) of the printer unit 820 is normally constituted by a reflection mirror, a toric lens (f-θ lens), a spherical lens, a polygonal mirror, a cylindrical lens, and the like in the order of positions closer to the photosensitive drum.

The operation panel 890 has an object extraction copying mode setting switch 891 for setting the copying machine in the object extraction copying mode. Note that this mode can also be set by an indication/selection unit such as a keyboard, pen, mouse, or the like of a terminal device 721. In this embodiment, after this copying mode is set, an image used for generating mask data of the region to be copied is sensed, and thereafter, the semiconductor laser 821 emits, to only the mask region, light having an output level corresponding to the density of image data read in advance, and a latent image is formed on the photosensitive drum 822.

A display unit of the terminal device 721 displays an image sensed in a normal image sensing mode. The user confirms this image, and indicates a point on or near a contour line between the object to be extracted and the background.

The control processor 850 then controls the image sensing parameters, and fetches images under different image sensing conditions (e.g., different focusing conditions), and the image processor 810 calculates difference data between these images. Thereafter, when cutting processing of the region to be extracted (mask data generation processing) similar to that in the above embodiment is performed, only the image to be extracted is copied. The extracted image may be transferred and output to another terminal device 721 or display device 722 on the network.

In this embodiment, some components of the above-mentioned arrangement can be applied to an electrophotography type facsimile apparatus having an imaging optical system. A reading unit of this facsimile apparatus has an illumination unit, a mirror scan mechanism, an optical system whose image sensing parameters can be controlled as in the above embodiment, and an image sensor.

A recording unit may use either a laser beam printer system or a thermal transfer recording system. A communication control unit has, for example, a G4 protocol control function for a digital line, and a G3/G2 communication control function for a subscriber line. A control unit has an encoding/decoding unit.

This facsimile apparatus 727 is connected to an external terminal device 721, and can be controlled from the terminal device 721. More specifically, after an image is sensed in a normal mode, the image data is displayed on the display unit of the terminal device 721. The user indicates a specific object to be extracted and transferred from the image displayed on the display unit, thus extracting an image by the above-mentioned method.

Note that the image sensing operations based on the focusing control, and extraction and copying of a specific object can be efficiently performed with high precision when they are applied to a three-dimensional object. In this case, a copying machine is constituted by constituting elements of a normal copying machine such as a three-dimensional object table, an image sensing apparatus, an image processor, a printer unit, a fixing device, and the like. In particular, the image input unit 800 may be separated from other constituting elements of the copying machine, and may be arranged above the three-dimensional object table. Processes until an image region extracted by the image processor 810 is transferred onto the photosensitive drum and only a specific object image is finally copied are the same as those in the above-mentioned method.

As a preferred image sensing control system for extracting a specific object image from a two-dimensional region such as the surface of a paper sheet, images may be input under a plurality of image sensing conditions by controlling the characteristics of the visible light spectral filter 805 in the image input unit 800 by the filter control unit 806, and a specific object region may be extracted and copied on the basis of difference data between the input images.

For example, when an image of an object whose color tone characteristics are offset to a specific spectrum (e.g., an entirely red object) is to be extracted, an image obtained by controlling the spectral filter to increase the transmittance for the spectrum, and an image obtained in a normal mode are input, and image extraction is performed based on their difference data.

As another image sensing control system, extraction processing may be performed for a plurality of images obtained by controlling the video signal characteristics (gamma and the like) or exposure conditions (illumination light intensity, the diameter of a stop if it is used, the scanning speed when an image is input by scanning the sensor, and the like) of the image sensor 802.

In this case, in particular, it is preferable that difference data between images be calculated after normalization processing (e.g., luminance values are scaling-converted to obtain an identical maximum luminance level) is performed between a plurality of image data, and the cutting processing be performed in the same manner as in the above-mentioned method.

[Still Another Embodiment]

In this embodiment, the above-mentioned specific object extraction principle is applied to another image input equipment (an image scanner, a facsimile apparatus, or the like) having a contact type image sensor (CCD element or the like). This embodiment will exemplify a case wherein the above-mentioned principle is applied to a facsimile apparatus, for the sake of simplicity.

Figure 51:
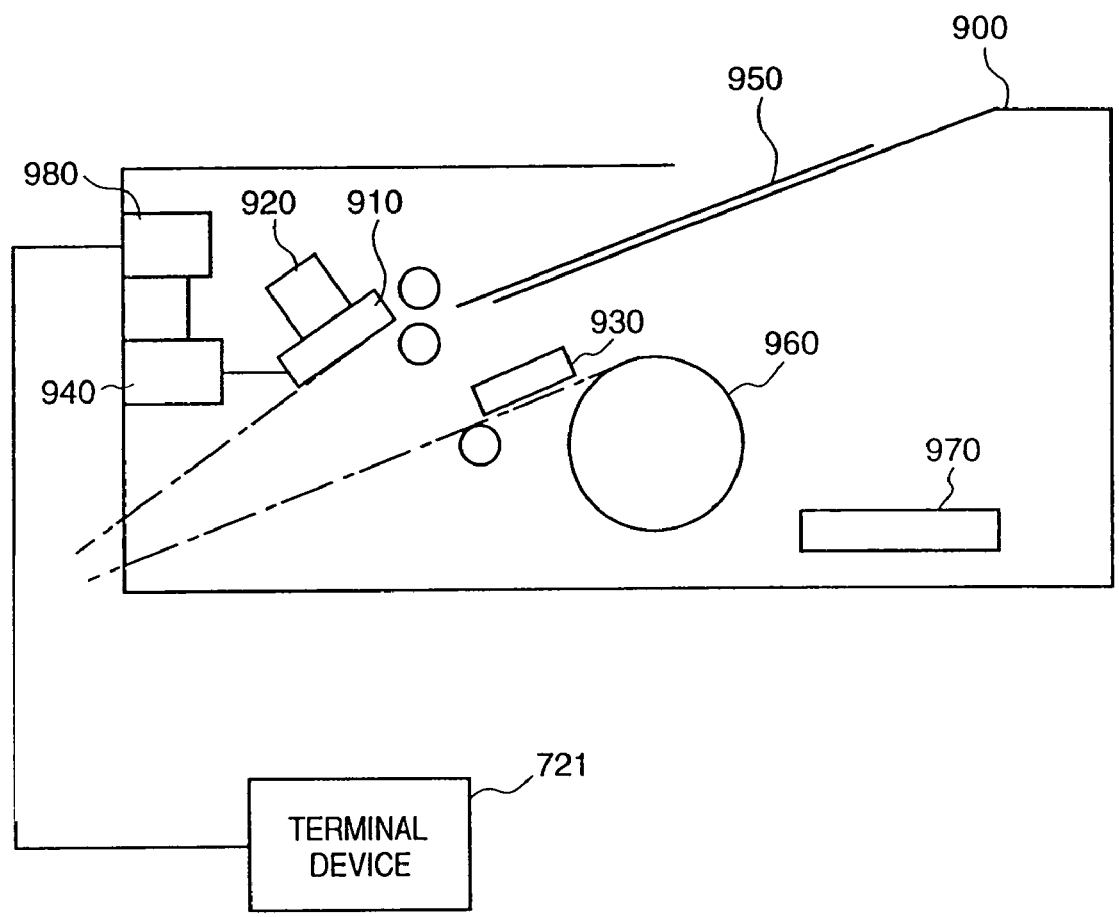
FIG. 51 is a schematic explanatory view showing the arrangement of an image input equipment.

FIG. 51 is a schematic explanatory view showing the arrangement of an image input equipment. A main body 900 is connected to a terminal device 721, and an image of an original 950 is photoelectrically converted by a contact type image sensor 910, thus reading image information.

In this embodiment, a drive control mechanism 920 for finely moving the image sensor 910 in a direction substantially perpendicular to its sensor surface is arranged, thereby inputting an original image sensed in a normal mode (high-resolution image input mode) and an out-of-focus image.

As a drive unit of the drive control mechanism 920, a piezoelectric element, a voice coil motor, or the like is normally used. Note that image data transferred via a modem 970 is transferred onto a recording sheet 960 by a recording unit (e.g., a thermal head and the like) 930 as in other facsimile apparatuses. An image processing unit 940 divides the output from the image sensor 910 into a character region and an image region, and extracts a specific figure element, which is designated in advance, or a specific object region from the image region on the basis of the method described in the above embodiment.

More specifically, the image scanning and reading operations are performed at the normal sensor surface position to fetch first image data. Thereafter, the scanning and reading operations of an identical image region are performed in an out-of-focus state attained by finely moving the sensor surface, thus obtaining second image data. Furthermore, contour extraction and cutting processing of the object as in the above embodiment are performed for difference data between the first and second image data.

A control processor 980 manages image reading, object extraction, drive control of the contact sensor position, thermal head recording, paper feed control, and the like, which may be controlled by control commands from the terminal device 721.

[Still Another Embodiment]

In this embodiment, an image sensing apparatus comprises an inexpensive, compact radio communication means having an infrared ray communication function. Other constituting elements in the camera are the same as those in the above embodiment.

When a communication control unit is also built in a terminal device, it exchanges an object extraction image sensing mode setting signal, image sensing parameter control data, extracted image data, and the like with the image sensing apparatus. A communication method specified by a modulation method, encoding method, data transmission rate, data format, communication protocol, and the like is not particularly limited to a specific method. However, a method defined by IrDA is normally used. In this case, a one-to-one bidirectional communication within the distance range of several meters (normally, 1 m) is a premise, but one-to-many communications (communications between one image sensing apparatus and a large number of terminal devices or between one terminal device and a large number of image sensing apparatuses) may be performed in principle.

Normally, at the beginning of a communication with a partner device, a session is established at a rate of 9,600 bits/sec, and the maximum transmission rate of both the devices is checked at that time. Thereafter, a communication is performed at the maximum transmission rate.

A half-duplex communication is performed by exchanging the right of transmission of data every 5 to 500 ms. When a terminal device establishes a communication session with a specific image sensing apparatus, they exchange their types (image sensing apparatus or terminal device), the ID number of a user, and the like, and the image sensing apparatus is set in an image sensing standby state by a remote-control operation.

In this case, a message indicating a communication control mode may be displayed on the operation panel display of the camera. Subsequently, processes from when the object extraction image sensing mode is set until fetched image data is transferred or recorded are the same as those in the above embodiment. Note that control data or appropriately compressed/encoded image data can be connected to a network such as a public network or ISDN via a communication equipment that adopts the same communication method, and can be transferred to a remote place. Also, the same operation panel as that of the image sensing apparatus may be displayed on a display panel of the terminal device, and camera operation information may be transmitted to the image sensing apparatus by a touch panel method or pen input.

According to each of the above embodiments, in image sensing means, image sensing parameter control means controls the image sensing parameters, and image sensing mode setting means sets an image sensing mode. In calculation means, first image processing means calculates comparison data between a plurality of images with the controlled image sensing parameters, and second image processing means classifies image regions by discriminating the calculated comparison data. In terminal means, data communication means performs data communications with the image sensing means, and the image sensing parameter control means controls the image sensing parameters on the basis of a signal from the terminal means or a signal from the image sensing mode setting means. Therefore, image sensing operations for extraction, recognition, tracking, and the like of an object can be selectively attained by a remote-control operation by means of communication control from an external terminal device or an operation on the image sensing means (camera).

In image sensing means, image sensing parameter control means controls the image sensing parameters, and image processing means calculates comparison data between a plurality of images with the controlled image sensing parameters. In calculation means, indication/selection means indicates an object position in the image. When terminal means performs data communications with the image sensing means, the calculation means generates an image sensing parameter control signal on the basis of the object position signal from the indication/selection means and image data in a predetermined size region having the indicated position as the center, the image sensing parameter control means controls the image sensing conditions on the basis of the image sensing parameter control signal, and the terminal means extracts a specific object image by processing the image obtained under the controlled image sensing conditions. As a result, appropriate image sensing conditions having an object as the center can be set on the basis of image data.

Since the image sensing parameter control means controls the image sensing parameters to perform an image sensing operation having, as the center, a region having substantially uniform predetermined feature amounts of image data, the image sensing system for object extraction can be optimized and automated on the basis of image data.

Since the data communication means has synchronization means for transferring image data in synchronism with the image sensing means, and the calculation means processes image data received via the data communication means, an image sensing (image fetching) operation for object extraction can be performed at an arbitrary time and timing from the external terminal device side.

An apparatus comprises image sensing means having finder display means, image display means for displaying an image sensed by the image sensing means, indication/selection means for indicating the image displayed on the image display means, and calculation means having region discrimination processing means for discriminating the indicated region of the image. The region discrimination processing means processes image data sensed by the image sensing means and performs cutting processing for a position or region in the image frame output from the indication/selection means as the center, and the image display means or the finder display means displays the extracted image signal from the calculation means. Hence, high-speed processing from an image sensing operation to object extraction and high-speed display processing on a camera or a display of a terminal device can be realized.

An apparatus comprises image sensing means having image sensing parameter control means for controlling the image sensing parameters and memory means for storing sensed image data, image display means for displaying an image sensed by the image sensing means, indication/selection means for indicating the displayed image, calculation means having region discrimination means for discriminating the region of the indicated image, and terminal means having data communication means for performing data communications with the image sensing means. The image sensing parameter control means receives control data from the terminal means via the data communication means or the memory means. The region discrimination processing means calculates comparison data between a plurality of images sensed under at least two image sensing conditions including a standard image sensing condition and a non-standard image sensing condition set by the image sensing parameter control means, and performs cutting processing for a position or region in the image frame output from the indication/selection means as the center. The image display means displays an image signal output from the calculation means. Therefore, a series of processing operations from the setting operation of the image sensing conditions to the display operation of the extracted image can be controlled by the terminal device side.

Since the data communication means has transmission/reception means of a signal by means of electromagnetic waves or a line, and communication procedure control means, and the apparatus also comprises image sensing mode setting means which sets the object extraction image sensing mode on the basis of command data received from the terminal means via the data communication means, the image sensing parameters for object extraction can be externally remote-controlled in a cordless manner.

Since the apparatus comprises memory means having recording/reproduction means for recording/reproducing image data on/from a detachable memory medium, and the memory medium holds image sensing operation control sequence data in the object cutting image sensing mode in its header portion, an image sensing operation control program can be recorded on a recording medium and can be externally supplied, and an identical image sensing operation (processing sequence in the camera) for object extraction can be automatically recovered.

Since the apparatus comprises memory means having recording/reproduction means for recording/reproducing image data on/from a detachable memory medium, and the image sensing parameter control means sets the image sensing condition and performs the image sensing operation on the basis of image data read out after the memory medium is loaded into the memory means, image sensing control data can be recorded on a recording medium and can be externally supplied, and an identical image sensing operation for object extraction can be automatically recovered.

Since the apparatus comprises memory means having recording/reproduction means for recording/reproducing image data on/from a detachable memory medium, the memory means records camera operation information upon sensing images for object extraction, and the image sensing mode setting means or the terminal means reproduces the camera operation information, if an image sensing operation for object extraction is manually performed, an identical image sensing operation can be automatically recovered later.

A method comprises the image sensing step including the image sensing parameter control step of controlling the image sensing parameters of an image sensing apparatus and the image sensing mode setting step of setting an image sensing mode, the calculation step including the first image processing step of calculating comparison data between a plurality of images with the controlled image sensing parameters and the second image processing step of classifying image regions by discriminating the calculated comparison data, and the data communication step of performing data communications between the image sensing apparatus and a terminal device. Since the image sensing parameter control step controls the image sensing parameters on the basis of a signal from the terminal device or a signal set in the image sensing mode setting step, image sensing operations for extraction, recognition, tracking, and the like of an object can be selectively attained by a remote-control operation by means of communication control from an external terminal device or an operation on image sensing means (camera).

A sensed image processing method comprises the image sensing step including the image sensing parameter control step of controlling the image sensing parameters of an image sensing apparatus and the image processing step of calculating comparison data between a plurality of images with the controlled image sensing parameters, the calculation step of indicating an object position in the image using an indication/selection device, and the data communication step of performing data communications between the image sensing apparatus and a terminal device. The calculation step generates an image sensing parameter control signal on the basis of an object position signal from the indication/selection device and image data in a predetermined size region having the indicated position as the center, the image sensing parameter control step controls image sensing conditions on the basis of the image sensing parameter control signal, and the terminal device extracts a specific object image by processing an image obtained under the image sensing conditions. Therefore, appropriate image sensing conditions having an object as the center can be set on the basis of image data.

The present invention can be applied to a system constituted by a plurality of devices (e.g., host computer, interface, reader, printer) or to an apparatus comprising a single device (e.g., a copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (Operating System) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flow charts described in the embodiments.

As many apparently widely different embodiments of the present invention can be made without departing from the spirit and scope thereof, it is to be understood that the invention is not limited to the specific embodiments thereof except as defined in the appended claims.

What is claimed is:

1. An image extraction apparatus comprising: image sensing means for sensing a plurality of images; image sensing condition control means for controlling an image sensing condition when said image sensing means senses images; image sensing condition recording/reproduction means for recording the image sensing condition when said image sensing means senses images, and reproducing and outputting the recorded image sensing condition; image recording means for recording the plurality of images sensed by said image sensing means; image data conversion means for converting image data of at least one of the plurality of images on the basis of the image sensing condition supplied from said image sensing condition recording/reproduction means; image data comparison means for comparing the image data of the plurality of images converted by said image data conversion means; and image cutting means for extracting an image in a specific image region on the basis of a comparison result output from said image data comparison means.

2. The apparatus according to claim 1, wherein said image recording means temporarily stores a background image and an image including an object, in which an image to be cut out is present in a background, and said image data comparison means extracts difference image data of the plurality of images reproduced and output from said image recording means.

3. The apparatus according to claim 2, wherein said image sensing condition recording/reproduction means records an image sensing condition when an image to be cut out in a predetermined background is sensed, and said image data conversion means converts image data of the background image on the basis of the image sensing condition reproduced and output from said image sensing condition recording/reproduction means.

4. The apparatus according to claim 3, wherein said image recording means encodes and records the image data in the specific image region obtained by said image cutting means.

5. The apparatus according to claim 4, wherein said image data conversion means performs a space shift operation to maximize similarity between the background image and the image including the object.

6. The apparatus according to claim 4, wherein the image sensing condition includes an exposure amount, a focusing state, and the presence/absence of flash emission.

7. The apparatus according to claim 4, wherein said image data conversion means converts an image size, luminance level, color component, and resolution.

8. The apparatus according to claim 3, wherein said image data conversion means performs a space shift operation to maximize similarity between the background image and the image including the object.

9. The apparatus according to claim 3, wherein the image sensing condition includes an exposure amount, a focusing state, and the presence/absence of flash emission.

10. The apparatus according to claim 3, wherein said image data conversion means converts an image size, luminance level, color component, and resolution.

11. The apparatus according to claim 2, wherein said image recording means encodes and records the image data in the specific image region obtained by said image cutting means.

12. The apparatus according to claim 11, wherein said image data conversion means performs a space shift operation to maximize similarity between the background image and the image including the object.

13. The apparatus according to claim 11, wherein the image sensing condition includes an exposure amount, a focusing state, and the presence/absence of flash emission.

14. The apparatus according to claim 11, wherein said image data conversion means converts an image size, luminance level, color component, and resolution.

15. The apparatus according to claim 2, wherein said image data conversion means performs a space shift operation to maximize similarity between the background image and the image including the object.

16. The apparatus according to claim 2, wherein the image sensing condition includes an exposure amount, a focusing state, and the presence/absence of flash emission.

17. The apparatus according to claim 2, wherein said image data conversion means converts an image size, luminance level, color component, and resolution.

18. The apparatus according to claim 1, wherein said image recording means encodes and records the image data in the specific image region obtained by said image cutting means.

19. The apparatus according to claim 18, wherein said image data conversion means performs a space shift operation to maximize similarity between the background image and the image including the object.

20. The apparatus according to claim 18, wherein the image sensing condition includes an exposure amount, a focusing state, and the presence/absence of flash emission.

21. The apparatus according to claim 18, wherein said image data conversion means converts an image size, luminance level, color component, and resolution.

22. The apparatus according to claim 1, wherein said image data conversion means performs a space shift operation to maximize similarity between the background image and the image including the object.

23. The apparatus according to claim 1, wherein the image sensing condition includes an exposure amount, a focusing state, and the presence/absence of flash emission.

24. The apparatus according to claim 1, wherein said image data conversion means converts an image size, luminance level, color component, and resolution.

* * * * *